(12) United States Patent
Yano et al.

(10) Patent No.: US 7,532,283 B2
(45) Date of Patent: May 12, 2009

(54) LIQUID CRYSTAL DISPLAY

(75) Inventors: Tomoya Yano, Kanagawa (JP);
Norimasa Furukawa, Tokyo (JP);
Hiroshi Murayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 10/530,828

(22) PCT Filed: Aug. 10, 2004

(86) PCT No.: PCT/JP2004/011489

§ 371 (c)(1),
(2), (4) Date: Dec. 19, 2005

(87) PCT Pub. No.: WO2005/015297

PCT Pub. Date: Feb. 17, 2005

(65) Prior Publication Data

US 2006/0098146 A1    May 11, 2006

(30) Foreign Application Priority Data

Aug. 11, 2003    (JP) ............... 2003-291859

(51) Int. Cl.
*G02F 1/1335* (2006.01)

(52) U.S. Cl. .............. 349/117; 349/96; 349/118; 349/119

(58) Field of Classification Search ......... 349/117–119, 349/96
See application file for complete search history.

(56) References Cited

U.S. PATENT DOCUMENTS 7,176,999 B2 *   2/2007   Miyachi ............ 349/118
2003/0210370 A1 * 11/2003   Yano et al. ........ 349/117

FOREIGN PATENT DOCUMENTS

| JP | 2000-39610 | 2/2000 |
| JP | 2002-72215 | 3/2002 |
| JP | 2002-148661 | 5/2002 |

(Continued)

OTHER PUBLICATIONS

Anderson J E et al: "Methods and concerns of compensating in-plane switching liquid crystal displays" Japanese Journal of Applied Physics, Japan Society of Applied Physics, Tokyo, JP, vol. 39, No. 11, Nov. 2000, pp. 6388-6392, XP002288101 ISSN: 0021-4922.

(Continued)

*Primary Examiner*—Michael H Caley
(74) *Attorney, Agent, or Firm*—Frommer Lawrence & Haug LLP; William S. Frommer

(57) ABSTRACT

In case polarization plates (10A, 10B) including protective layers whose phase difference is negative are used, a retardation film optimized for the negative phase difference is placed in a position (P1) between a liquid crystal plane (20) and outgoing-side polarization plate (10A), in a position (P2) between the outgoing-side polarization plate (10A) and liquid crystal plate (20) or in both the positions (P1, P2) to reduce the leakage of black-level light directed at an angle 45 deg. Thus, in the in-plane switching (IPS) mode type liquid crystal display device, optical compensation is made to improve the viewing angle in black display.

15 Claims, 53 Drawing Sheets

FOREIGN PATENT DOCUMENTS

| | | |
|---|---|---|
| JP | 2002-196138 | 7/2002 |
| JP | 2002-258041 | 9/2002 |
| JP | 2003-262869 | 9/2003 |
| JP | 2003-262870 | 9/2003 |
| JP | 2003-262872 | 9/2003 |
| JP | 2004-157523 | 6/2004 |

OTHER PUBLICATIONS

Saitoh Y et al: "Optimum Film Compensation of Viewing Angle of Contrast in In-Plane-Switching-Mode Liquid Crystal Display" Japanese Journal of Applied Physics, Japan Society of Applied Physics, Tokyo, JP, vol. 37, No. 9A, Sep. 1998, pp. 4822-4828, XP000986685 ISSN: 0021-4922.

* cited by examiner

Angle of polarization plate axis
when screen is viewed from front

Angle of polarization plate axis
when screen is viewed obliquely

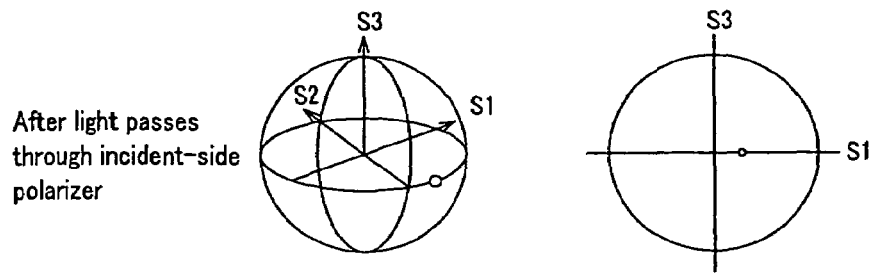
FIG.6A  After light passes through incident-side polarizer
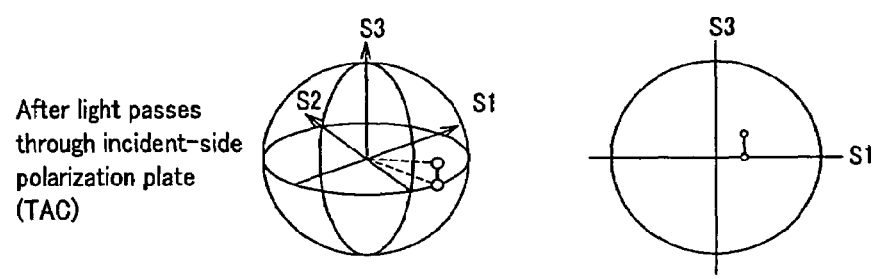
FIG.6B  After light passes through incident-side polarization plate (TAC)
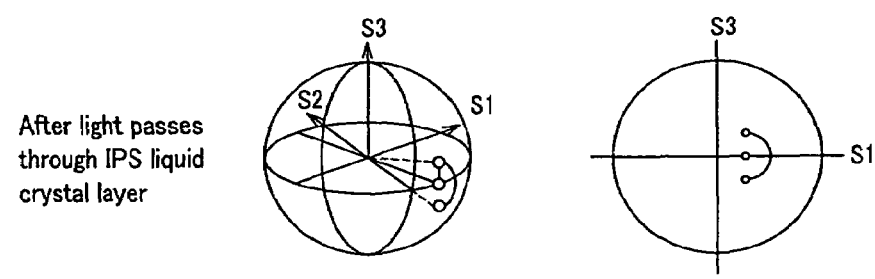
FIG.6C  After light passes through IPS liquid crystal layer
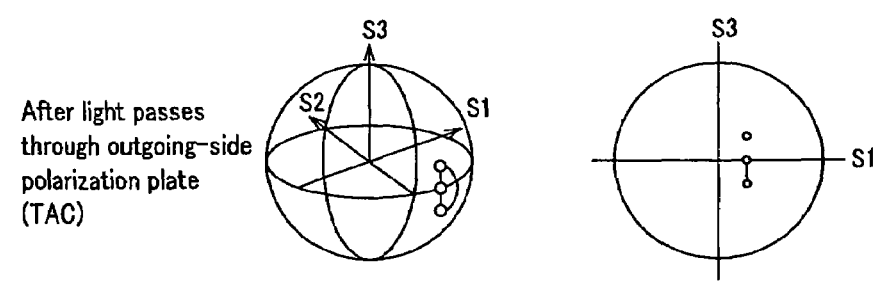
FIG.6D  After light passes through outgoing-side polarization plate (TAC)
Perspective view     View from direction S2

FIG 9A After light passes through incident-side polarizer
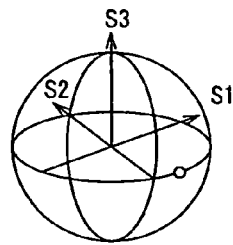 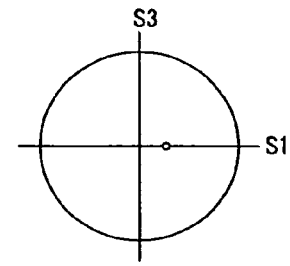
FIG 9B After light passes through incident-side polarization plate (TAC)
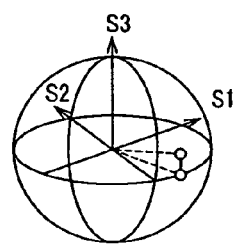 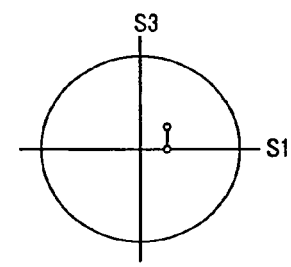
FIG 9C After light passes through IPS liquid crystal layer
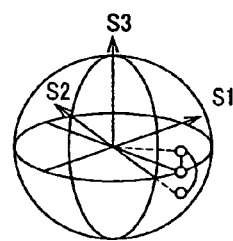 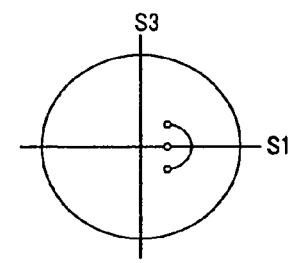
FIG 9D After light passes through retardation film
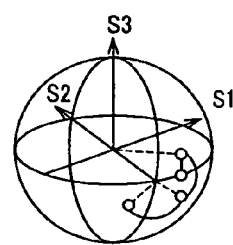 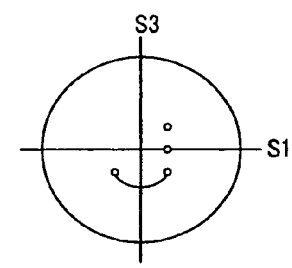
FIG 9E After light passes through outgoing-side polarization plate (TAC)
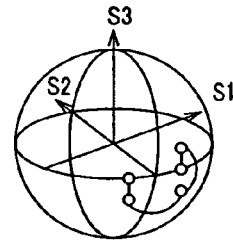 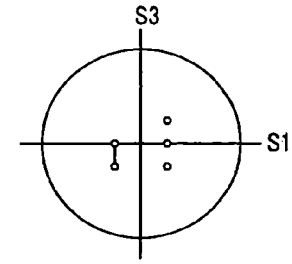
Perspective view      View from direction S2

FIG 12A After light passes through incident-side polarizer
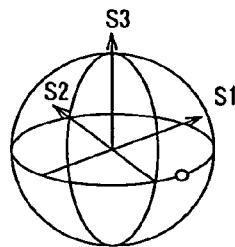 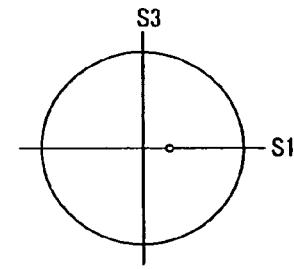
FIG 12B After light passes through incident-side polarization plate (TAC)
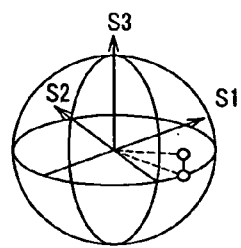 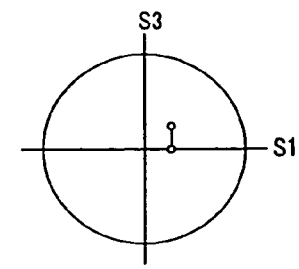
FIG 12C After light passes through IPS liquid crystal layer
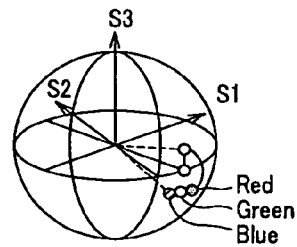 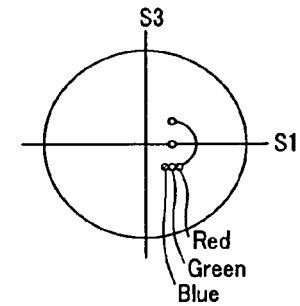
FIG 12D After light passes through retardation film
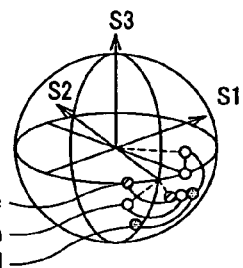 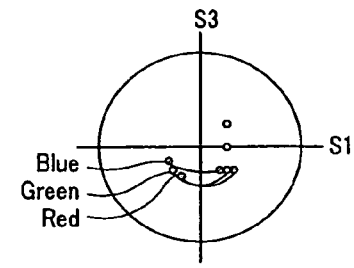
FIG 12E After light passes through outgoing-side polarization plate (TAC)
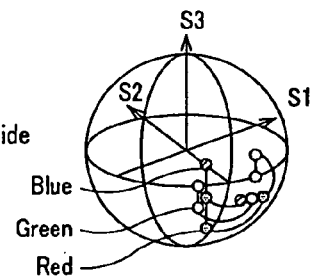 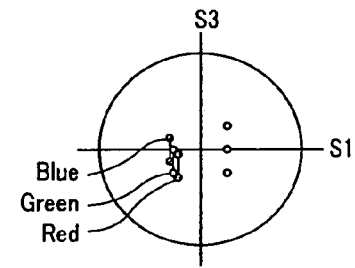
Perspective view  View from direction S2

FIG 13A After light passes through incident-side polarizer
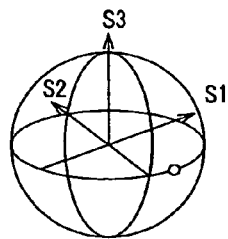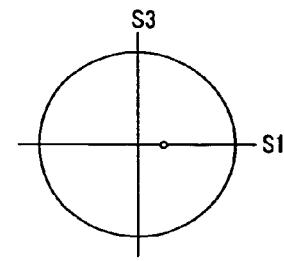
FIG 13B After light passes through incident-side polarization plate (TAC)
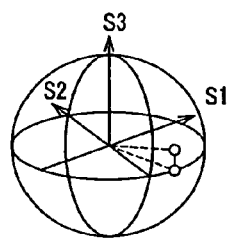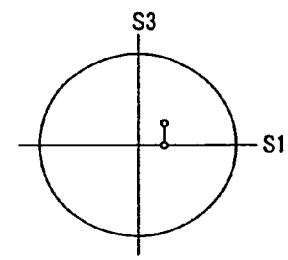
FIG 13C After light passes through IPS liquid crystal layer
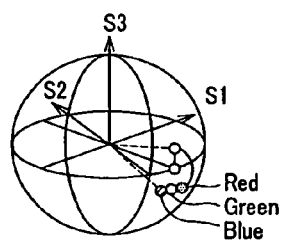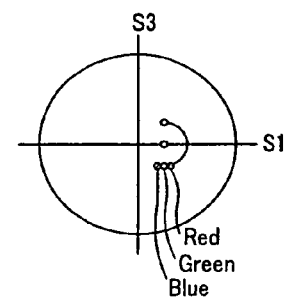
FIG 13D After light passes through retardation film
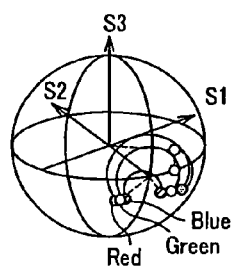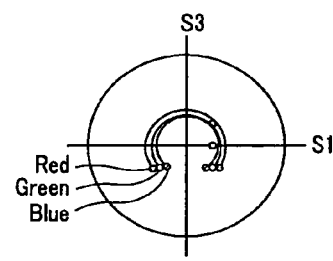
FIG 13E After light passes through outgoing-side polarization plate (TAC)
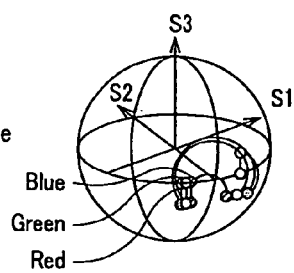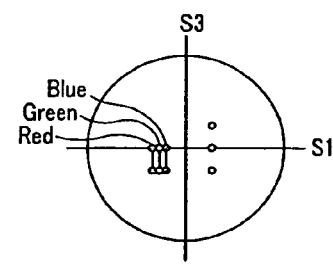
Perspective view     View from direction S2

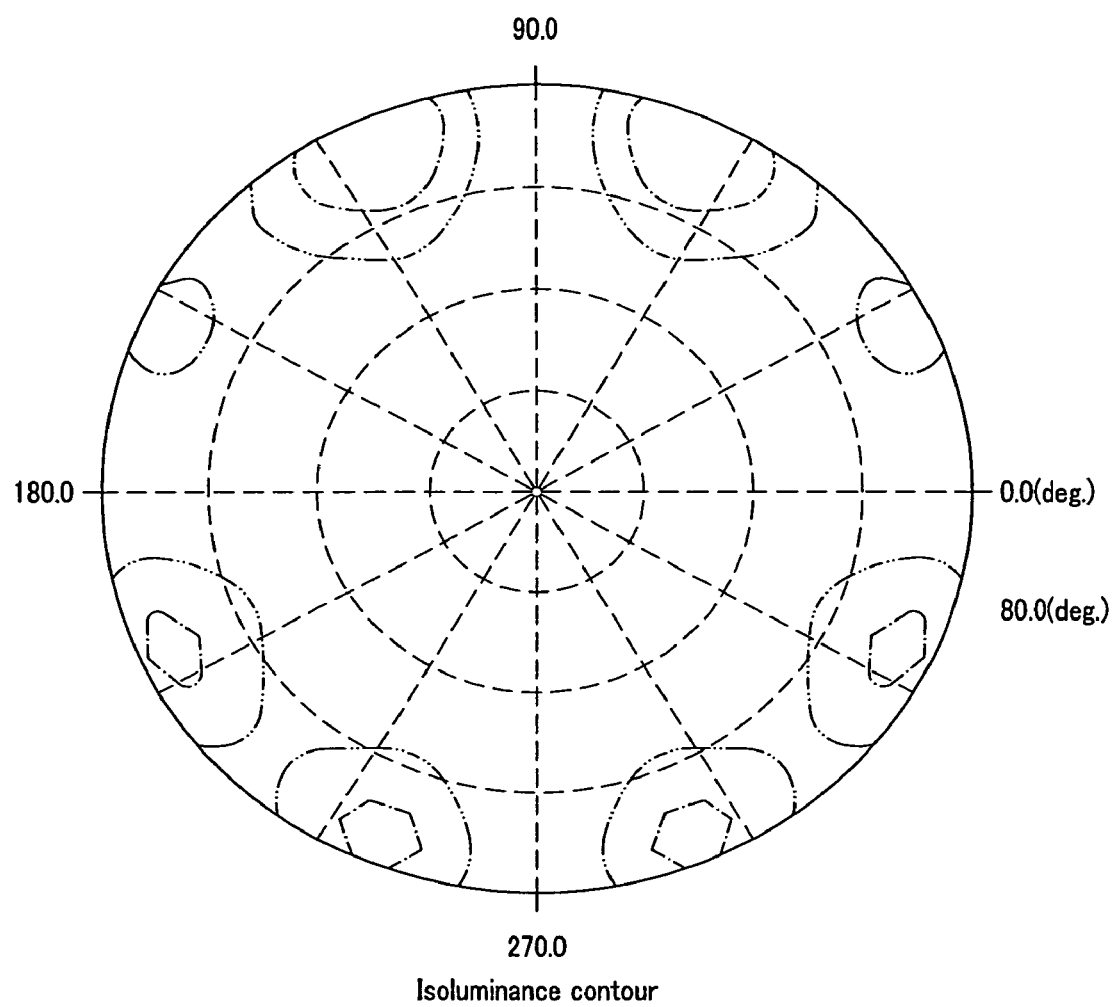
Isoluminance contour
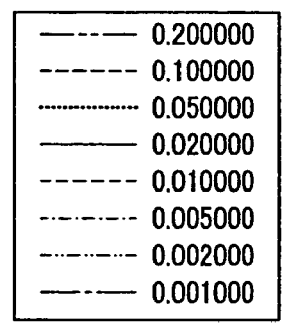
FIG.29

FIG43A  After light passes through incident-side polarizer 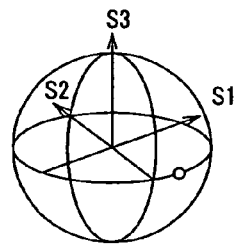 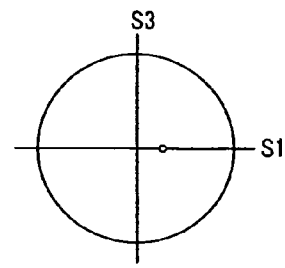

FIG43B  After light passes through incident-side polarization plate (TAC) 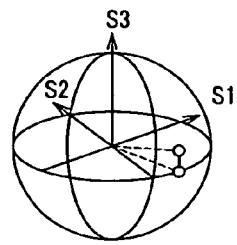 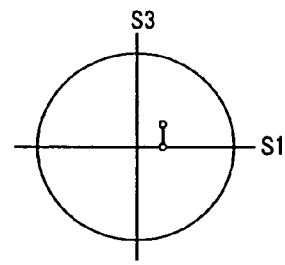

FIG43C  After light passes through 1st retardation film 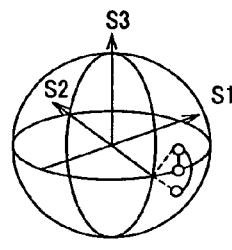 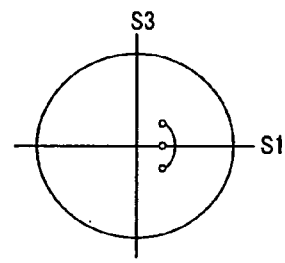

FIG43D  After light passes through IPS liquid crystal layer 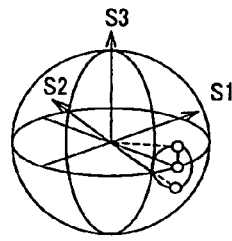 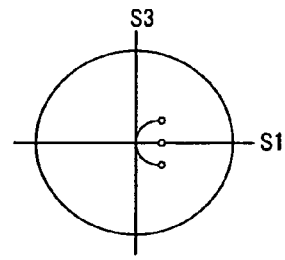

FIG43E  After light passes through 2nd retardation film 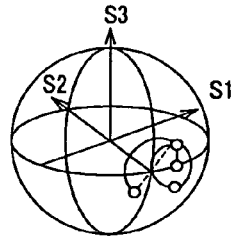 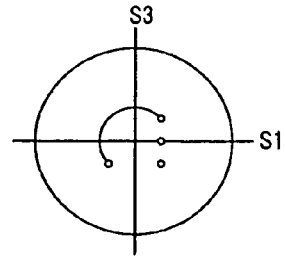

FIG43F  After light passes through outgoing-side polarization plate (TAC) 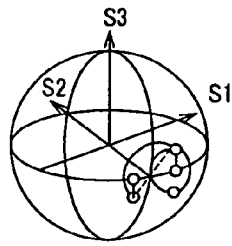 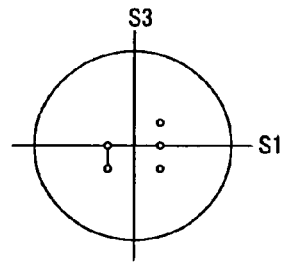

Perspective view        View from direction S2

FIG44A After light passes through incident-side polarizer 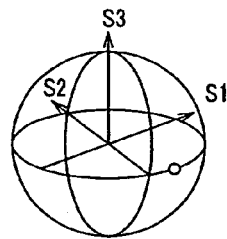 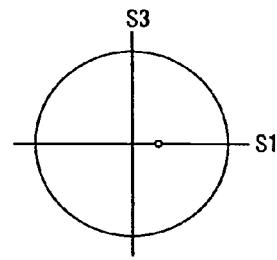

FIG44B After light passes through incident-side polarization plate (TAC) 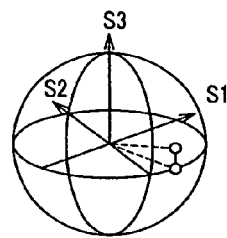 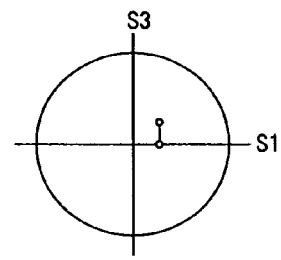

FIG44C After light passes through 1st retardation film 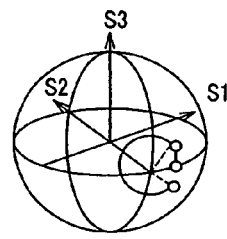 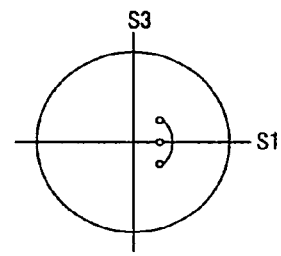

FIG44D After light passes through IPS liquid crystal layer 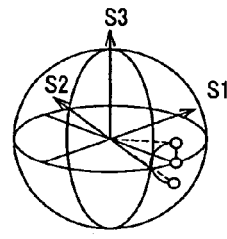 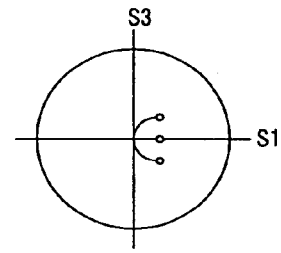

FIG44E After light passes through 2nd retardation film 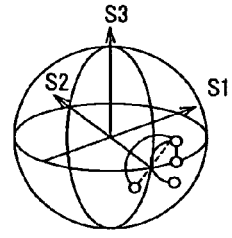 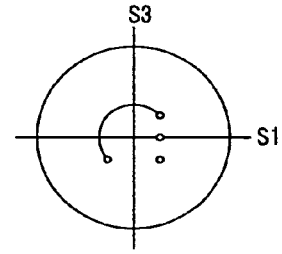

FIG44F After light passes through outgoing-side polarization plate (TAC) 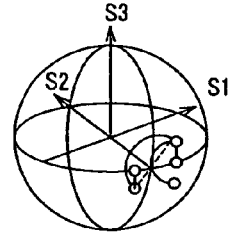 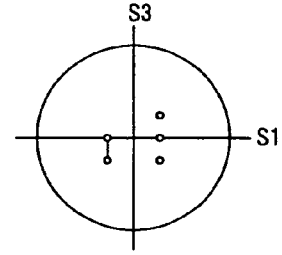

Perspective view     View from direction S2

LIQUID CRYSTAL DISPLAY

TECHNICAL FIELD

The present invention relates to a liquid crystal display device including a pair of polarization plates each formed from a polarizer and a pair of protective layers that protect the polarizer between them, the polarizers being laid orthogonal to each other, and a liquid crystal layer disposed between the polarization plates to have the molecules thereof aligned parallel with the absorption axis of one of the polarization plates.

This application claims the priority of the Japanese Patent Application No. 2003-291859 filed on Aug. 11, 2003, the entirety of which is incorporated by reference herein.

BACKGROUND ART

The liquid crystal display device is widely used as a variety of display means incorporated in an OA (office automation) device such as a word processor, personal computer or the like, and as a television set, car navigation monitor, aircraft-cockpit monitor or the like because of being advantageous in that it can be connected directly to an IC because of the operability with a low voltage and small power consumption, has many displaying functions, and can easily be designed lightweight and compact.

The liquid crystal display device uses the polarization plates to visualize a change of liquid crystal alignment. The polarization plate normally includes a polarizer and transparent protective films made of triacetyl cellulose (TAC) laminated over both sides of the polarizer. The polarizer is an optical element that splits incident light into two polarized components orthogonal to each other, and passes only one of the two polarized components (component which oscillates in a direction parallel with the transmission axis of the polarizer) while absorbing or dispersing the other component (component which oscillates in a direction parallel with the absorption axis of the polarizer).

The transmission type liquid crystal display device includes a liquid crystal cell which is sandwiched between polarization plates in its direction of thickness. The polarizers included in the opposite polarization plates, respectively, are normally disposed with their transmission axes being orthogonal to each other. The pair of polarizers whose transmission axes are orthogonal to each other is called "orthogonal polarizer". Generally, the characteristic of the polarizer depends upon the viewing angle. Namely, when light is incident obliquely upon the polarizer, the transmission axis varies in direction. Therefore, even with the two polarizers being superposed one on the other for their transmission axes to be orthogonal to perpendicular incident light, the crossed-axes angle in relation to oblique incident light will not be the right angle, so that polarized light having passed through the first polarizer will have components parallel with the transmission axis of the second polarizer and which will pass through the second polarizer, resulting in light leakage.

The above dependence of the polarizer upon the viewing angle will narrow the range of viewing angle in which the brightness, contrast, tint and the like of an image on the screen of the liquid crystal display device are visually recognizable. To implement a liquid crystal display device whose viewing angle is larger, it is essential to develop a polarization plate having the range of viewing angle thereof widened for little light leakage by reducing the dependence of the polarizer upon the viewing angle, that is, a polarization plate assuring a wider viewing angle. Some polarization plates have been proposed heretofore.

In the Japanese Patent Application Laid Open No. 2001-350022, for example, it is proposed to use a biaxial retardation film for optical compensation of the polarizer in order to implement a liquid crystal display apparatus having the range of viewing angle thereof widened by reducing the dependence of the polarizer upon the viewing angle.

Note here that a so-called in-plane switching (IPS) mode type liquid crystal display device in which liquid crystal molecules are activated by a field parallel with a substrate is promising as an image display device which will substitute for CRT (cathode ray tube) because it is free from any image gradation inversion and color change when the viewing angle is large.

Even in the in-plane switching (IPS) mode type liquid crystal display device, however, light transmission takes place when the display screen is viewed at an angle at which it would have the black level, particularly, when the display screen is viewed at an angle of 45 deg. from the polarization axes of the pair of polarization plates forming together the display device, resulting in a lower contrast of the display screen.

The polarization plate is formed from a polarizer that passes predetermined-directional light and a protective layer laminated on either side of the polarizer. Normally, the protective layer is made of TAC or the like and the polarizer is sandwiched between the protective layers in the direction of thickness. Therefore, incident light having passed through the polarizer will pass through the protective layer interposed between the polarizer and liquid crystal cell, and arrive at a liquid crystal layer.

FIG. 1 shows a viewing angle when the display screen will have the black level. As the testing conditions for this viewing angle for a display at the black level, the absorption axis of the lower polarization plate (at the side of the back light) is set at an angle of 90 deg., absorption axis of the upper polarization plate is to an angle of 0 deg., liquid crystal is aligned at an azimuth of 90 deg. (in which the alignment direction is open through 90 deg. on a lower substrate), and the substrate is pretilted at an angle of 2 deg. The light path length difference $\Delta nd_{LC}$ of the liquid crystal layer is set to 275 nm (when light used has a wavelength of 550 nm). The protective layer included in the polarization plate is made of TAC and functions as a uniaxial retardation film having an optical axis perpendicular to the substrate. The light path length difference $\Delta nd_{TAC0}$ of each protective layer interposed between the polarizers in the upper and lower polarization plates and the liquid crystal layer is 50 nm. In FIG. 1, each of letters a, to e shows an isoluminance contour plotted by a value of the ratio between incident light and leakage light, also shown. As will be seen, a large light transmission takes place in a direction of 45 deg.

FIG. 2 shows spectral transmittances at the time of a black-level display in the conventional liquid crystal display device when the display screen is viewed at an angle Pola (elevation angle) of 70 deg. and each of azimuths Azim of 15, 30, 45, 60 and 75 deg., and FIG. 3 shows spectral transmittances at the time of a black-level display in the conventional liquid crystal display device when the display screen is viewed at an angle Pola (elevation angle) of 70 deg. and each of azimuths Azim of 345, 330, 315, 300 and 285 deg. Note here that the azimuth Azim is a counterclockwise angle from a viewing angle of 0 deg. from the right in the drawings.

When the display screen is viewed at each of viewing angles are 45, 135, 225 and 315 deg. in a direction of 45 deg. from the polarization axis of the polarization plate, the light transmittance is high and the spectral transmittance provides a yellowish display, resulting in a lower quality of display.

The aforementioned Japanese Unexamined Patent Application Publication discloses the use of a biaxial retardation film for optical compensation of the polarizers, but not any interposition of a protective layer having a negative phase difference between the polarizer in the polarization plate and the liquid crystal layer. It does not disclose the use of any in-plane switching mode liquid crystal layer with the protective layer interposed as above. Therefore, even with the use of the technology disclosed in the Japanese Unexamined Patent Application Publication, it is difficult to overcome the problem of the lower display quality and compensate the dependence of the polarizer upon the viewing angle.

DISCLOSURE OF THE INVENTION

Accordingly, the present invention has an object to overcome the above-mentioned drawbacks of the related art by providing a liquid crystal display device including a pair of polarization plates each formed from a polarizer and a pair of protective layers that protect the polarizer, the polarizers being laid orthogonal to each other, and a crystal layer disposed between the pair of polarization plates to have the molecules thereof aligned parallel with the direction of the absorption axis of one of the polarization plates, for example, a so-called in-plane switching (IPS) mode type liquid crystal display device in which the liquid crystal molecules are activated by a field parallel to a substrate, in which especially in case for polarization plates each including protective layers having a negative phase difference and interposed between polarizers and a liquid crystal layer, there is provided a retardation film optimized for the negative phase difference by making optical compensation for an improved viewing angle for a black-level display.

According to one aspect of the present invention, there is provided a liquid crystal display device including a pair of polarization plates each formed from a polarizer and a pair of protective layers laminated over the polarizer to protect the latter, the transmission axes of the polarizers being orthogonal to each other, and a liquid crystal plate disposed between the polarization plates and including a liquid crystal layer having the molecules thereof aligned parallel with the absorption axis of one of the polarization plates, wherein:

each of the protective layers in the pair of polarization plate is a uniaxial retardation film laminated over at least the liquid crystal layer, having the optical axis thereof extended in the direction of its thickness and which is generally isotropic in a plane perpendicular to the thickness direction to perform as a negative retardation film whose thickness-directional refractive index is smaller than an in-plane-directional one; and there is disposed between the liquid crystal plane and at least any one of the polarization plates a biaxial retardation film that compensates the dependence upon the viewing angle of the protective layer upon which light forming an angle with the viewing-angular direction is incident.

Further, in the above liquid crystal display device according to the present invention, the biaxial retardation film is directed to vary in refractive index in the plane perpendicular to the direction of its thickness and show a maximum refractive index nx in that plane; and with the refractive index in a direction perpendicular, in the plane, to the direction to show the maximum refractive index nx being taken as ny, a product of the difference (nx−ny) between the refractive indexes nx and ny and the thickness of the retardation film being taken as an in-plane light path length difference of the retardation film, and with a product of the difference between the thickness-directional refractive index and in-plane-directional one, of the protective layer and the thickness of the protective layer being taken as a light path length difference of the protective layer, the in-plane light path length difference of the retardation film is set with a predetermined wavelength in a visible domain on the basis of the light path length difference of the protective layer and predetermined wavelength to compensate the dependence upon the viewing angle for incident light forming an angle with the viewing-angular direction.

Also, according to another aspect of the present invention, there is provided a liquid crystal display device including a pair of polarization plates each formed from a polarizer whose transmission axis is orthogonal to that of a polarizer in the other polarization plate and a liquid crystal plate disposed between the polarization plates and including a liquid crystal layer having the molecules thereof aligned parallel with the absorption axis of one of the polarization plates, wherein:

each of the pair of polarization plates has a protective layer laminated over the surface thereof at the side of the crystal layer, the protective layers in pair being equal in thickness to each other and performing as a uniaxial retardation film having a negative phase difference;

a first retardation film and second retardation film are disposed between the liquid crystal plate and polarization plates, respectively;

the first retardation film is set to have a light path length difference for a polarization which would be before incident light passes through the liquid crystal layer;

the second retardation film is a biaxial retardation film whose refractive index in the direction of its thickness is different from that in a plane perpendicular to the thickness direction and which includes a direction in which there is a maximum refractive index nx;

the in-plane light path length difference of the retardation film, defined as a product of the difference (nx−ny) (nx is the maximum refractive index and ny is a refractive index in a direction perpendicular to the direction for the maximum refractive index nx) and the thickness of the retardation film is set to about λ/2; and the first and second retardation films optically compensate the change in polarization of the light having passed through the pair of protective layers.

By setting, by the first retardation film, the in-plane light path length difference to that before the incident passes through the liquid crystal layer and changing the polarization of the light through 180 deg. by the second retardation film whose in-lane light path length difference is about λ/2, to thereby cancel the polarization by one of the pair of protective layers equal in thickness to each other by the polarization by the other protective layer, it is possible to maintain the black-level display independently of any viewing angle.

Further, the first retardation film should preferably be a biaxial one, or a negative uniaxial one, having a predetermined light path length difference.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 5 shows an axial angle of the polarization plate in the liquid crystal display device in FIG. 4, in which

FIG. 6 shows, in the Poincare-spherical geography, the polarization of light incident in a direction of 45 deg. and having passed through various members in the liquid crystal display device in FIG. 4, in which FIG. 6A shows the polarization of the light having passed through the polarizer in the incident-side polarization plate, FIG. 6B shows the polarization of the light having passed through the protective layer in the incident-side polarization plate, FIG. 6C shows the polarization of the light having passed through the IPS liquid crystal layer in the liquid crystal plate, and FIG. 6D shows the polarization of the light having passed through the protective layer in the outgoing-side polarization plate.

FIG. 9 shows, in the Poincare-spherical geography, the polarization of light incident in a direction of 45 deg. and having passed through various members in the liquid crystal display device in FIG. 8, in which FIG. 9A shows the polarization of the light having passed through the polarizer in the incident-side polarization plate, FIG. 9B shows the polarization of the light having passed through the protective layer in the incident-side polarization plate, FIG. 9C shows the polarization of the light having passed through the IPS liquid crystal layer in the liquid crystal plate, FIG. 9D shows the polarization of the light having passed through the biaxial retardation film, and FIG. 9E shows the polarization of the light having passed through the protective layer in the outgoing-side polarization plate.

FIG. 12 shows, in the Poincare-spherical geography, a first method of optimizing the retardation film for an improved black level at a viewing angle of 45 deg. in the liquid crystal display device, in which FIG. 12A shows the polarization of the light having passed through the polarizer in the incident-side polarization plate, FIG. 12B shows the polarization of the light having passed through the protective layer in the incident-side polarization plate, FIG. 12C shows the polarization of the light having passed through the IPS liquid crystal layer in the liquid crystal plate, FIG. 12D shows the polarization of the light having passed through the biaxial retardation film, and FIG. 12E shows the polarization of the light having passed through the protective layer in the outgoing-side polarization plate.

FIG. 13 shows, in the Poincare-spherical geography, a second method of optimizing the retardation film for an improved black level at a viewing angle of 45 deg. in the liquid crystal display device, in which FIG. 13A shows the polarization of the light having passed through the polarizer in the incident-side polarization plate, FIG. 13B shows the polarization of the light having passed through the protective layer in the incident-side polarization plate, FIG. 13C shows the polarization of the light having passed through the IPS liquid crystal layer in the liquid crystal plate, FIG. 13D shows the polarization of the light having passed through the biaxial retardation film, and FIG. 13E shows the polarization of the light having passed through the protective layer in the outgoing-side polarization plate.

FIG. 29 shows a viewing angle characteristic at a black-display level in a sixth embodiment of the liquid crystal display device in FIG. 8.

FIG. 43 shows, in the Poincare-spherical geography, a third method of optimizing the retardation film for an improved black level at a viewing angle of 45 deg. in the liquid crystal display shown in FIG. 42, in which FIG. 43A shows the polarization of the light having passed through the polarizer in the incident-side polarization plate, FIG. 43B shows the polarization of the light having passed through the protective layer in the incident-side polarization plate, FIG. 43C shows the polarization of the light having passed through the retardation film, FIG. 43D shows the polarization of the light having passed through the IPS liquid crystal layer in the liquid crystal plate, FIG. 43E shows the polarization of the light having passed through the biaxial retardation film, and FIG. 43F shows the polarization of the light having passed through the protective layer in the outgoing-side polarization plate.

FIG. 44 shows, in the Poincare-spherical geography, a fourth method of optimizing the retardation film for an improved black level at a viewing angle of 45 deg. in the liquid crystal display device shown in FIG. 42, in which FIG. 44A shows the polarization of the light having passed through the polarizer in the incident-side polarization plate, FIG. 44B shows the polarization of the light having passed through the protective layer in the incident-side polarization plate, FIG. 44C shows the polarization of the light having passed through the retardation film, FIG. 44D shows the polarization of the light having passed through the IPS liquid crystal layer in the liquid crystal plate, FIG. 44E shows the polarization of the light having passed through the biaxial retardation film, and FIG. 44F shows the polarization of the light having passed through the protective layer in the outgoing-side polarization plate.

BEST MODE FOR CARRYING OUT THE INVENTION

The present invention will be described in detail concerning the embodiments thereof with reference to the accompanying drawings.

Figure 1:
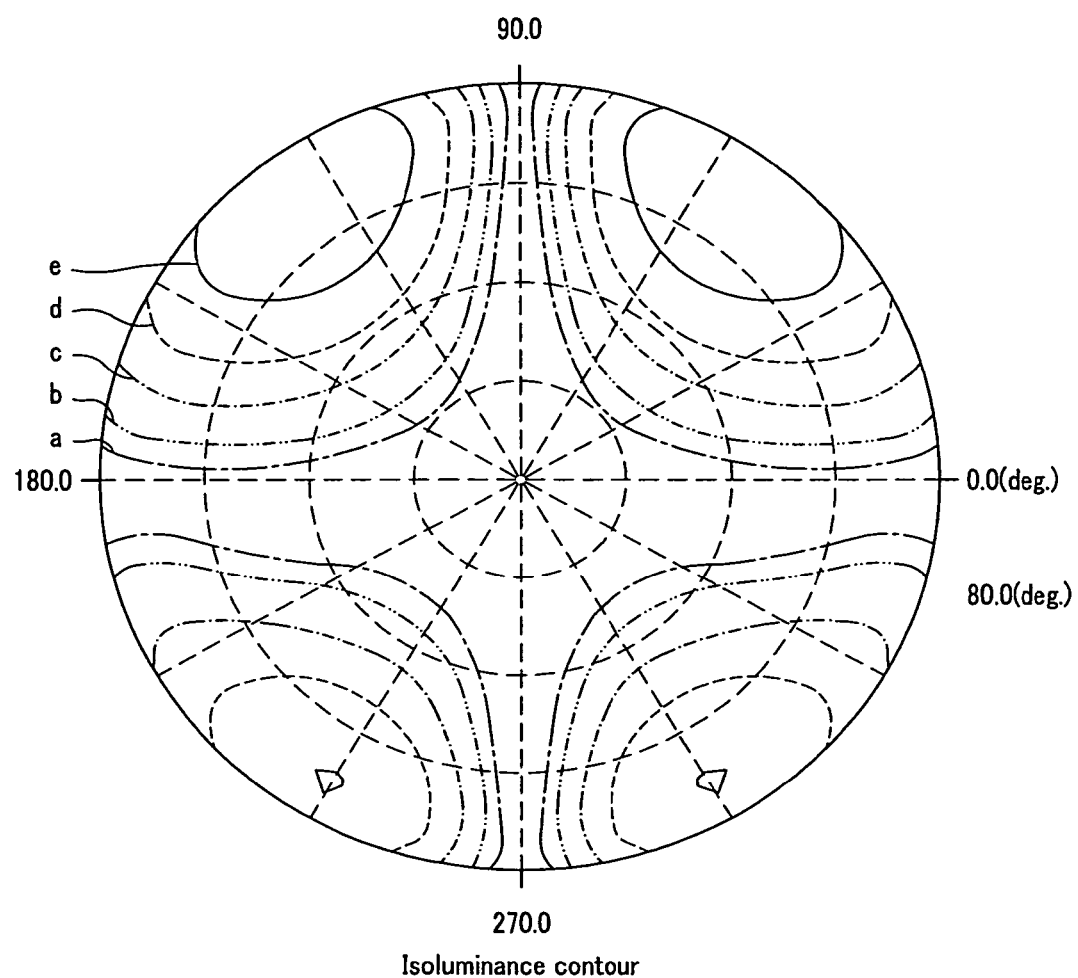
FIG. 1 shows a viewing angle characteristic at a black-display level in the conventional liquid crystal display device.
Figure 2:
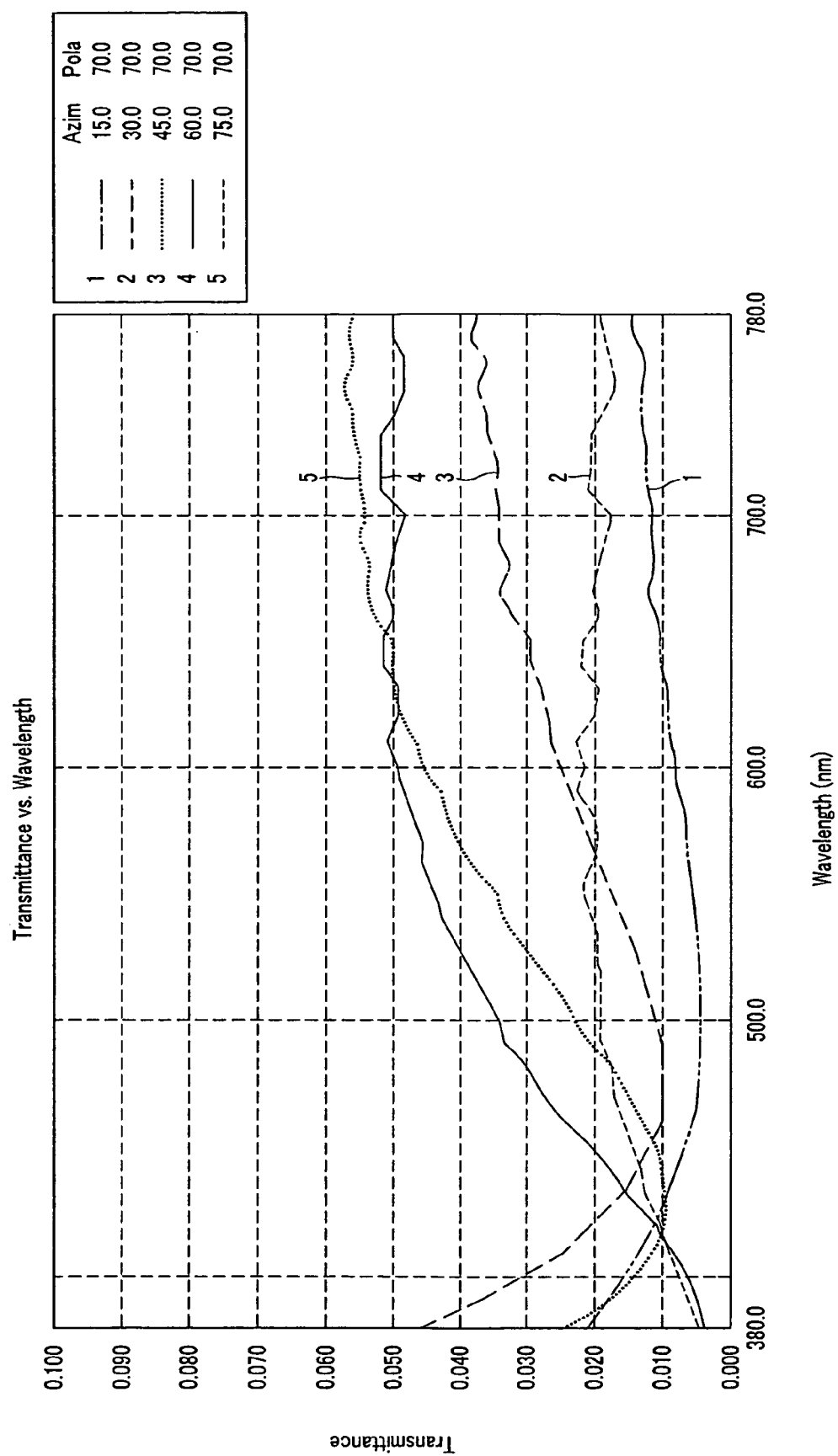
FIG. 2 shows black-level spectral transmittance at a viewing angle Pola (elevation angle) of 70 deg. and each of azimuths Azim of 15, 30, 45, 60 and 75 deg. in the conventional liquid crystal display device.
Figure 3:
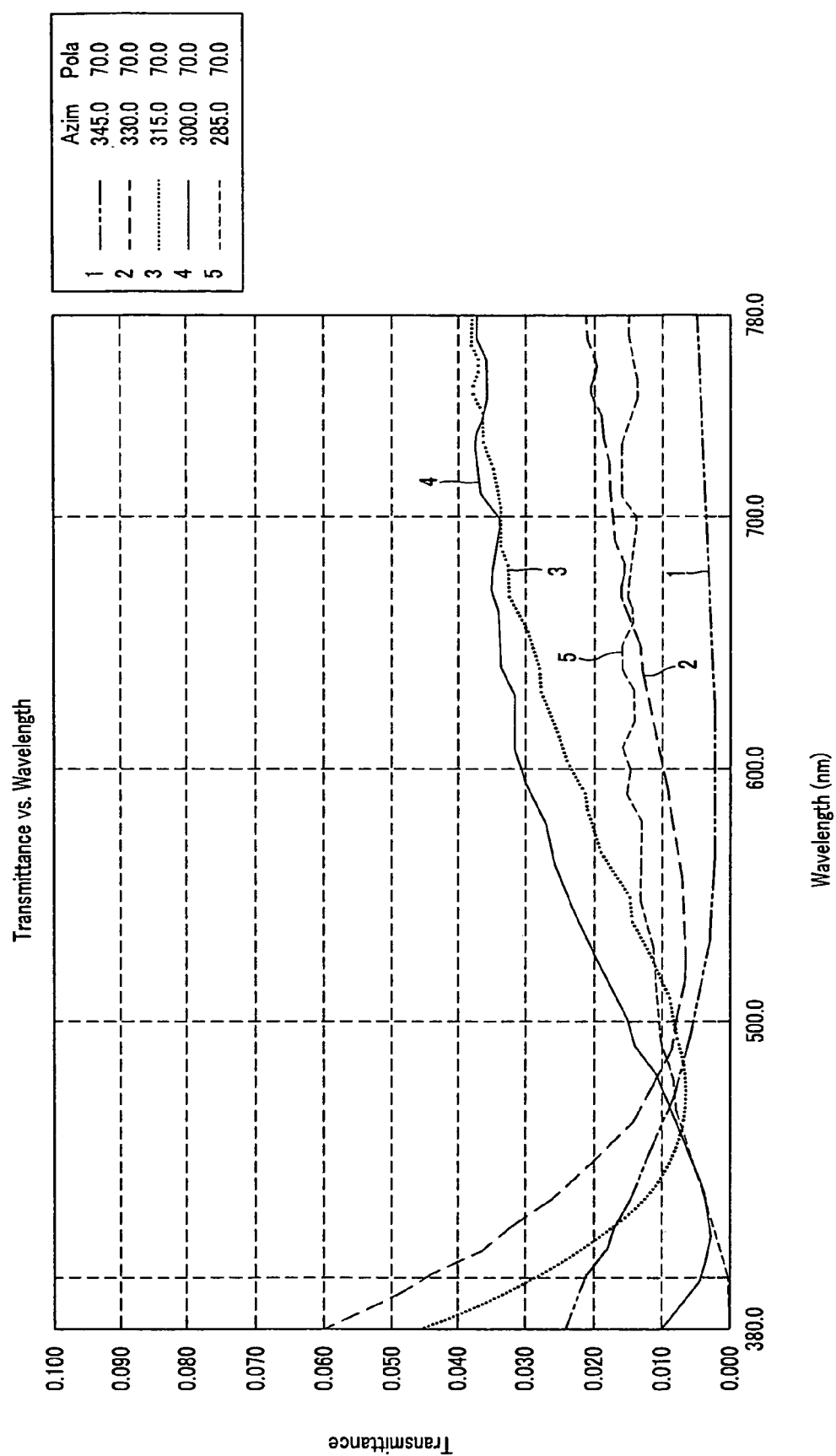
FIG. 3 shows black-level spectral transmittance at a viewing angle Pola (elevation angle) of 70 deg. and each of azimuths Azim of 345, 330, 315, 300 and 285 deg. in the conventional liquid crystal display device.
Figure 4:
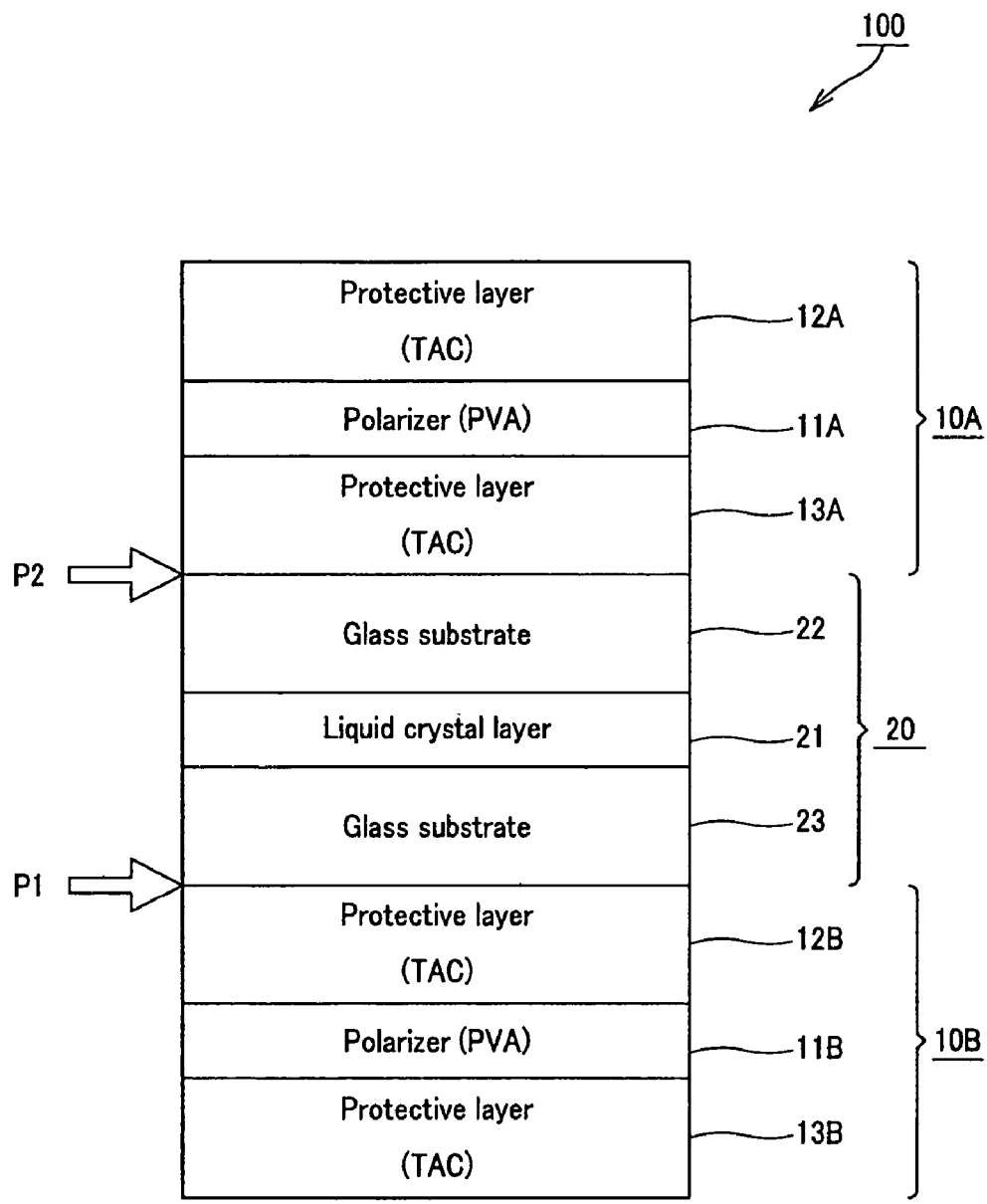
FIG. 4 is a schematic end elevation showing an example configuration of the substantial portion of the liquid crystal display device according to the present invention.

The present invention is applied, for example, to a liquid crystal display device 100 configured as shown in FIG. 4. In this drawing, members governing the black-level transmittance are shown in simplified forms, respectively, in FIG. 4.

As shown in FIG. 4, the liquid crystal display device 100 includes a pair of polarization plates 10A and 10B disposed with their transmission axes being laid orthogonal to each other, and a crystal plate 20 including a liquid crystal layer 21 disposed parallel to the absorption axis of one of the polarization plates.

The polarization plate 10A includes a polarizer 11A and protective layers 12A and 13A which protect the polarizer 11A, and the polarization plate 10B in pair with the polarization plate 10A includes a polarizer 11B being in pair with the polarization 11A and whose transmission axis is orthogonal to that of the polarizer 11A and protective layers 12B and 13B which protect the polarizer 11B.

Also, the liquid crystal plate 20 includes the liquid crystal layer 21 disposed parallel with the absorption axis of one of the polarization plates and glass substrates 22 and 23 having the liquid crystal layer 21 sealed between them. The liquid crystal plate 20 forms the so-called in-plane switching (IPS) mode type liquid crystal display device 100 in which liquid crystal molecules are activated by a field parallel to the glass substrates 22 and 23.

First, there will be described the phenomenon of light transmission at a black level at an azimuth of 45 deg. when not optically compensated in the liquid crystal display device 100 configured as above.

Since the black level when viewed at an azimuth of 45 deg. from the polarization-plate polarization axis incurs a maximum light transmission, the light-transmission phenomenon will be described below with a special attention given to the viewing angle of 45 deg.

Note that unless any azimuth is specifically referred to with respect to the polarization axis of the polarization plate, it shall be taken as an azimuth of 45, 135, 225 or 315 deg. in the following description.

Generally, the polarization plates 10 include the polarizers 11 formed from a drawn PVA (polyvinyl alcohol) film on which iodine or the like is applied by adsorption and protective layers 12 and 13 formed from TAC (triacetyl cellulose) and which hold the polarizer 11 sandwiched between them. On account of the optical compensation, however, the polarization plate may be considered as combination of an O-type polarizer which absorbs light in a direction for an abnormal light refractive index and a negative retardation film whose optical axis is perpendicular to the substrate.

The liquid crystal layer 21 in the black display state in the IPS mode can be considered as a uniaxial retardation film. Generally, it functions as a λ/2 plate with a predetermined wavelength of green (G) light. That is to say, a model in the black display state in case a liquid crystal display device including a pair of polarization plates formed from a polarizer and protective layers and whose transmission axes are orthogonal to each other and an IPS-mode liquid crystal layer disposed between the pair of polarization plates is considered as a retardation film will be an O-type polarizer (absorption axis of 90 deg.) –negative retardation film–uniaxial retardation film (delay-phase axis of 90 deg.)–negative retardation film–O-type polarizer (absorption axis of 0 deg.).

Figure 5A:
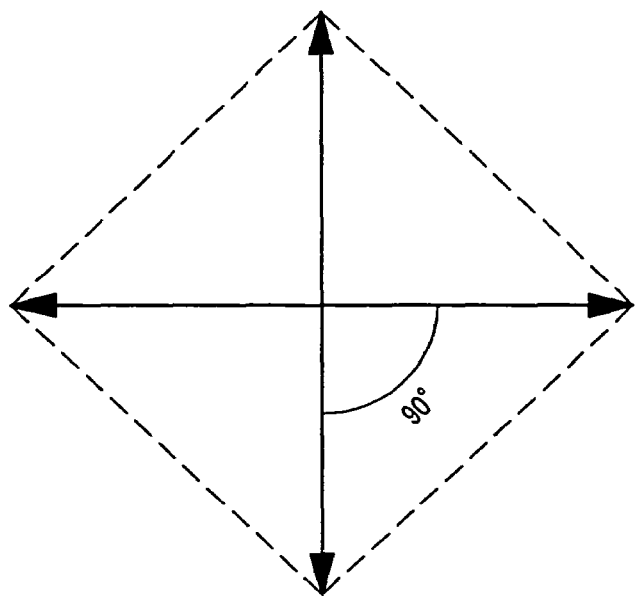
FIG. 5A shows the axial angle of the polarization plate when viewed from the front and FIG. 5B shows the axial angle of the polarization plate viewed obliquely.
Figure 5B:
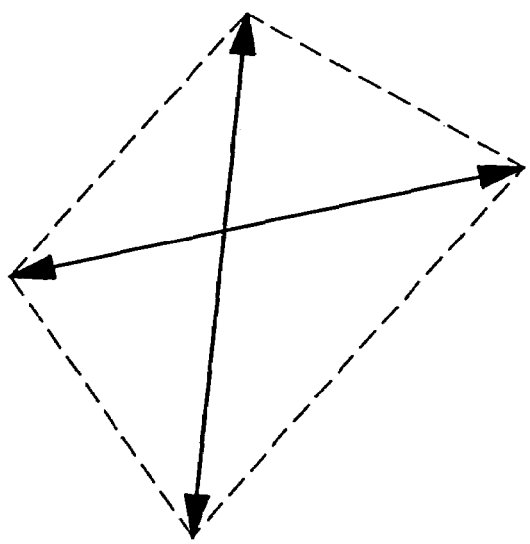

For the better understanding, the O-type polarizers in the form of the cross Nicol will be described. As shown in FIG. 5, when light is incident perpendicularly upon the substrate, the larger the incident angle, the larger the angle formed between the absorption axes of the polarizers will deviate from the right angle even of the absorption axes are orthogonal to each other. Therefore, in case only the O-type polarizers are disposed in the form of the cross Nicol, light incident at an azimuth of 45 deg. from the polarization axis will pass through the outgoing-side polarizer, resulting in light leakage. It should be noted that FIG. 5A shows an angle of the polarization axis viewed from the front and FIG. 5B shows an angle of the polarization axis viewed obliquely.

In case light is incident at an azimuth of 45 deg., the displacement of the polarization-plate angle θ from that when light is incident with the polarization axis being at 0 deg. is approximately given by the following equation (1):

$$\phi(\theta) = \frac{\pi}{4} - \tan^{-1}[\cos(\theta)] \quad (1)$$

The polarization plate-protective layers 13A and 12B located in the path of light incident upon the polarizer 11A and outgoing from the polarizer 11B will function as a negative retardation film as having been described above, and the delay-phase axis will be perpendicular to the incident surface. The change of the light path with respect to the incident angle θ in the medium is determined as follows. Namely, the light path length difference $\Delta nd_{TAC}$ at the incident angle θ in the medium will approximately be given by the following equation (2) when the light path length difference $\Delta nd_{TAC0}$ is taken as a negative retardation of the polarization plate-protective layers 13A and 12B:

$$\Delta nd_{TAC}(\theta) = \Delta nd_{TAC0} \frac{\sin^2(\theta)}{\cos(\theta)} \quad (2)$$

Note here that each of the polarization plate-protective layers 13A and 12B is a uniaxial retardation film which is $d_{TAC0}$ thick, has an optical axis oriented in the direction of thickness and is isotropic in a plane perpendicular to the thickness direction. The protective layer will perform as a negative retardation film whose refractive index nxt in the thickness direction is smaller than the refractive index nxy in a direction in the plane. Also, the light path length difference $\Delta nd_{TAC0}$ of the protective layers is defined as the absolute value of the negative light path length difference (nxy−nzt)·$d_{TAC0}$.

The liquid crystal layer 21 functions as a uniaxial retardation film as mentioned above, and has a delay-phase axis in a direction generally equal to that of the absorption axis of the polarizer. Also, no phase difference will take place at the azimuth of 45 deg.

FIG. 6 shows, in the Poincare-spherical geography, the polarization of light incident at an azimuth of 45 deg. and having passed through various members, in which FIG. 6A shows the polarization of the light having passed through the polarizer 11A in the incident-side polarization plate 10A, FIG. 6B shows the polarization of the light having passed through the protective layer 13A in the incident-side polarization plate 10A, FIG. 6C shows the polarization of the light having passed through the IPS liquid crystal layer 21 in the liquid crystal plate 20, and FIG. 6D shows the polarization of the light having passed through the protective layer 13B in the outgoing-side polarization plate 10B.

The liquid crystal layer 21 works generally as a λ/2 plate with a predetermined wavelength of green (G) light. In the IPS mode, the liquid crystal layer 21 functions to reduce the influence of the negative phase difference of the polarization plate-protective layer 13A as will be seen from the Poincare-spherical geography. As having previously been described, however, as far as only the polarizer is concerned, the polarized light having passed through the protective layer 13B in the outgoing-side polarization plate is displaced from the absorption axis of the outgoing-side polarizer 11B when the viewing angle is 45 deg., resulting in light transmission. Also, since the polarization varies from one wavelength to another, coloring takes place. These are caused mainly by the dependence, upon the wavelength, of the light path length difference $\Delta nd_{LC}$ of the liquid crystal layer 21.

According to the present invention, in case the polarization plates 10A and 10B including the protective layers having the negative phase difference are used as in the liquid crystal display device 100 shown in FIG. 4, a retardation film optimized for the negative phase difference is inserted in a position P1 between the liquid crystal plate 20 and outgoing-side polarization plate 10A or in a position P2 between the outgoing-side polarization plate 10A and liquid crystal layer 20 or in both these positions to reduce the black-level light leakage at the azimuth of 45 deg.

Here will be described a first method of optimizing the retardation film for improving the black level at the viewing angle of 45 deg. in the liquid crystal display device 100 configured as above.

To improve the black level at the viewing angle of 45 deg., a retardation film to cancel the displacement of the polarization axis of the polarizer is required. Also, consideration has to be given to the phase difference of the polarization plate-protective layer.

Figure 7:
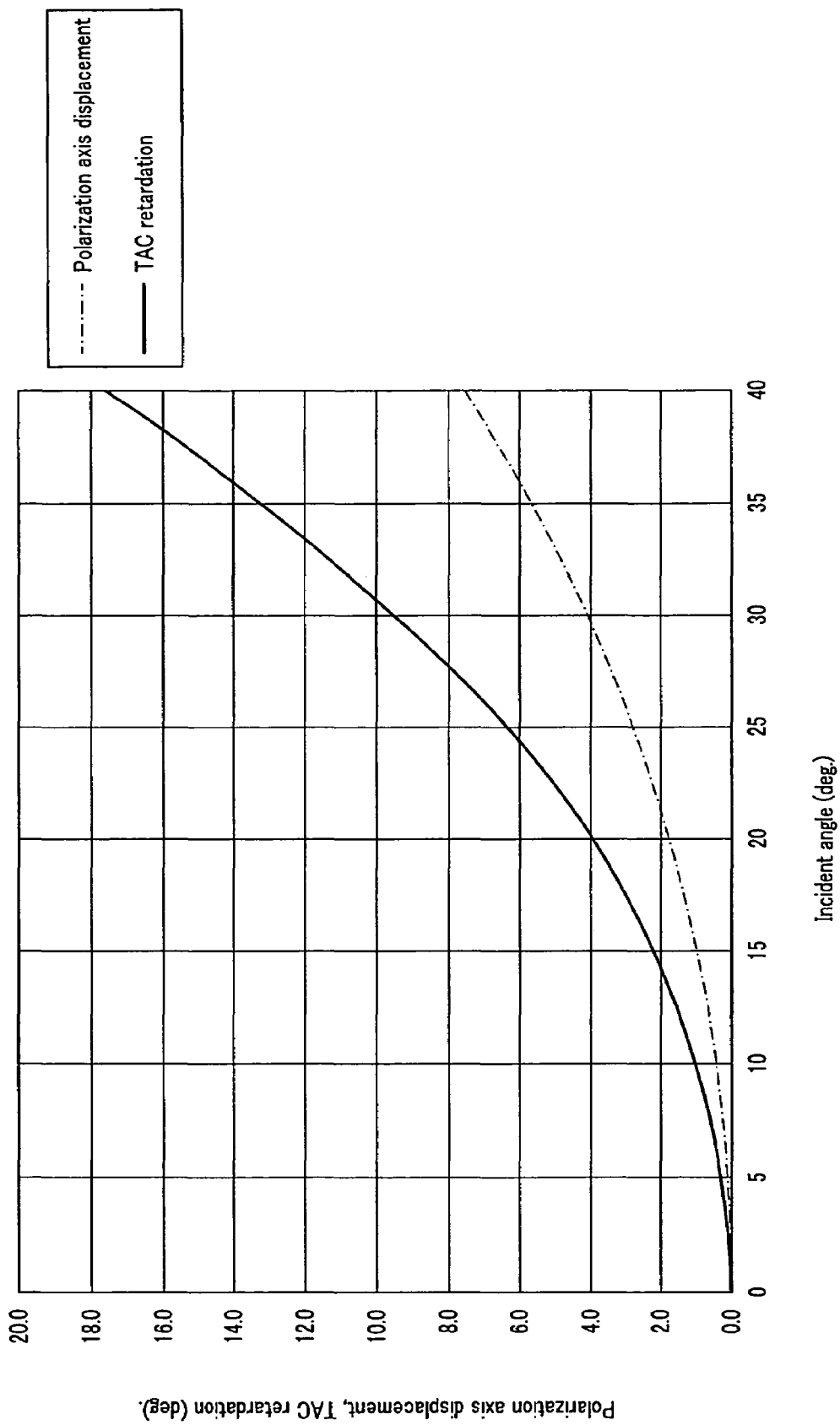
FIG. 7 shows the dependence, upon the incident angle, of the displacement of the incident polarization axis and phase difference of the polarization plate-protective layer in the liquid crystal display device in FIG. 4 when the viewing angle is 45 deg.

FIG. 7 shows the dependence, upon the incident angle, of the displacement of the incident polarization axis and phase difference of the polarization plate-protective layer when the viewing angle is 45 deg.

As seen from FIG. 7, the ratio between the displacement of the incident polarization axis and phase change of the polarization plate-protective layers is generally constant with respect to the change in incident angle, which will be described in detail later. Also, the liquid crystal layer 21 may be considered as a uniaxial retardation film and the phase difference of the liquid crystal layer 21 be considered as constant in the direction of 45 deg. as having previously been described. When light is incident in a direction of 45 deg., there will be required a retardation film whose delay-phase axis is constant at whatever angle the light is incident and which has a phase difference independent of any incident angle to direct the polarization axis orthogonally to the direction of absorption of the outgoing-side polarizer 11B.

On the assumption that given a coordinate xyz, the refractive index in the direction of thickness is nz, maximum refractive index in a plane perpendicular to the thickness direction is nx and refractive index in a direction perpendicular to a direction for the maximum refractive index nx and thickness direction for a refractive index nz is ny, the optical axis of a biaxial retardation film which has a refractive index of nx>nz>ny(nz=(nx+ny)/2) in this order is directed at an angle of ±45 deg. from the x axis in an xy plane (note here that the "optical axis" refers to a direction of light in which the retardation film will not show any birefringence). Such a retardation film is disposed to take the xy plane as the substrate surface. When the direction of 45 deg. from the x axis is included in the plane of incidence, the delay-phase axis of the retardation film will be directed at an angle of 45 deg. independently of any incident angle. Also, the phase difference is constant independently of any incident angle.

Figure 8:
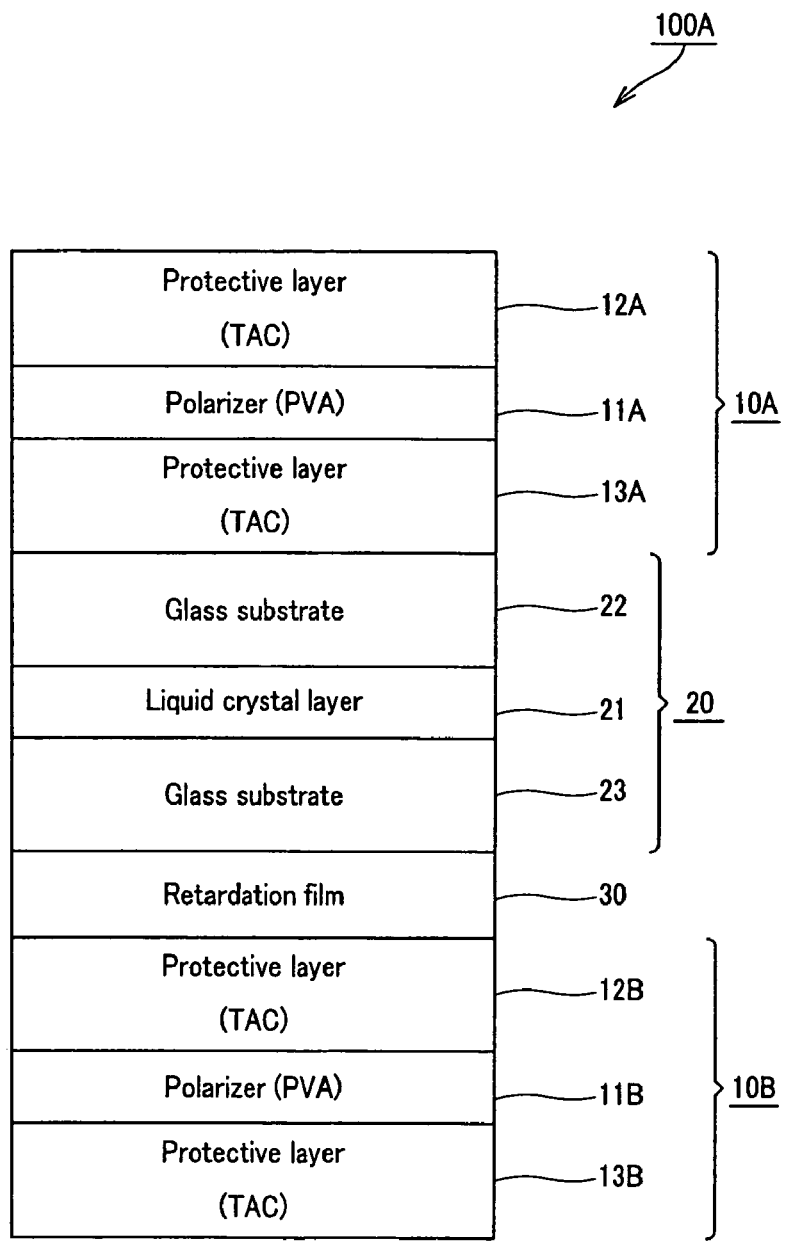
FIG. 8 is a schematic end elevation of an example of the substantial portion of the liquid crystal display device according to the present invention.

According to the present invention, a biaxial retardation film 30 which shows a refractive index of nx>nz>ny(nz=(nx+ny)/2); nz is the refractive index in the direction of thickness, nx is maximum refractive index in a plane perpendicular to the thickness direction and ny is the refractive index in a direction perpendicular to a direction for the maximum refractive index nx and thickness direction for a refractive index nz) in this order is disposed between the liquid crystal plate 20 and polarization plate-protective layers 12B as in the liquid crystal display device 100A shown in FIG. 8, for example, to set the direction for the maximum refractive index nx parallel to the alignment direction of the liquid crystal layer 21.

On the assumption that the biaxial retardation film 30 has a thickness $d_{RF}$ and the plane-directional light path length difference $\Delta nd_{RF}$ of the biaxial retardation film 30 is defined as (nx−ny)·$d_{RF}$, the plane-directional light path length difference $\Delta nd_{RF}$ of the biaxial retardation film 30 is adjusted based on the light path length difference $\Delta nd_{TAC0}$ of the polarization plane-protective layers 13A and 12B.

FIG. 9 shows, in the Poincare-spherical geography, the polarization of light incident in a direction of 45 deg. and having passed through various members in the liquid crystal display device 100A in FIG. 8, in which FIG. 9A shows the polarization of the light having passed through the polarizer 11A in the incident-side polarization plate 10A, FIG. 9B shows the polarization of the light having passed through the protective layer 13A in the incident-side polarization plate 10A, FIG. 9C shows the polarization of the light having passed through the IPS liquid crystal layer 21 in the liquid crystal plate 20, FIG. 19D shows the polarization of the light having passed through the biaxial retardation film 30, and FIG. 9E shows the polarization of the light having passed through the protective layer 13B in the outgoing-side polarization plate 10B.

In the liquid crystal display device 100A, on the assumption that the refractive index in the direction of thickness is nz, maximum refractive index in a plane perpendicular to the thickness direction is nx and refractive index in a direction perpendicular to a direction for the maximum refractive index nx and thickness direction for a refractive index nz is ny, the biaxial retardation film 30 showing a refractive index of nx>nz>ny (nz=(nx+ny)/2) in this order defines a coordinate axis S2 in the Poincare-spherical geography in FIG. 9. Therefore, the polarization can be converted into symmetrical points with respect to a plane passing through coordinate axes S2 and S3 by appropriately adjusting the phase difference of the biaxial retardation film 30. Thereafter, the negative phase difference of the protective layer 13B in the outgoing-side polarization plate restores the polarization to the equator of the Poincare sphere and the polarization is made in the direction of the absorption axis of the polarizer 11B in the outgoing-side polarization plate.

The optimum light path length difference $\Delta nd_{RF}$ of the biaxial retardation film 30 can be expressed as a function of the light path length difference $\Delta nd_{TAC0}$ of the polarization plate-protective layers 13A and 12B as given by the following equation (3):

$$\Delta nd_{RF} = \frac{\lambda}{2\pi}\left\{\pi - 2\tan^{-1}\left[\frac{\frac{2\pi}{\lambda}\Delta nd_{TAC}(\theta)}{2\cdot\phi(\theta)}\right]\right\} \quad (3)$$

Note here that using the aforementioned equations (1) and (2), the equation (3) can be changed into the following equation (4):

$$\frac{\Delta nd_{TAC}(\theta)}{2\cdot\phi(\theta)} = \Delta nd_{TAC0}\frac{\sin^2(\theta)}{2\cdot\cos(\theta)\{\frac{\pi}{4}-\tan^{-1}[\cos(\theta)]\}} \quad (4)$$

Figure 10:
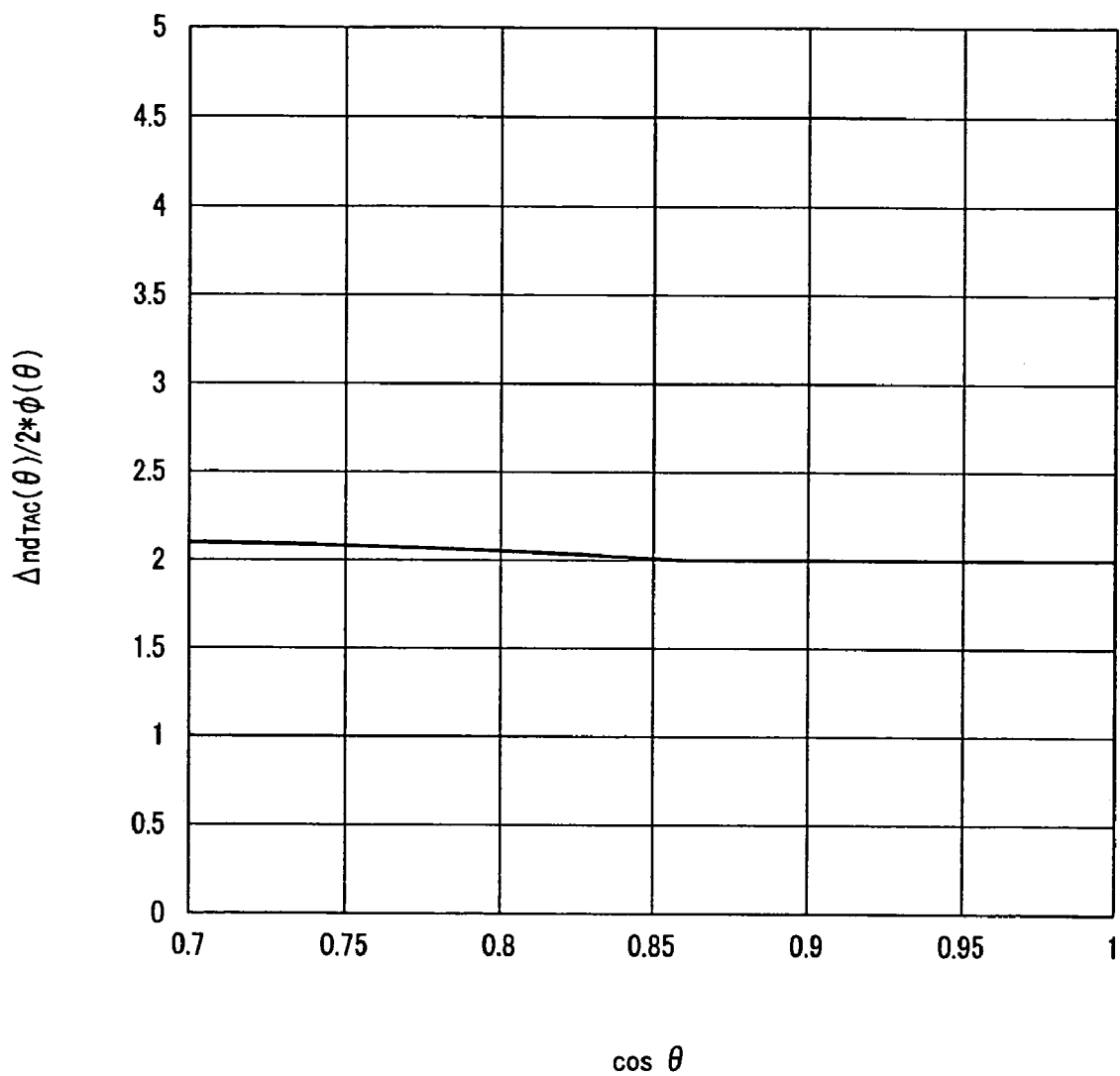
FIG. 10 explains the relation between an optimum Δnd of the biaxial retardation film and incident angle in the liquid crystal display device in FIG. 8.

The relation between a part "$\sin^2(\theta)/(2\cos(\theta)(\pi/4-\tan(\cos(\theta)))$" of the above equation (4) and an incident angle θ was examined and the result of examination is shown in FIG. 10, which shows that the part in consideration is generally constant independently of the incident angle θ and approximately 2 when θ=0. With this value put in the equation (3), the optimum plane-directional light path length difference Δnd of the biaxial retardation film 30 takes a value independent of the incident angle θ and it can be given by the following equation (5):

$$\Delta nd_{RF} = \frac{\lambda}{2\pi}\left[\pi - 2\tan^{-1}\left(\frac{4\pi}{\lambda}\Delta nd_{TAC0}\right)\right] \quad (5)$$

Figure 11:
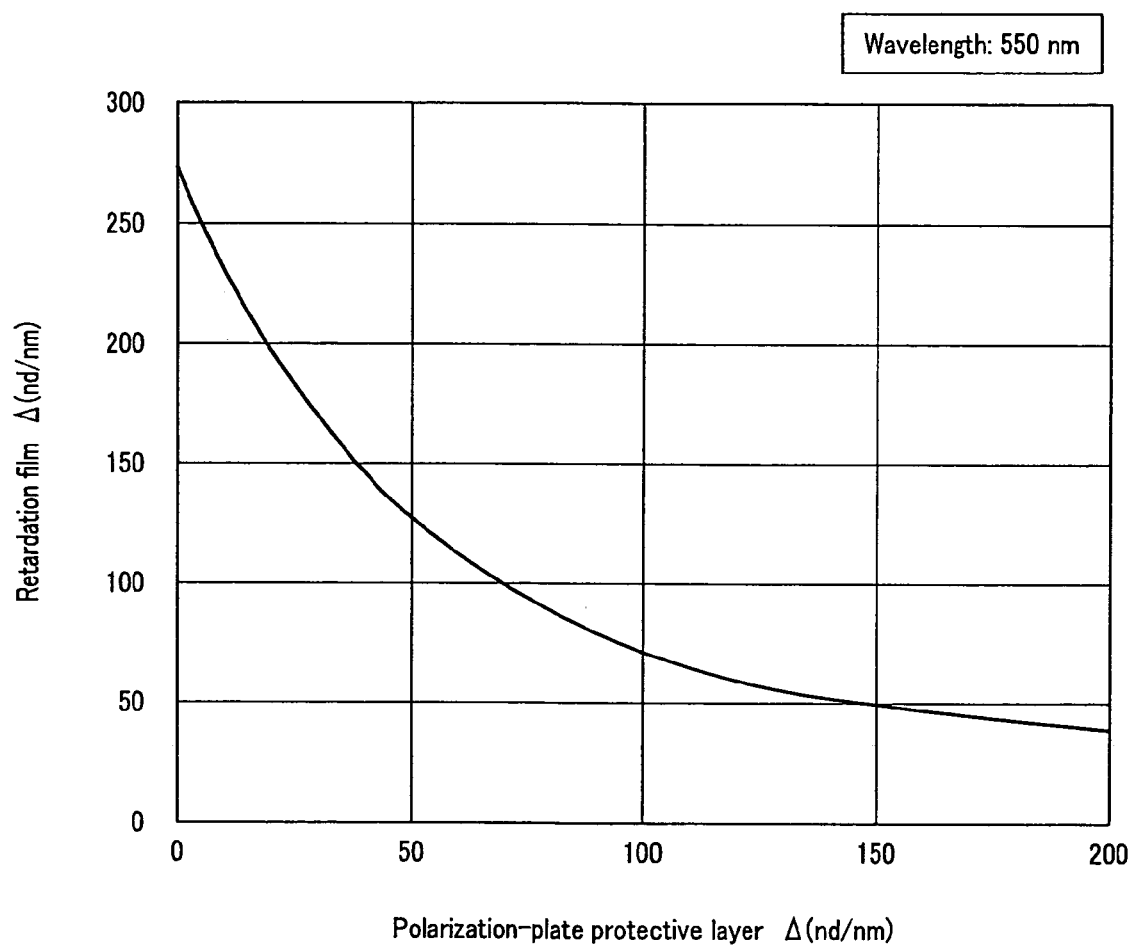
FIG. 11 shows the relation between Δnd of the protective layers and Δnd of the biaxial retardation film in the liquid crystal display device.

FIG. 11 shows the relation between the light path length difference $\Delta nd_{TAC0}$ of the polarization plate-protective layers 13A and 12B and optimum light path length difference $\Delta nd_{RF}$ of the biaxial retardation film 30. Thus, the viewing-angle dependence of the polarization plate-protective layers 13A and 12B upon incident light forming an angle θ with a viewing-angular direction can be compensated optically by using the biaxial retardation film 30.

Next, there will be described a second method of optimizing the retardation film for an improved black level at a viewing angle of 45 deg. in the liquid crystal display 100 configured as above.

The aforementioned first method of optimizing the retardation film is intended for optimizing the retardation film 30 for an improved black level at a predetermined wavelength in the direction of 45 deg. The method of optimizing the retardation film 30 for an improved black level in a wider range of wavelength will be described herebelow.

In the following description, it will be assumed that the abnormal light refractive index of liquid crystal molecules of the liquid crystal layer 21 is ne, normal light refractive index is no, refractive index difference Δn of the liquid crystal layer 21 is (ne−no) and the light path length difference $\Delta nd_{LC}$ of the liquid crystal layer 21 is (ne−no)·$d_{LC}$.

As having been described in the foregoing, the liquid crystal layer 21 functions as a λ/2 plate with a predetermined wavelength. However, the material of the liquid crystal layer 21 (liquid crystal molecules) shows a wavelength dispersion with the refractive index difference Δn. The shorter the wavelength, the larger the refractive index difference Δn will be. Since the phase difference is given by $2\pi/\lambda \cdot \Delta nd_{LC}$, the shorter the wavelength, the larger the phase difference will be. That is, in case the phase difference is set to π with the wavelength of green (G) light, for example, the phase difference will be larger than π with the wavelength of blue (B) light and smaller than π with the wavelength of red (R) light.

The wavelength dispersion of the retardation film 20 is similar to that of the liquid crystal.

The light having passed through the protective layer 13A in the incident-side polarization plate is polarized on the northern hemisphere in the Poincare-spherical geography under the conditions in the first optimizing method, as shown in FIG. 12. However, light having passed through the liquid crystal layer 21 and having a wavelength whose phase difference being π clockwise about the delay-phase axis on the equator is polarized in a position on the southern hemisphere, 180 deg. turned symmetrically from that on the northern hemisphere. Light having a shorter wavelength is polarized in a size larger than that at 180 deg., and light having a longer wavelength is polarized in a size smaller than that at 180 deg.

FIG. 12A shows the polarization of the light having passed through the polarizer 11A in the incident-side polarization plate 10A, FIG. 12B shows the polarization of the light having passed through the protective layer 13A in the incident-side polarization plate 10A, FIG. 12C shows the polarization of the light having passed through the IPS liquid crystal layer 21 in the liquid crystal plate 20, FIG. 12D shows the polarization of the light having passed through the biaxial retardation film 30, and FIG. 12E shows the polarization of the light having passed through the protective layer 13B in the outgoing-side polarization plate 10B.

Next, the polarization of the light having passed through the biaxial retardation film 30 will be discussed. Since the alignment direction of the liquid crystal layer 21 is set to be the same as a direction nx (for the maximum refractive index), the light is also polarized in a position clockwise turned about the coordinate axis S2. Light having a designed wavelength will be polarized in a position symmetrically turned about the S2-S3 plane. Light having a wavelength shorter than that having the designed one will be polarized in a position turned through a larger angle, and light having a wavelength longer than the designed one will be polarized in a position turned through a smaller angle. Light having a wavelength largely different from the designed one will be polarized with a sum of a deviation of the polarization of the light having passed through the liquid crystal layer 21 and a deviation of the polarization of the light having passed through the biaxial retardation film 30, resulting in a larger light leakage.

For compensation of the above deviation of polarization in a wide range of wavelength, the biaxial retardation film 30 is set such that the refractive index will be nx in a direction perpendicular to the alignment direction of the liquid crystal layer 21. In this case, the optimum light path length difference $\Delta nd_{RF}$ of the biaxial retardation film 30 is given by the following equation (6):

$$\Delta nd_{RF} = \frac{\lambda}{2\pi}\left[\pi + 2\tan^{-1}\left(\frac{4\pi}{\lambda}\Delta nd_{TAC0}\right)\right] \quad (6)$$

This second optimizing method can be illustrated in the Poincare-spherical geography as shown in FIG. 13. FIG. 13A shows the polarization of the light having passed through the polarizer 11A in the incident-side polarization plate 10A, FIG. 13B shows the polarization of the light having passed through the protective layer 13A in the incident-side polarization plate 10A, FIG. 13C shows the polarization of the light having passed through the IPS liquid crystal layer 21 in the liquid crystal plate 20, FIG. 13D shows the polarization of the light having passed through the biaxial retardation film 30, and FIG. 13E shows the polarization of the light having passed through the protective layer 13B in the outgoing-side polarization plate 10B.

More particularly, light having the designed wavelength and having passed through the liquid crystal layer 21 is polarized in a position turned by π. However, light having a wavelength shorter than the designed one is polarized in a position turned by larger than π while light having a wavelength longer than the designed one is polarized in a position turned by smaller than π. Then, the polarization is made in a position counterclockwise in a direction opposite to the liquid crystal layer 21 because the lead-phase axis of the biaxial retardation film 30 serves as the coordinate axis S2. Light having the designed wavelength will be polarized in the same position as in the first optimizing method. Since light having a wavelength shorter than the designed one is polarized in a position turned through a large angle while light having a wavelength longer than the designed one is polarized in a position turned through a small angle, the deviation of the light having passed through the liquid crystal layer 21 is corrected. Therefore, the compensation can be made in a wide range of wavelength.

Also, the relation between thickness of the polarization plate-protective layer and viewing angle will be explained below:

Whether the light path length difference $\Delta nd_{TAC0}$ of the polarization plate-protective layers 13A and 12B is large or small, it can be compensated of light having a predetermined wavelength only at a viewing angle in a direction of 45 deg. However, the light path length difference $\Delta nd_{TAC0}$ of the polarization plate-protective layers 13A and 12B should desirably be smaller for an improved visibility of light of a wide range of wavelength at a viewing angle in other than 45 deg. Many of large LCDs use protective layers of 80 μm in thickness ($\Delta nd$ of 50 nm), and also protective layers of 40 μm ($\Delta nd$ of 30 nm) as well in applications in which major consideration is given to the thickness and weight of the LCD display. The LCD performance can be improved using polarization plates each protected by thinner protective layers.

Also, the relation between the LCD performance and pretilt angle will be explained below:

The LCD performance changes depending upon the magnitude and direction of the pretilt angle of the liquid crystal molecules in the liquid crystal layer 21. In case the liquid crystal molecules are aligned within a range of 90 to 270 deg., the LCD performance in the first quadrant is generally the same as that in the second quadrant, while the LCD performance in the third quadrant is generally the same as that in the fourth quadrant. For improvement of the LCD performance in all directions, the pretilt angle should desirably be smaller.

Further, the relation between the LCD performance and light path length difference $\Delta nd_{LC}$ of the liquid crystal layer will be described below:

The light path length difference $\Delta nd_{LC}$ of the liquid crystal layer 21 has an influence on the black level of light having other wavelength than the designed one. The spectral transmittance of light having a longer wavelength can be made relatively higher by setting a shorter designed wavelength, and the chromaticity of the black level can be adjusted by making the spectral transmittance of light having a shorter wavelength relatively lower. The "designed wavelength" is a wavelength at which the light path length difference $\Delta nd_{LC}$ of the liquid crystal layer 21 meets the condition π/2.

Next, the selection of either the first or second optimizing method will be described below:

Generally, the second optimizing method enables optical compensation of the polarizers in a wider range of wavelength than by the first optimizing method as having been described in the foregoing. In actual designing a liquid crystal display device, however, either the first or second optimizing method should be selected taking account of which method contributes to the easier production of the retardation film 30 and easier attachment of the retardation film 30 to the polarization plate 10B.

Generally, the larger the light path length difference $\Delta nd_{RF}$ of the biaxial retardation film 30, the more difficult it is to produce the retardation film 30. With the second optimizing method, the light path length difference $\Delta nd_{RF}$ is larger than with the first optimizing method. Thus, the retardation film 30 will be difficult to produce or the light path length difference $\Delta nd_{RF}$ will be uneven.

Here, there will be the attachment of the biaxial retardation film 30 and polarization plate 10B to each other. When the second optimizing method is applied, the polarization plate 10B and retardation film 30 are drawn in the same direction. However, when the first optimizing method is used, they are drawn in different directions perpendicular to each other.

Thus, the second optimizing method should desirably be used from the viewpoint of production as far as the attachment of the polarization plate 10B and retardation film 30 is concerned. In case the biaxial retardation film 30 can only be produced to have a light path length difference $\Delta nd_{RF}$ being smaller than a target value, it may be formed from a plurality of retardation films to adjust the light path length difference to the target value.

Here, there will be described embodiments 1 to 9 of the liquid crystal display device 100A including the incident-side polarization plate 10A, liquid crystal plate 20, retardation film 30 and outgoing-side polarization plate 10B laid in this order as shown in FIG. 8.

Embodiment 1

According to the embodiment 1, the liquid crystal display device 100A was configured to meet the following conditions:
Direction of absorption axis of incident-side polarization plate: 90 deg.
Alignment direction of liquid crystal layer: 90 deg.
Direction of biaxial retardation film for maximum refractive index nx: 90 deg.
Direction of absorption axis of outgoing-side polarization plate: 0 deg.
Designed wavelength: 550 nm
$\Delta nd_{LC}$ of liquid crystal layer: 275 nm
Pretilt angle of liquid crystal layer: 2 deg. (direction in which the liquid crystal particles are aligned on the lower polarization plate in the direction of 90 deg.)
$\Delta nd_{RF}$ of biaxial retardation film: 126 nm (ZEONOR)
Refractive index ratio of biaxial retardation film: nz=(nx+ny)/2
Material of polarization plate-protective layer: TAC
$\Delta nd_{TAC0}$ of protective layer: 50 nm (optical axis is perpendicular to plane; plane-directional $\Delta nd$>thickness-directional $\Delta nd$)

Figure 14:
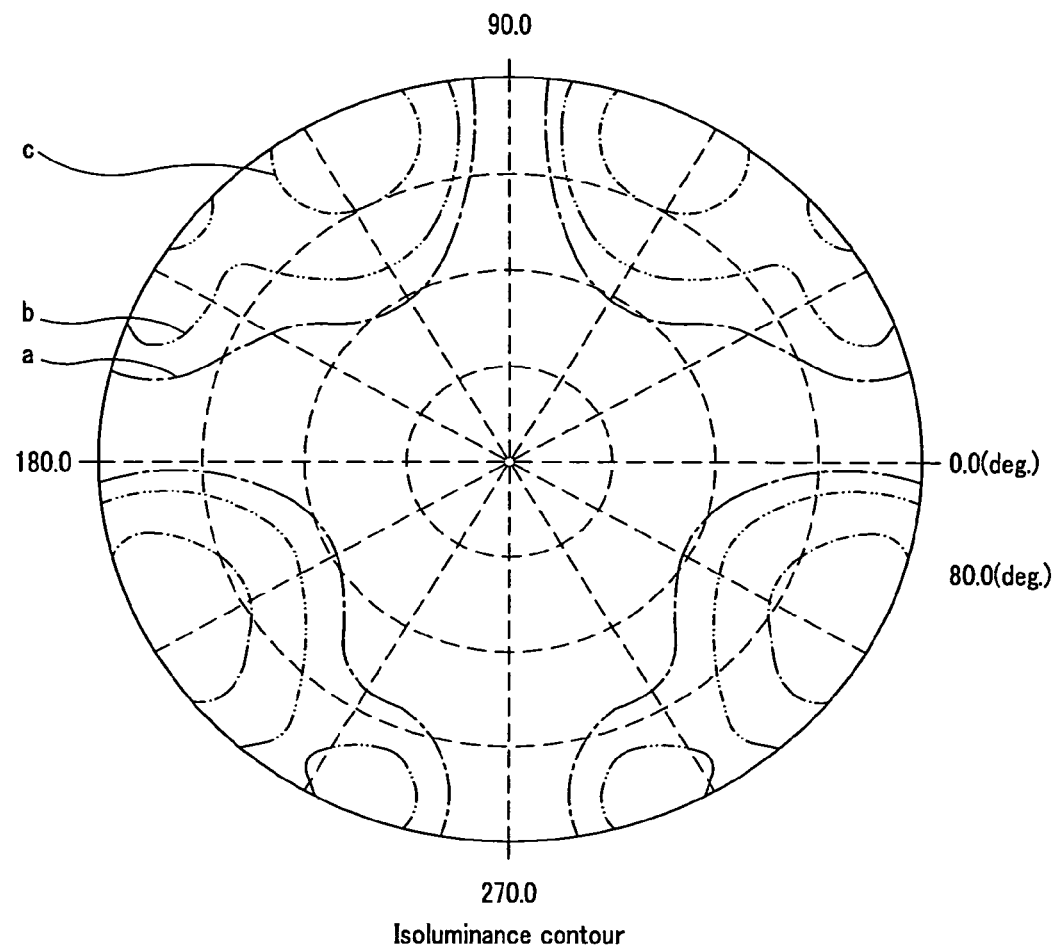
FIG. 14 shows a viewing angle characteristic at a black-display level in a first embodiment of the liquid crystal display device in FIG. 8.
Figure 15:
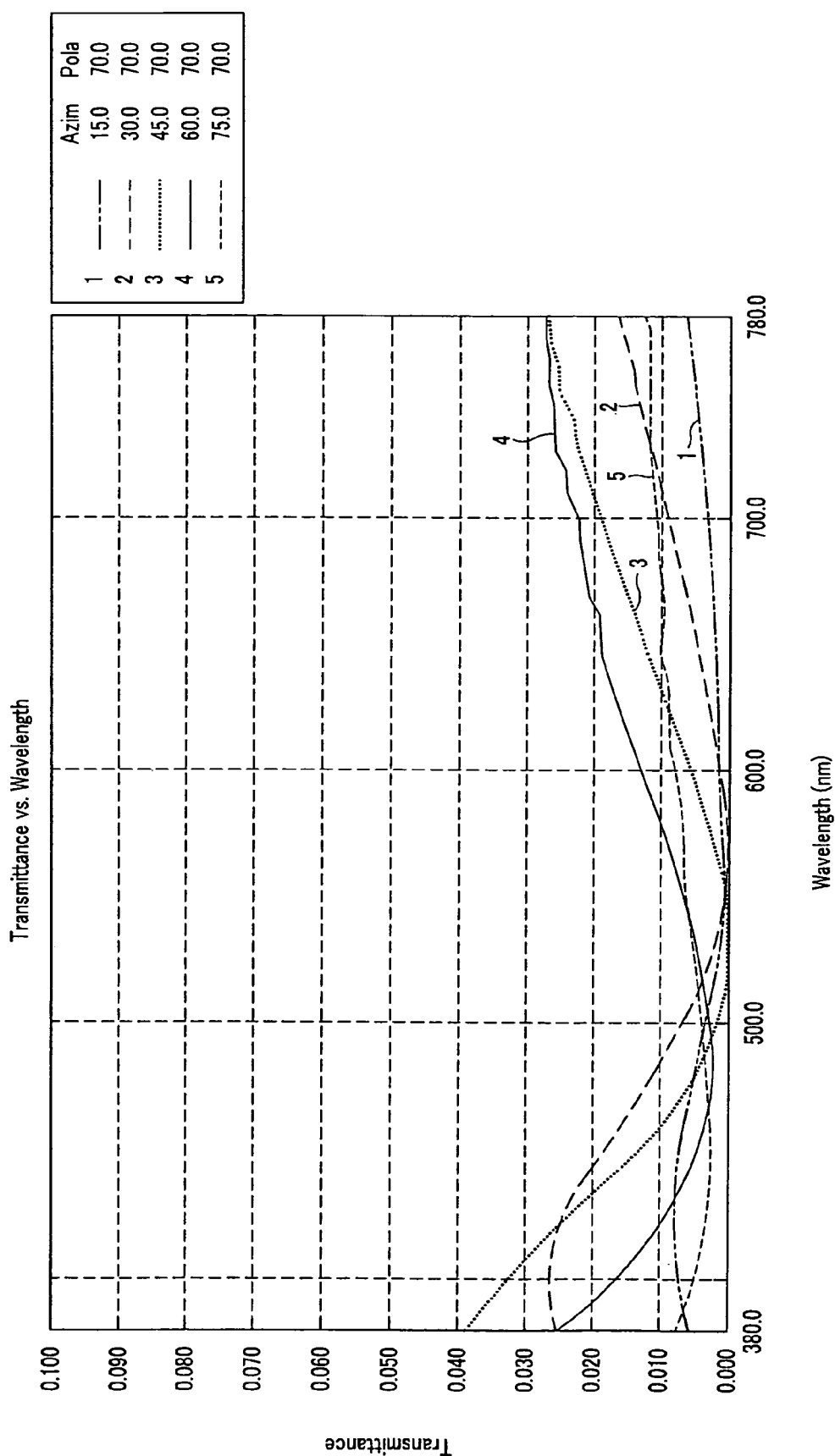
FIG. 15 shows black-level spectral transmittance at a viewing angle Pola (elevation angle) of 70 deg. and each of azimuths Azim of 15, 30, 45, 60 and 75 deg. in the first embodiment.
Figure 16:
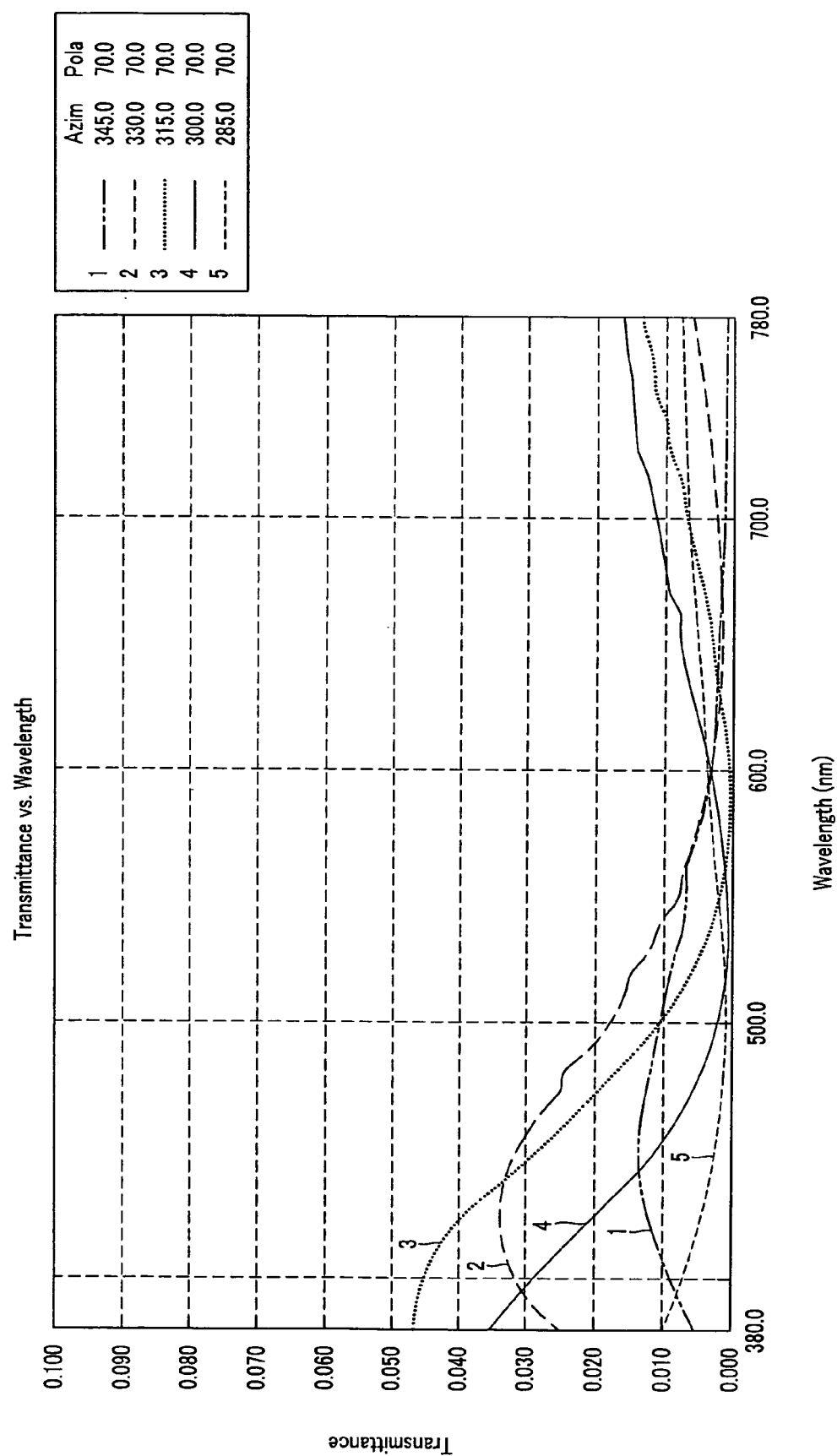
FIG. 16 shows black-level spectral transmittance at a viewing angle Pola (elevation angle) of 70 deg. and each of azimuths Azim of 345, 330, 315, 300 and 285 deg. in the first embodiment.

In this embodiment 1, the viewing angle characteristic at a black-display level is as shown in FIG. 14, the black-level spectral transmittance at a viewing angle Pola (elevation angle) of 70 deg. and each of azimuths Azim of 15, 30, 45, 60 and 75 deg. is shown as in FIG. 15, and the black-level spectral transmittance at a viewing angle Pola (elevation angle) of 70 deg. and each of azimuths Azim of 345, 330, 315, 300 and 285 deg. is shown as in FIG. 16. Note here that the azimuth Azim is a counterclockwise angle based on a viewing angle Pola of 0 deg. from the right side in the drawings.

Embodiment 2

According to the embodiment 2, the liquid crystal display device 100A was configured to meet the following conditions:
Direction of absorption axis of incident-side polarization plate: 90 deg.
Alignment direction of liquid crystal layer: 90 deg.
Direction of biaxial retardation film for maximum refractive index nx: 0 deg.
Direction of absorption axis of outgoing-side polarization plate: 0 deg.
Designed wavelength: 550 nm
$\Delta nd_{LC}$ of liquid crystal layer: 275 nm
Pretilt angle of liquid crystal layer: 2 deg. (direction in which the liquid crystal particles are aligned on the lower polarization plate in the direction of 90 deg.)
$\Delta nd_{RF}$ of biaxial retardation film: 423 nm (ZEONOR)

Refractive index ratio of biaxial retardation film: nz=(nx+ny)/2

Material of polarization plate-protective layer: TAC $\Delta nd_{TAC0}$ of protective layer: 50 nm (optical axis is perpendicular to plane; plane-directional $\Delta nd$>thickness-directional $\Delta nd$)

Figure 17:
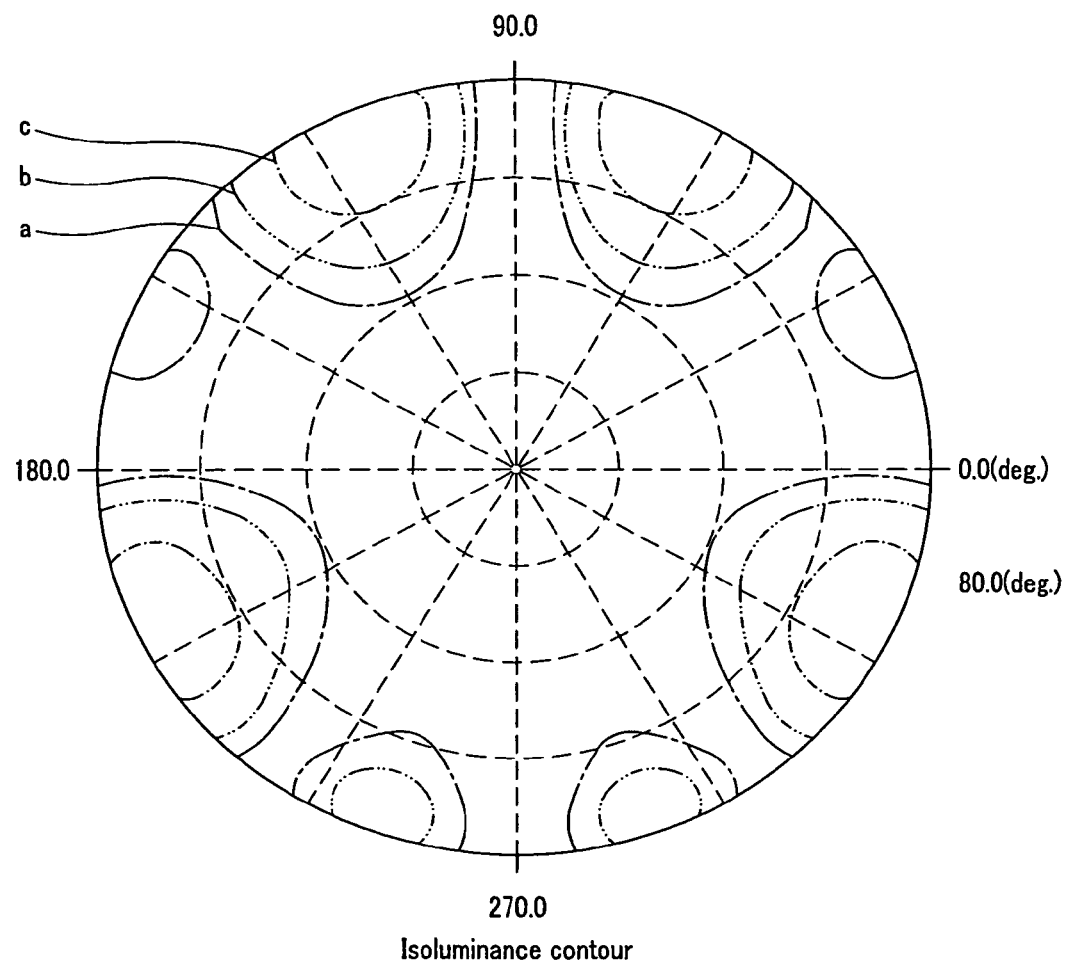
FIG. 17 shows a viewing angle characteristic at a black-display level in a second embodiment of the liquid crystal display device in FIG. 8.
Figure 18:
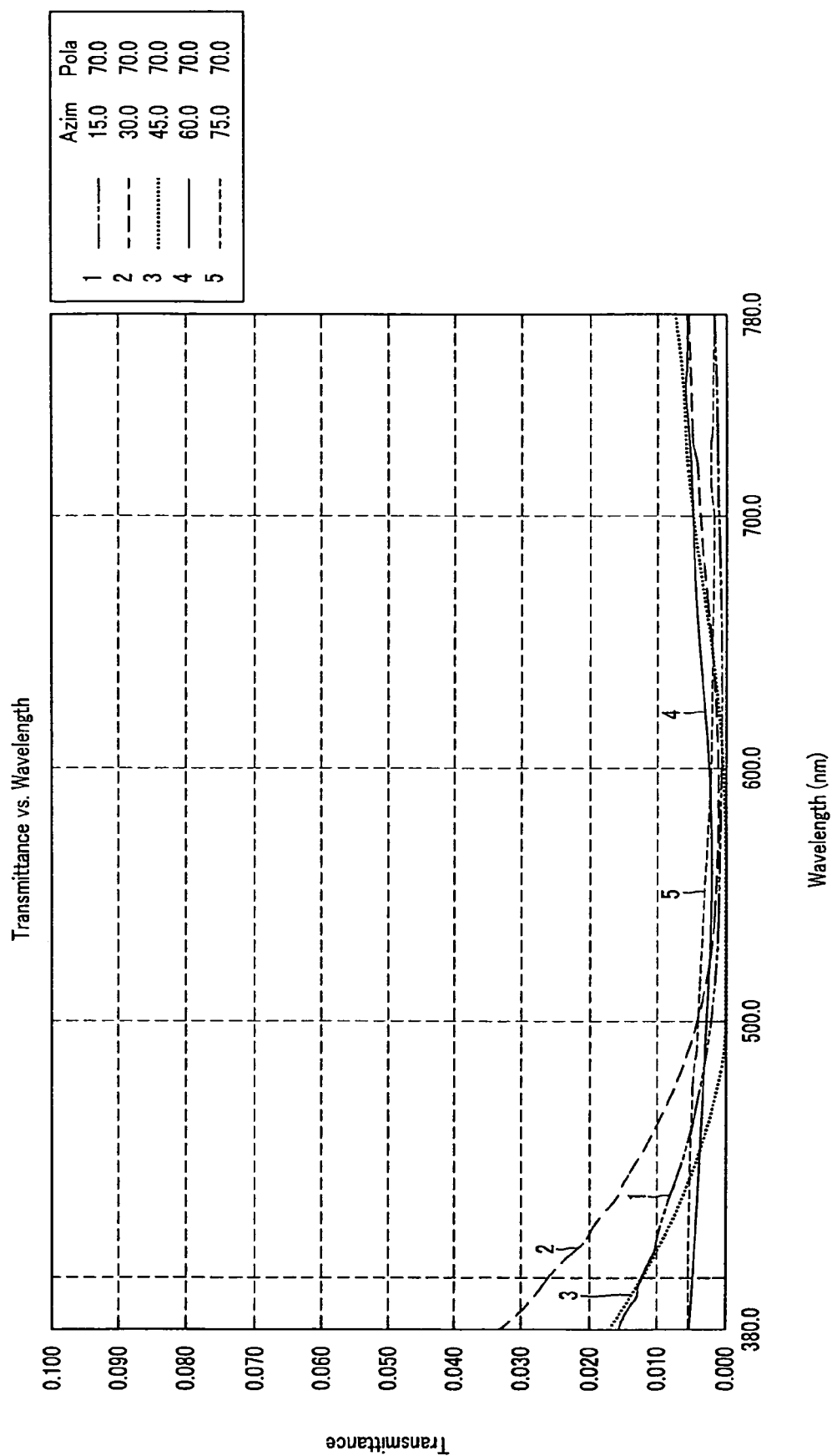
FIG. 18 shows black-level spectral transmittance at a viewing angle Pola (elevation angle) of 70 deg. and each of azimuths Azim of 15, 30, 45, 60 and 75 deg. in the second embodiment.
Figure 19:
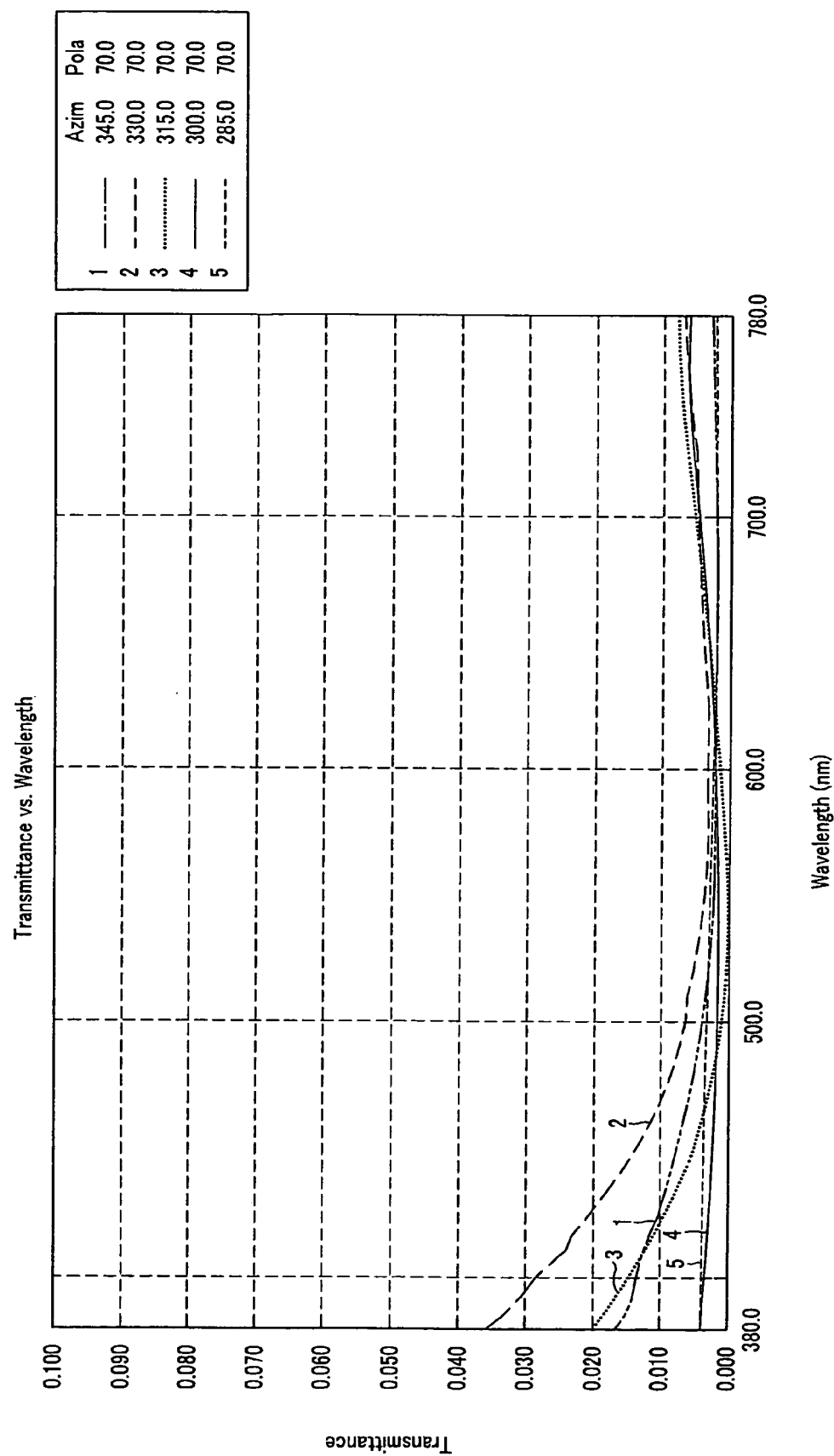
FIG. 19 shows black-level spectral transmittance at a viewing angle Pola (elevation angle) of 70 deg. and each of azimuths Azim of 345, 330, 315, 300 and 285 deg. in the second embodiment.

In this embodiment 2, the viewing angle characteristic at a black-display level is as shown in FIG. 17, the black-level spectral transmittance at a viewing angle Pola (elevation angle) of 70 deg. and each of azimuths Azim of 15, 30, 45, 60 and 75 deg. is shown as in FIG. 18, and the black-level spectral transmittance at a viewing angle Pola (elevation angle) of 70 deg. and each of azimuths Azim of 345, 330, 315, 300 and 285 deg. is shown as in FIG. 19. Note here that the azimuth Azim is a counterclockwise angle based on a viewing angle Pola of 0 deg. from the right side in the drawings.

Embodiment 3

According to the embodiment 3, the liquid crystal display device 100A was configured to meet the following conditions:

Direction of absorption axis of incident-side polarization plate: 90 deg.

Alignment direction of liquid crystal layer: 90 deg.

Direction of biaxial retardation film for maximum refractive index nx: 90 deg.

Direction of absorption axis of outgoing-side polarization plate: 0 deg.

Designed wavelength: 550 nm $\Delta nd_{LC}$ of liquid crystal layer: 275 nm

Pretilt angle of liquid crystal layer: 2 deg. (direction in which the liquid crystal particles are aligned on the lower polarization plate in the direction of 90 deg.)

$\Delta nd_{RF}$ of biaxial retardation film: 184 nm (ZEONOR)

Refractive index ratio of biaxial retardation film: nz=(nx+ny)/2

Material of polarization plate-protective layer: TAC $\Delta nd_{TAC0}$ of protective layer: 30 nm (optical axis is perpendicular to plane; plane-directional $\Delta nd$>thickness-directional $\Delta nd$)

Figure 20:
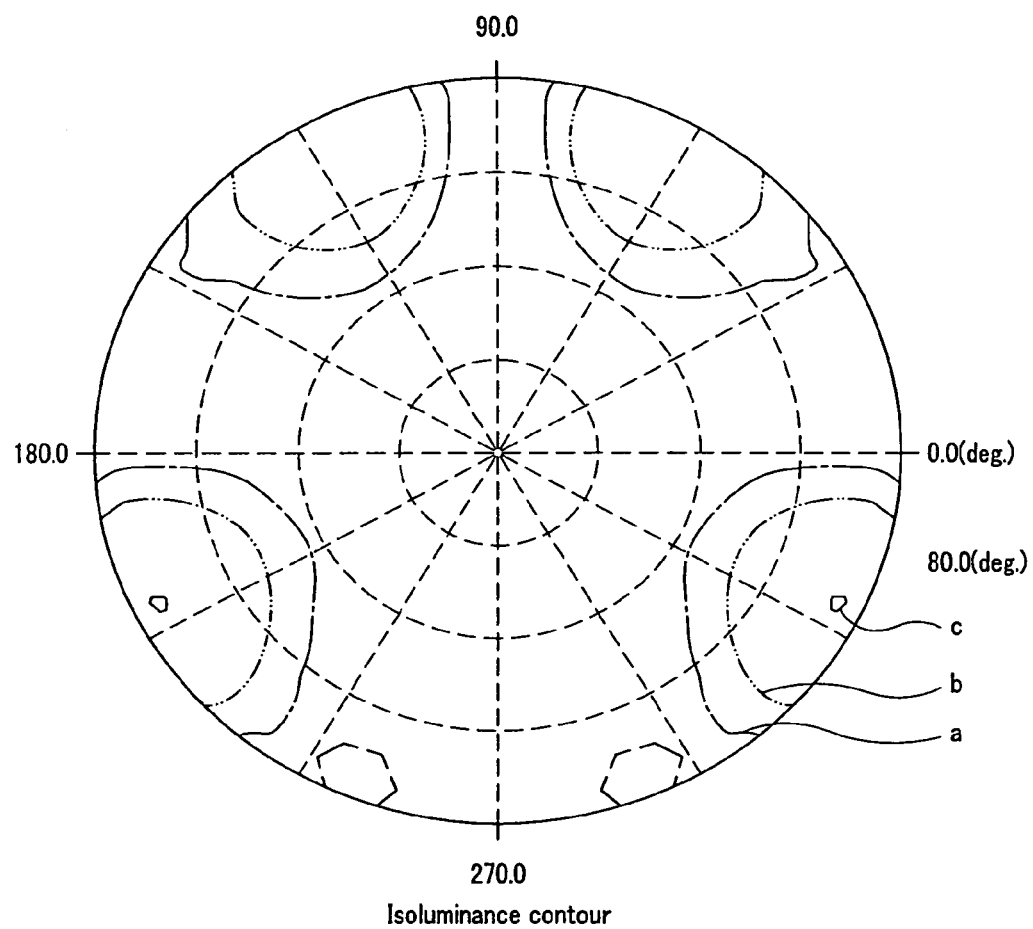
FIG. 20 shows a viewing angle characteristic at a black-display level in a third embodiment of the liquid crystal display device in FIG. 8.
Figure 21:
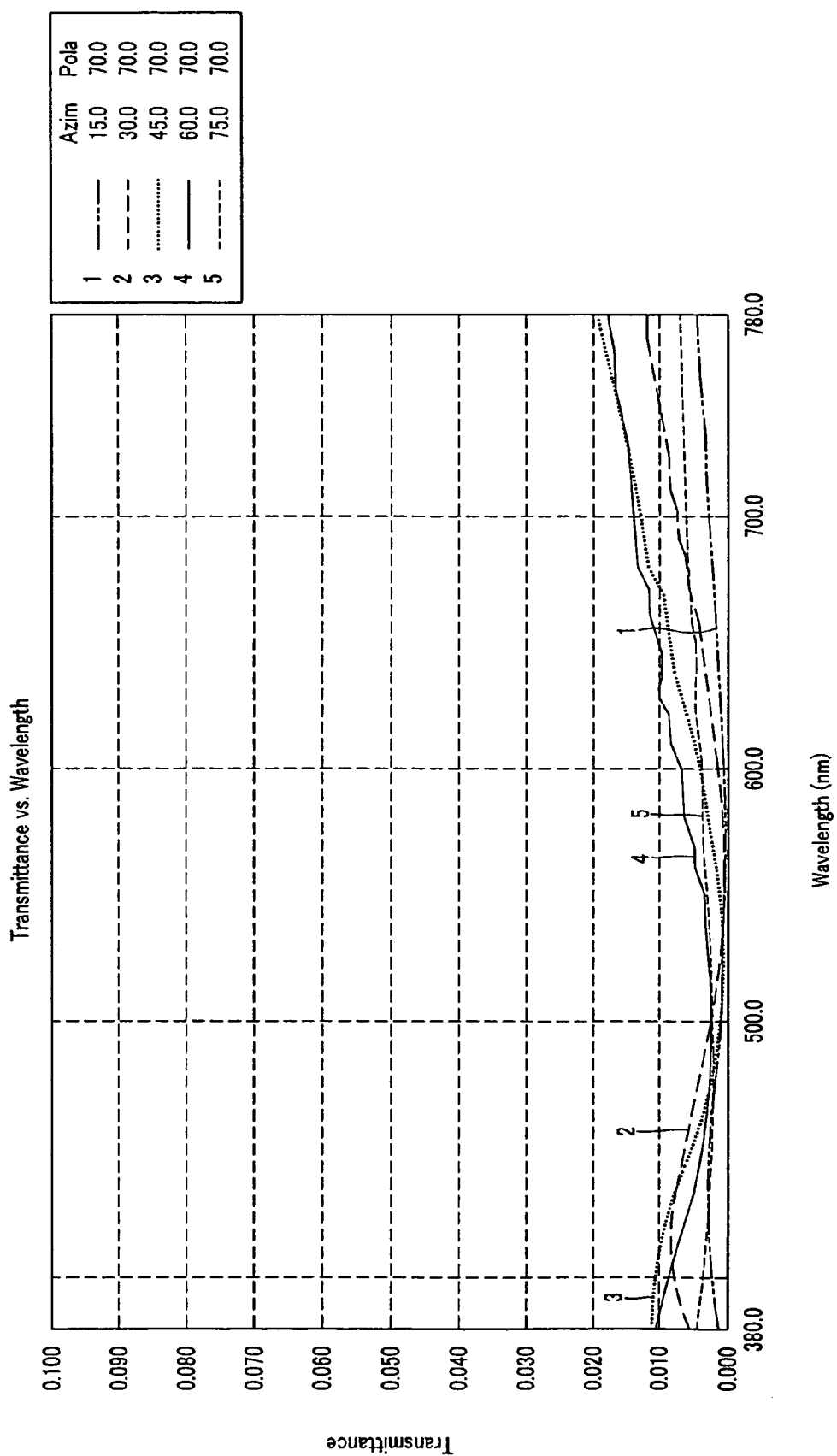
FIG. 21 shows black-level spectral transmittance at a viewing angle Pola (elevation angle) of 70 deg. and each of azimuths Azim of 15, 30, 45, 60 and 75 deg. in the third embodiment.
Figure 22:
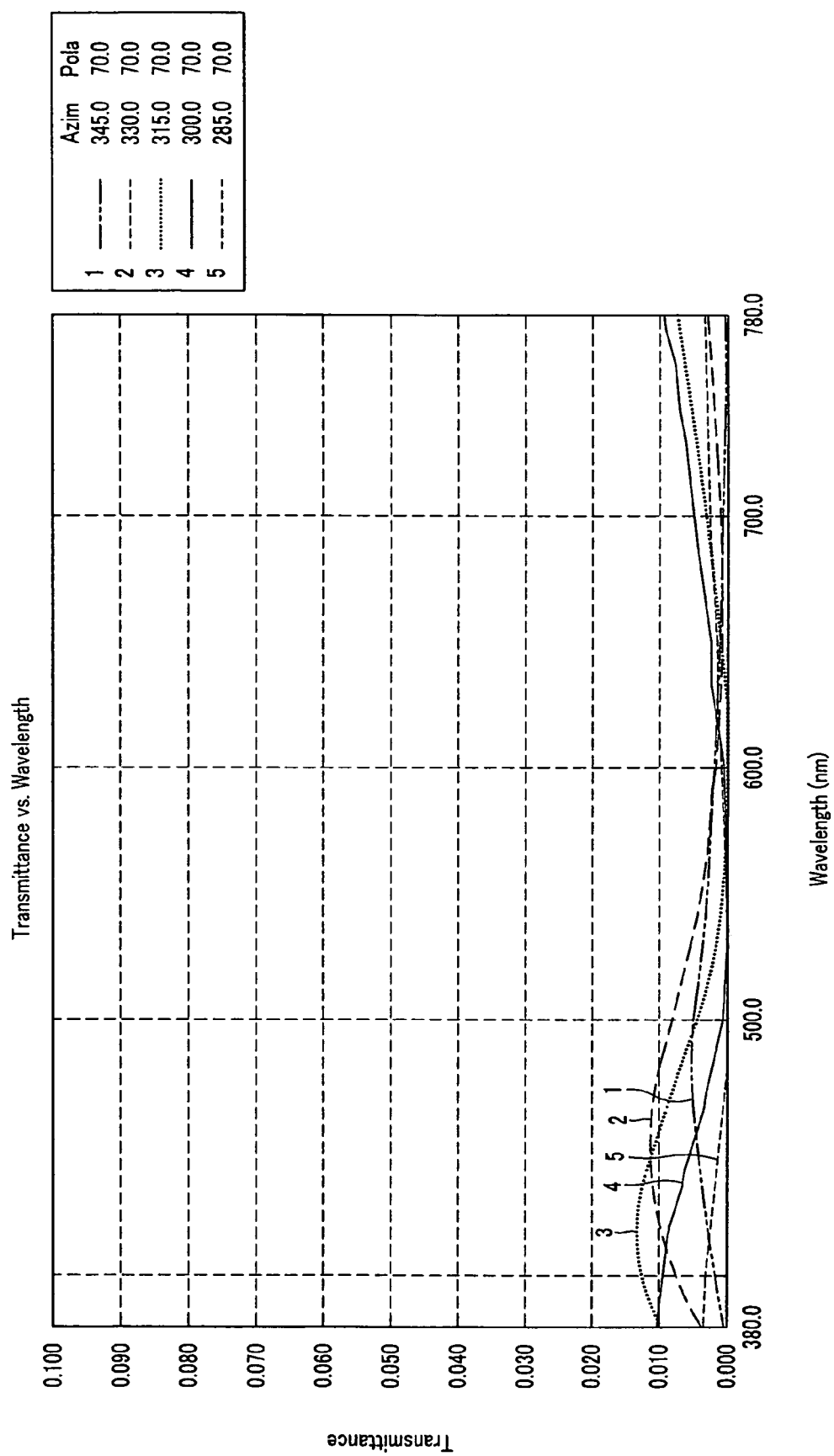
FIG. 22 shows black-level spectral transmittance of a black-display level at a viewing angle Pola (elevation angle) of 70 deg. and each of azimuths Azim of 345, 330, 315, 300 and 285 deg. in the third embodiment.
Figure 23:
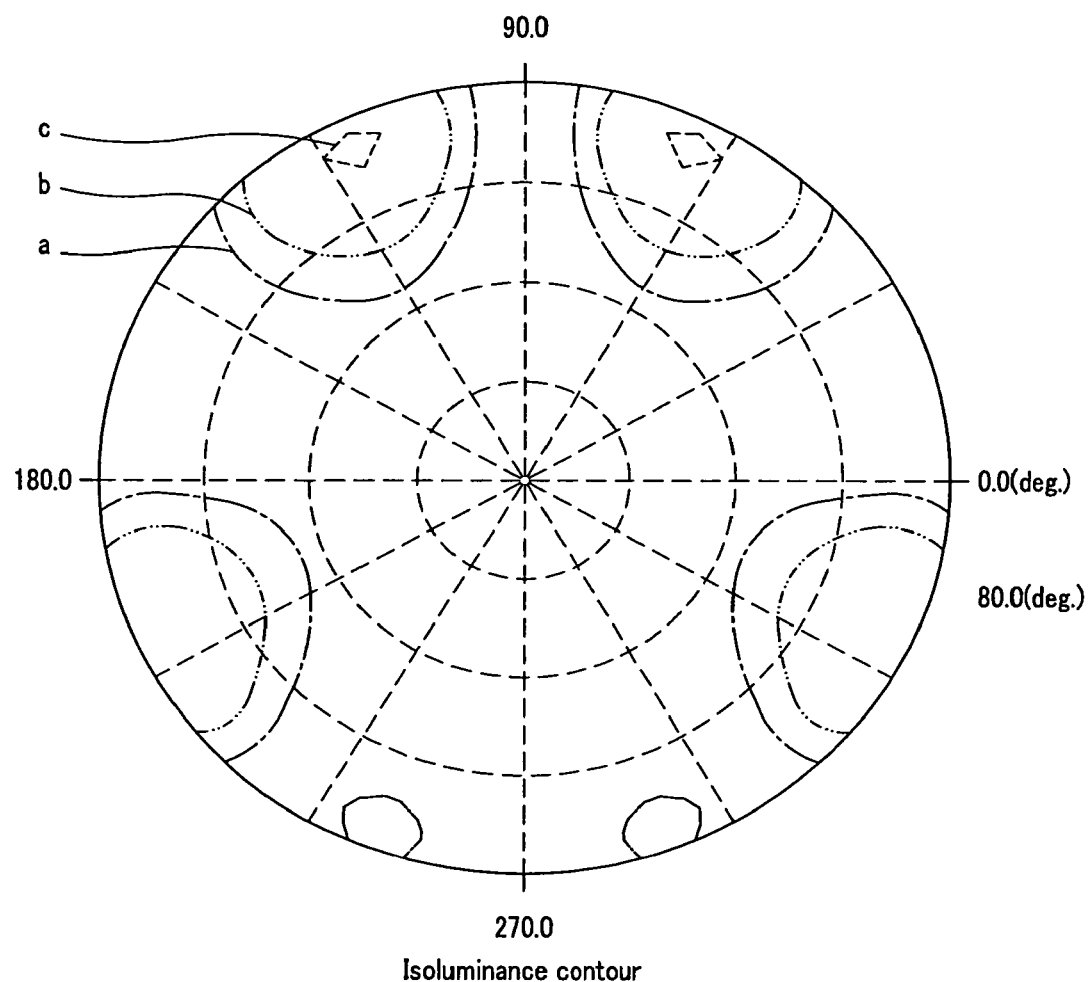
FIG. 23 shows a viewing angle characteristic at a black-display level in a fourth embodiment of the liquid crystal display device in FIG. 8.

In this embodiment 3, the viewing angle characteristic at a black-display level is as shown in FIG. 20, the black-level spectral transmittance at a viewing angle Pola (elevation angle) of 70 deg. and each of azimuths Azim of 15, 30, 45, 60 and 75 deg. is shown as in FIG. 21, and the black-level spectral transmittance at a viewing angle Pola (elevation angle) of 70 deg. and each of azimuths Azim of 345, 330, 315, 300 and 285 deg. is shown as in FIG. 22. Note here that the azimuth Azim is a counterclockwise angle based on a viewing angle Pola of 0 deg. from the right side in the drawings.

Embodiment 4

According to the embodiment 4, the liquid crystal display device 100A was configured to meet the following conditions:

Direction of absorption axis of incident-side polarization plate: 90 deg.

Alignment direction of liquid crystal layer: 90 deg.

Direction of biaxial retardation film for maximum refractive index nx: 0 deg.

Direction of absorption axis of outgoing-side polarization plate: 0 deg.

Designed wavelength: 550 nm $\Delta nd_{LC}$ of liquid crystal layer: 275 nm

Pretilt angle of liquid crystal layer: 2 deg. (direction in which the liquid crystal particles are aligned on the lower polarization plate in the direction of 90 deg.)

$\Delta nd_{RF}$ of biaxial retardation film: 366 nm (ZEONOR)

Refractive index ratio of biaxial retardation film: nz=(nx+ny)/2

Material of polarization plate-protective layer: TAC $\Delta nd_{TAC0}$ of protective layer: 30 nm (optical axis is perpendicular to plane; plane-directional $\Delta nd$>thickness-directional $\Delta nd$)

Figure 24:
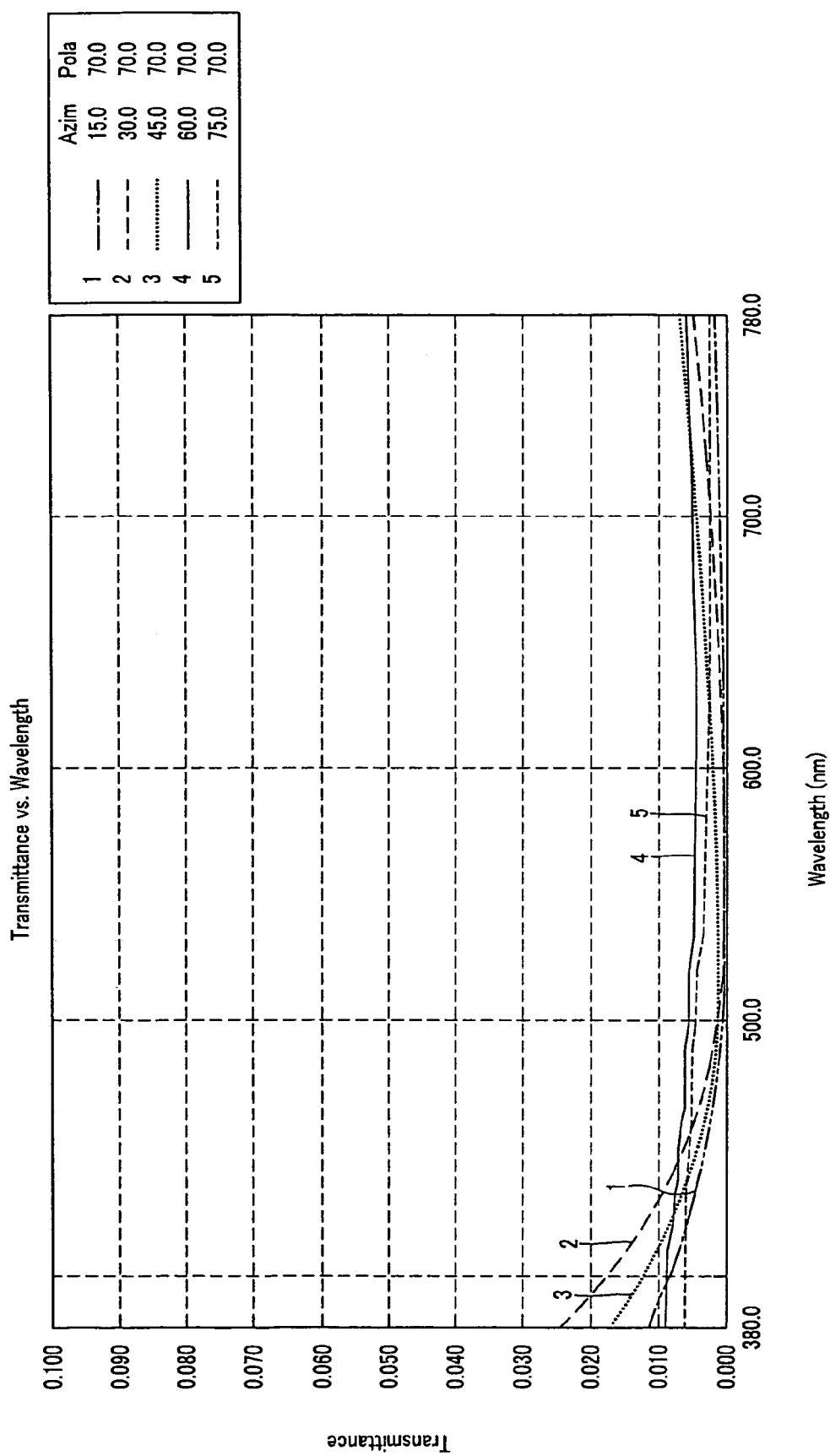
FIG. 24 shows black-level spectral transmittance at a viewing angle Pola (elevation angle) of 70 deg. and each of azimuths Azim of 15, 30, 45, 60 and 75 deg. in the fourth embodiment.
Figure 25:
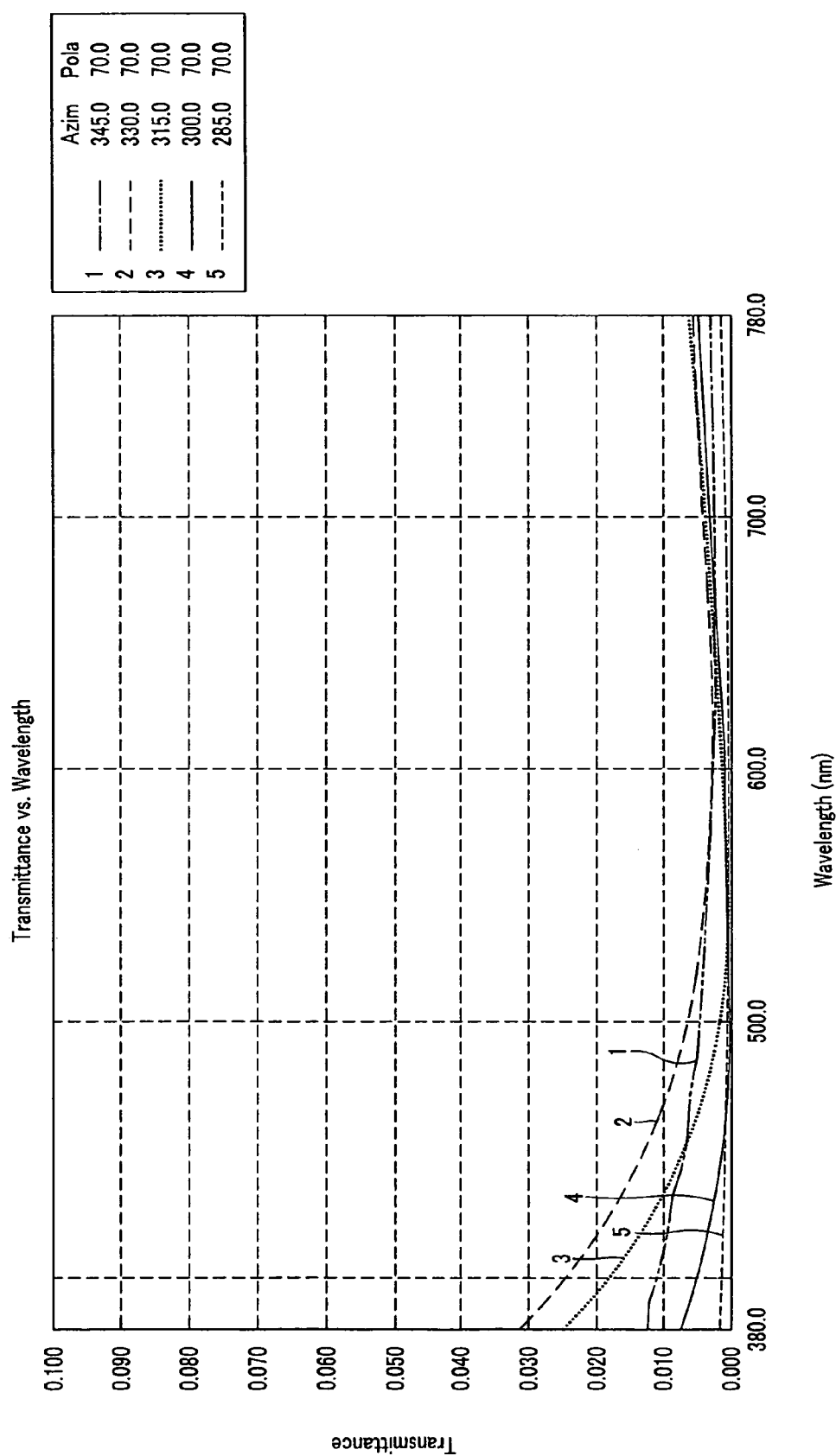
FIG. 25 shows black-level spectral transmittance at a viewing angle Pola (elevation angle) of 70 deg. and each of azimuths Azim of 345, 330, 315, 300 and 285 deg. in the fourth embodiment.

In this embodiment 4, the viewing angle characteristic at a black-display level is as shown in FIG. 20, the black-level spectral transmittance at a viewing angle Pola (elevation angle) of 70 deg. and each of azimuths Azim of 15, 30, 45, 60 and 75 deg. is shown as in FIG. 24, and the black-level spectral transmittance at a viewing angle Pola (elevation angle) of 70 deg. and each of azimuths Azim of 345, 330, 315, 300 and 285 deg. is shown as in FIG. 25. Note here that the azimuth Azim is a counterclockwise angle based on a viewing angle Pola of 0 deg. from the right side in the drawings.

Embodiment 5

According to the embodiment 5, the liquid crystal display device 100A was configured to meet the following conditions:

Direction of absorption axis of incident-side polarization plate: 90 deg.

Alignment direction of liquid crystal layer: 90 deg.

Direction of biaxial retardation film for maximum refractive index nx: 0 deg.

Direction of absorption axis of outgoing-side polarization plate: 0 deg.

Designed wavelength: 550 nm $\Delta nd_{LC}$ of liquid crystal layer: 275 nm

Pretilt angle of liquid crystal layer: 0.5 deg. (direction in which the liquid crystal particles are aligned on the lower polarization plate in the direction of 90 deg.)

$\Delta nd_{RF}$ of biaxial retardation film: 366 nm (ZEONOR)

Refractive index ratio of biaxial retardation film: nz=(nx+ny)/2

Material of polarization plate-protective layer: TAC $\Delta nd_{TAC0}$ of protective layer: 30 nm (optical axis is perpendicular to plane; plane-directional $\Delta nd$>thickness-directional $\Delta nd$)

Figure 26:
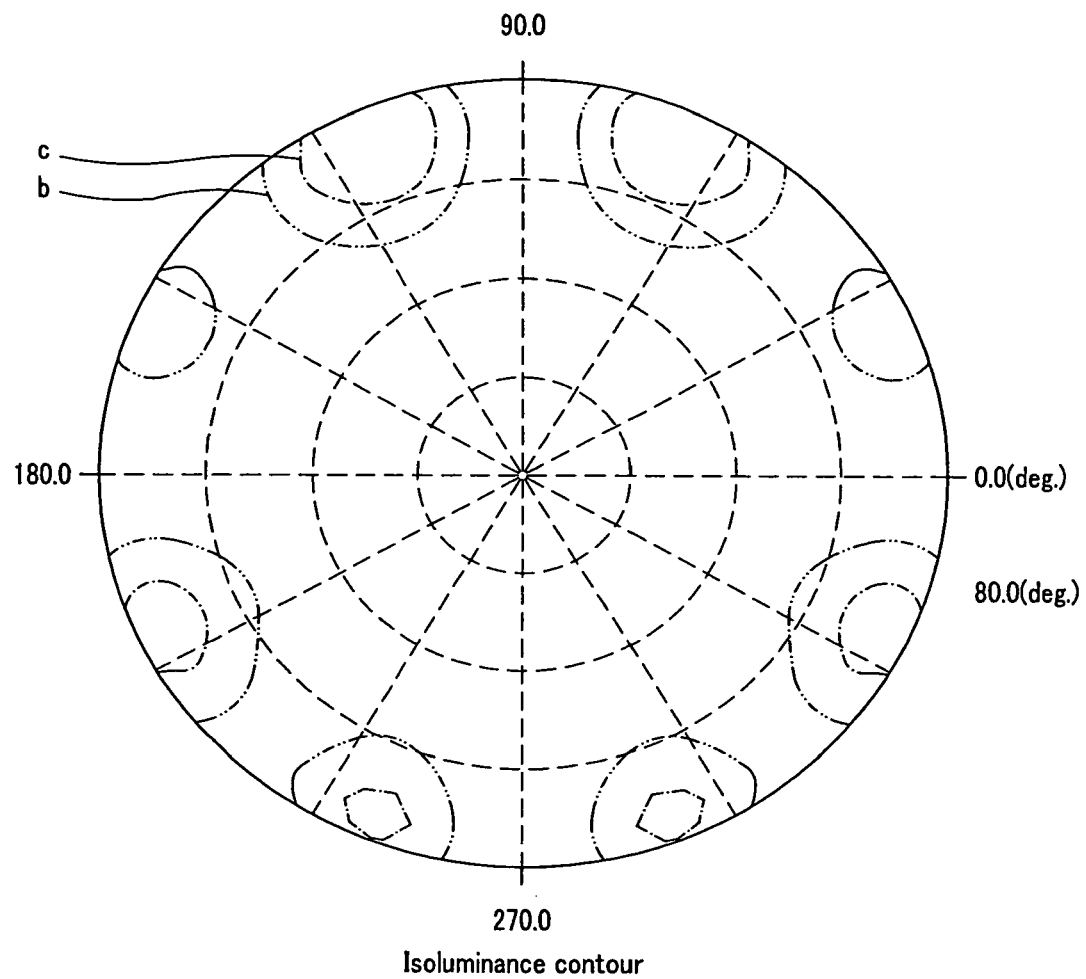
FIG. 26 shows a viewing angle characteristic at a black-display level in a fifth embodiment of the liquid crystal display device in FIG. 8.
Figure 27:
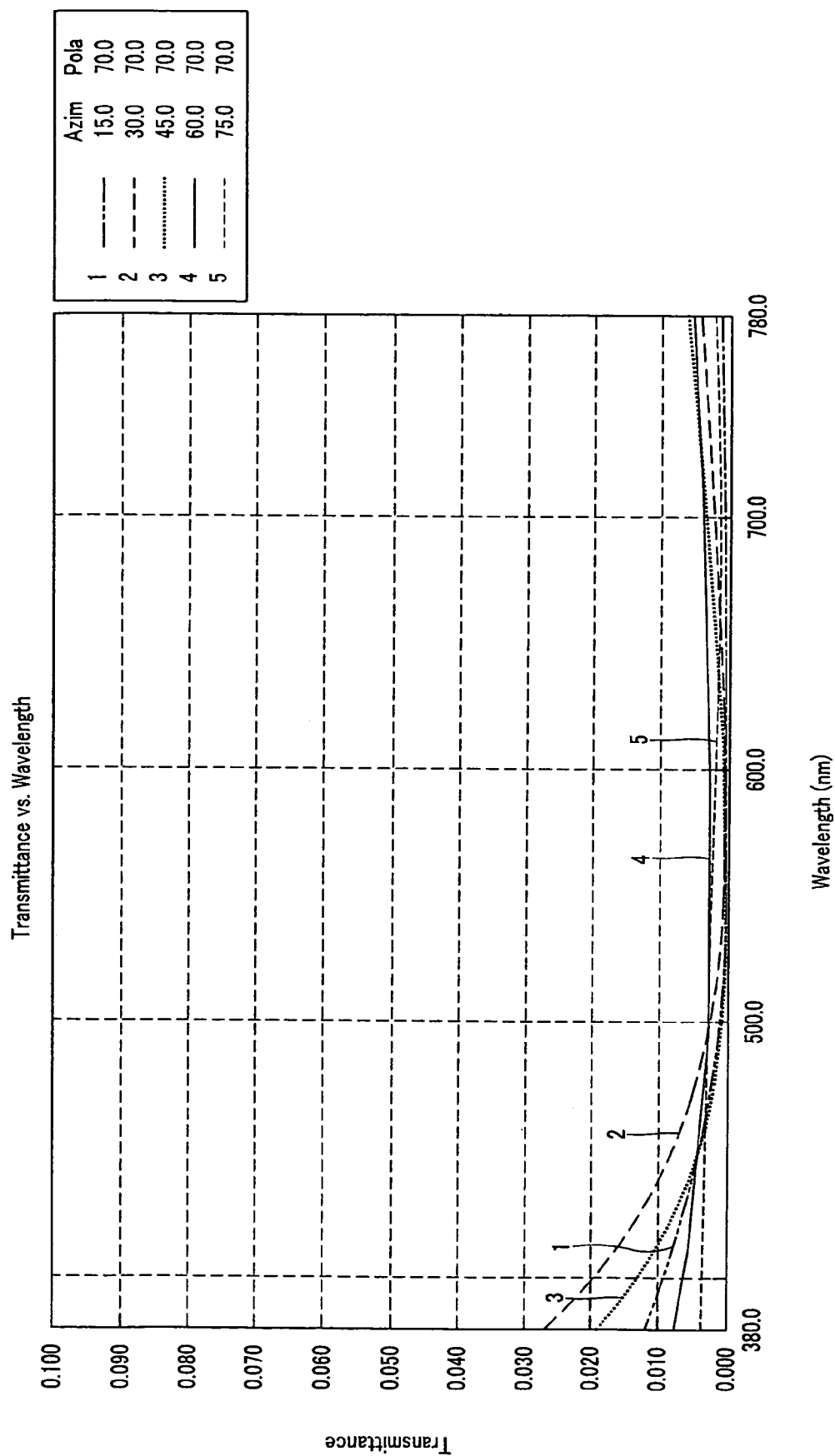
FIG. 27 shows black-level spectral transmittance at a viewing angle Pola (elevation angle) of 70 deg. and each of azimuths Azim of 15, 30, 45, 60 and 75 deg. in the fifth embodiment.
Figure 28:
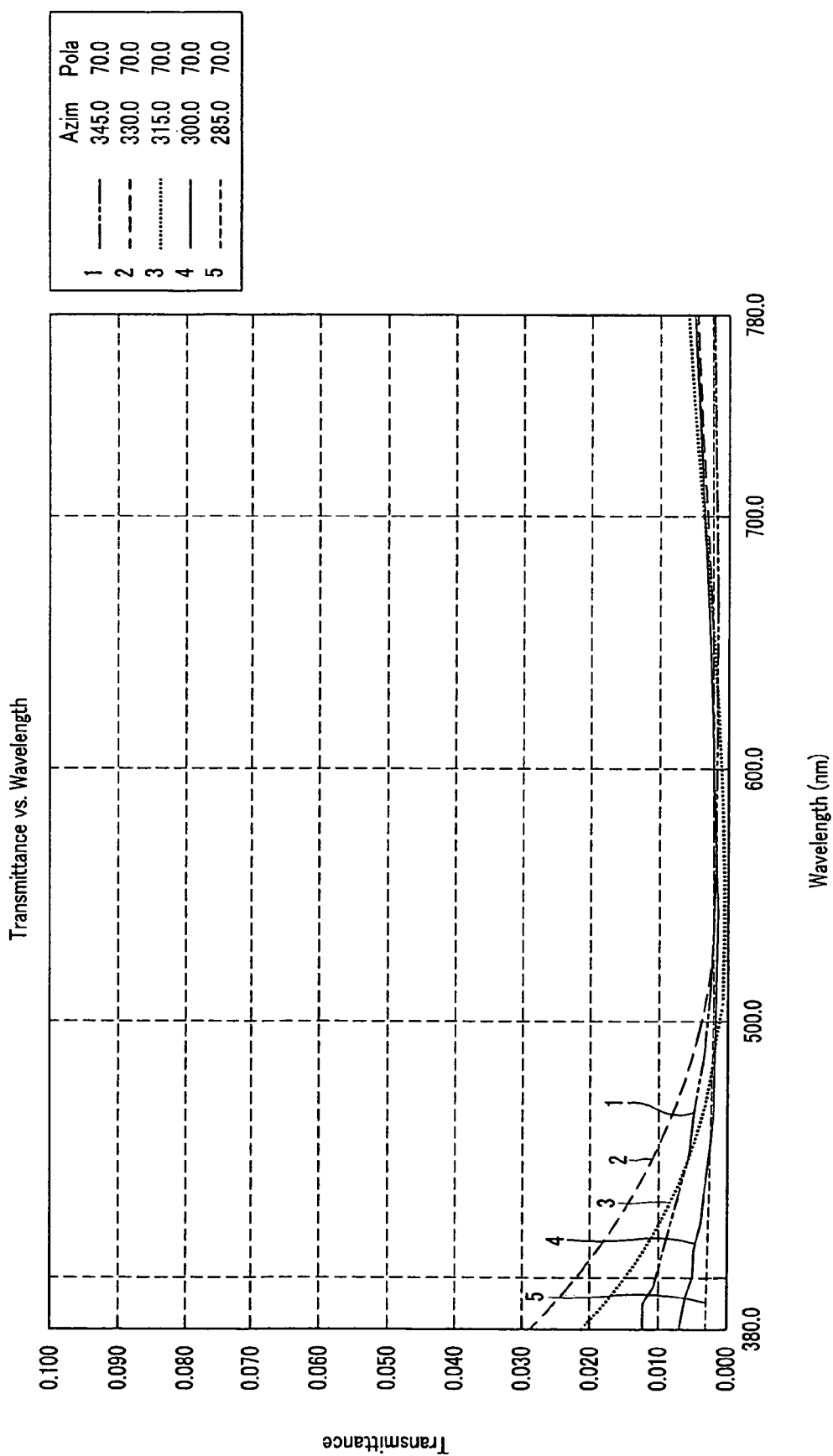
FIG. 28 shows spectral transmittances of a black-display level at a viewing angle Pola (elevation angle) of 70 deg. and each of azimuths Azim of 345, 330, 315, 300 and 285 deg. in the fifth embodiment.

In this embodiment 5, the viewing angle characteristic at a black-display level is as shown in FIG. 26, the black-level spectral transmittance at a viewing angle Pola (elevation angle) of 70 deg. and each of azimuths Azim of 15, 30, 45, 60 and 75 deg. is shown as in FIG. 27, and the black-level spectral transmittance at a viewing angle Pola (elevation angle) of 70 deg. and each of azimuths Azim of 345, 330, 315, 300 and 285 deg. is shown as in FIG. 28. Note here that the azimuth Azim is a counterclockwise angle based on a viewing angle Pola of 0 deg. from the right side in the drawings.

Embodiment 6

According to the embodiment 6, the liquid crystal display device 100A was configured to meet the following conditions:

Direction of absorption axis of incident-side polarization plate: 90 deg.

Alignment direction of liquid crystal layer: 90 deg.

Direction of biaxial retardation film for maximum refractive index nx: 0 deg.

Direction of absorption axis of outgoing-side polarization plate: 0 deg.

Designed wavelength: 520 nm $\Delta nd_{LC}$ of liquid crystal layer: 260 nm

Pretilt angle of liquid crystal layer: 0.5 deg. (direction in which the liquid crystal particles are aligned on the lower polarization plate in the direction of 90 deg.)

$\Delta nd_{RF}$ of biaxial retardation film: 364 nm (ZEONOR)

Refractive index ratio of biaxial retardation film: nz=(nx+ny)/2

Material of polarization plate-protective layer: TAC $\Delta nd_{TAC0}$ of protective layer: 30 nm (optical axis is perpendicular to plane; plane-directional $\Delta nd$>thickness-directional $\Delta nd$)

Figure 30:
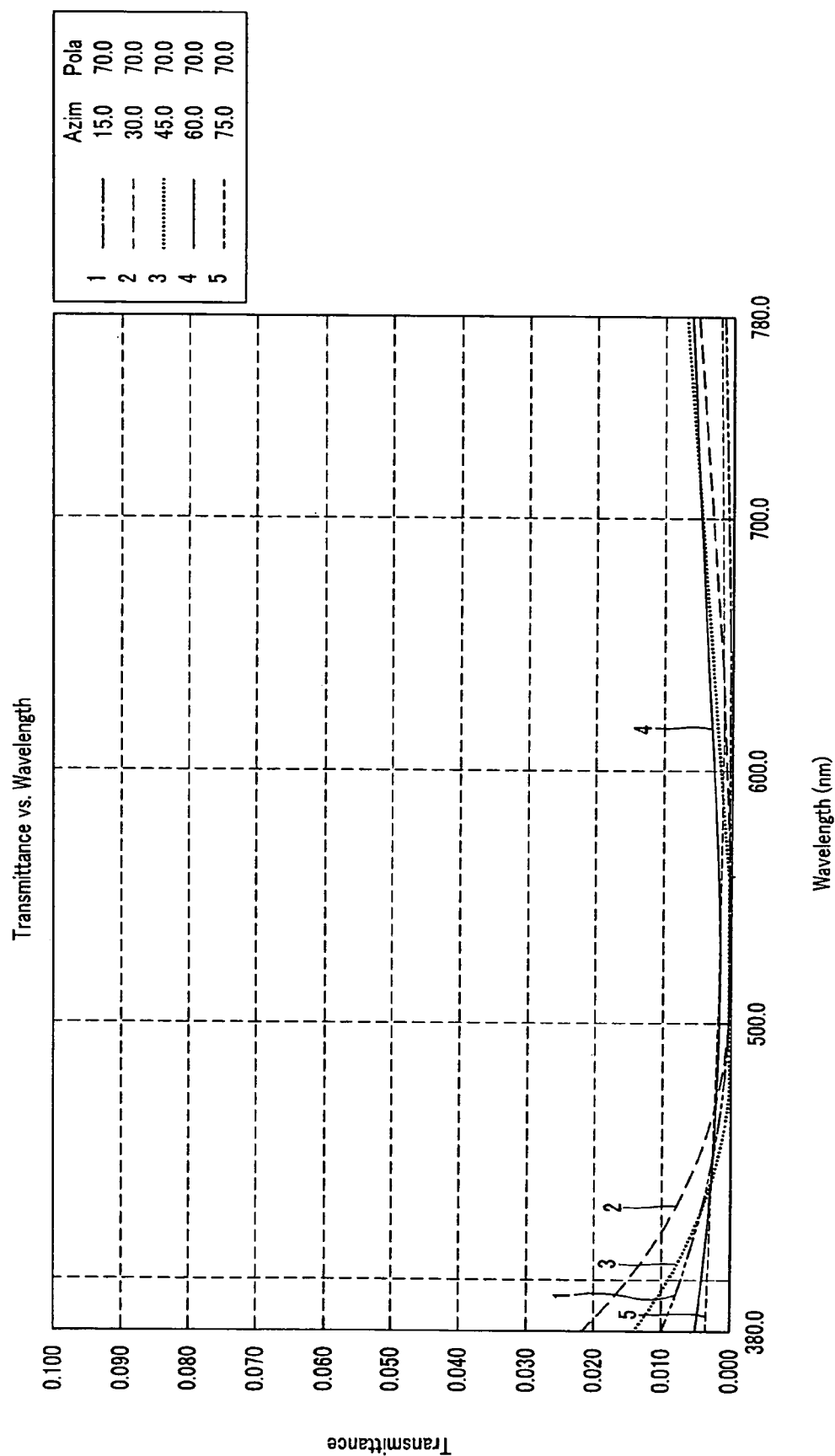
FIG. 30 shows black-level spectral transmittance at a viewing angle Pola (elevation angle) of 70 deg. and each of azimuths Azim of 15, 30, 45, 60 and 75 deg. in the sixth embodiment.
Figure 31:
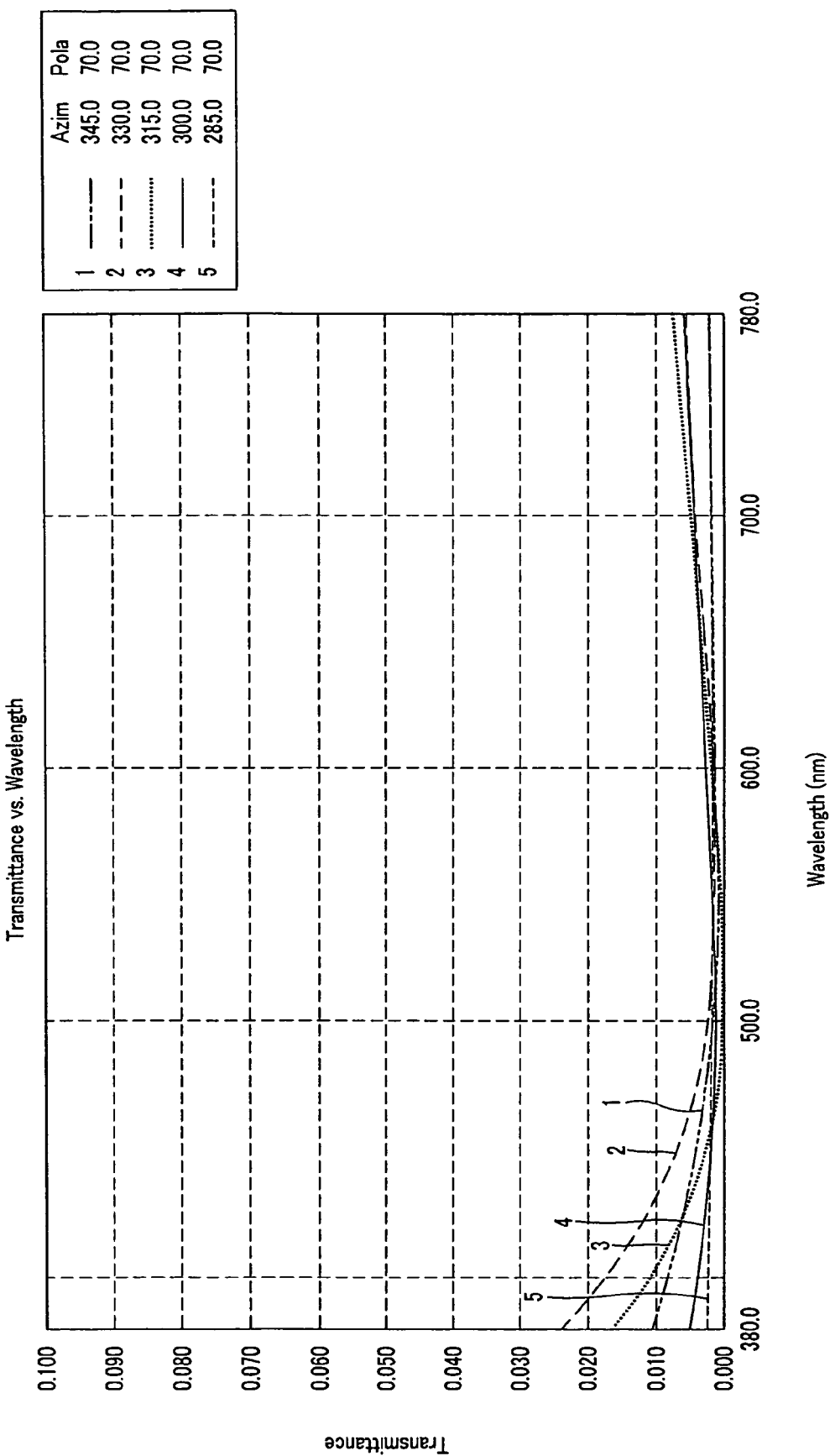
FIG. 31 shows black-level spectral transmittance at a viewing angle Pola (elevation angle) of 70 deg. and each of azimuths Azim of 345, 330, 315, 300 and 285 deg. in the sixth embodiment.

In this embodiment 6, the viewing angle characteristic at a black-display level is as shown in FIG. 29, the black-level spectral transmittance at a viewing angle Pola (elevation angle) of 70 deg. and each of azimuths Azim of 15, 30, 45, 60 and 75 deg. is shown as in FIG. 30, and the black-level spectral transmittance at a viewing angle Pola (elevation angle) of 70 deg. and each of azimuths Azim of 345, 330, 315, 300 and 285 deg. is shown as in FIG. 31. Note here that the azimuth Azim is a counterclockwise angle based on a viewing angle Pola of 0 deg. from the right side in the drawings.

Embodiment 7

According to the embodiment 7, the liquid crystal display device 100A was configured to meet the following conditions:

Direction of absorption axis of incident-side polarization plate: 90 deg.

Alignment direction of liquid crystal layer: 90 deg.

Direction of biaxial retardation film for maximum refractive index nx: 0 deg.

Direction of absorption axis of outgoing-side polarization plate: 0 deg.

Designed wavelength: 550 nm $\Delta nd_{LC}$ of liquid crystal layer: 275 nm

Pretilt angle of liquid crystal layer: 2 deg. (direction in which the liquid crystal particles are aligned on the lower polarization plate in the direction of 90 deg.)

$\Delta nd_{RF}$ of biaxial retardation film: 424 nm (polycarbonate or modified polycarbonate)

Refractive index ratio of biaxial retardation film: nz=(nx+ny)/2

Material of polarization plate-protective layer: TAC $\Delta nd_{TAC0}$ of protective layer: 50 nm (optical axis is perpendicular to plane; plane-directional $\Delta nd$>thickness-directional $\Delta nd$)

Figure 32:
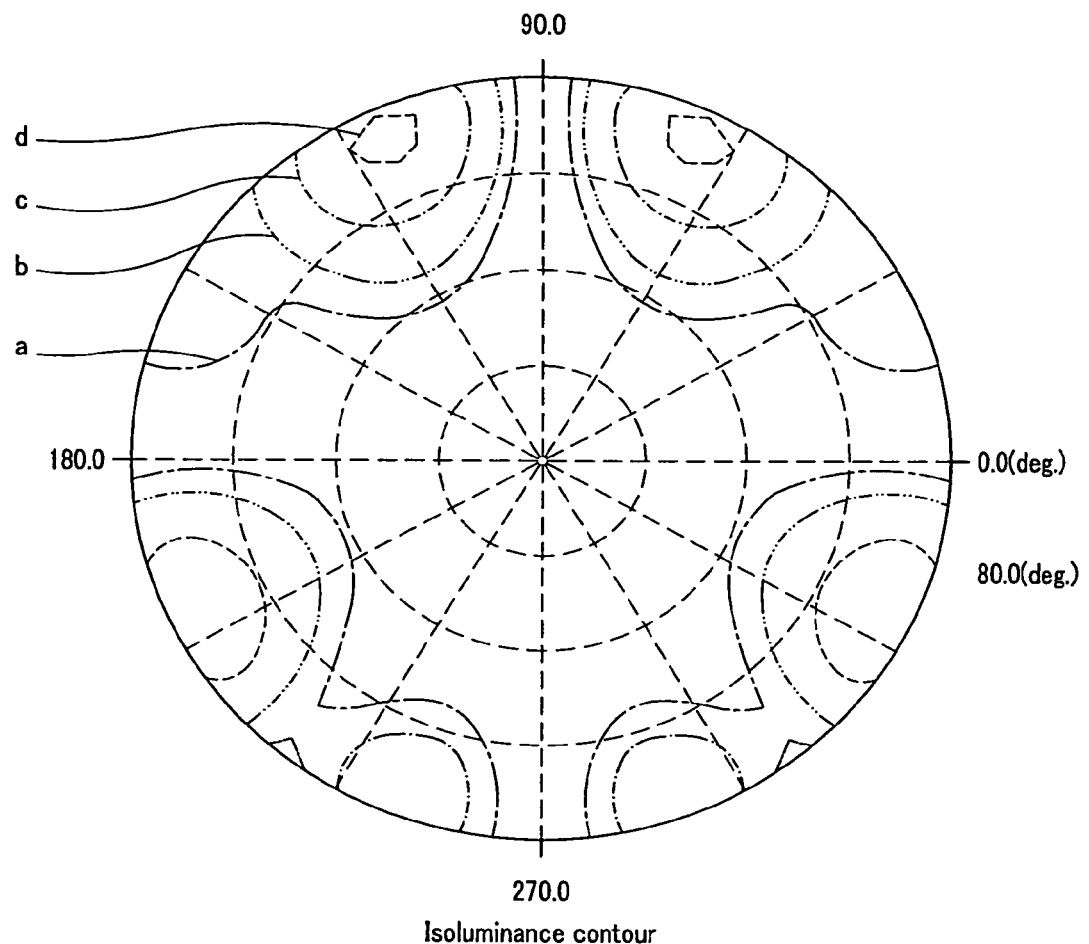
FIG. 32 shows a viewing angle characteristic at a black-display level in a seventh embodiment of the liquid crystal display device in FIG. 8.
Figure 33:
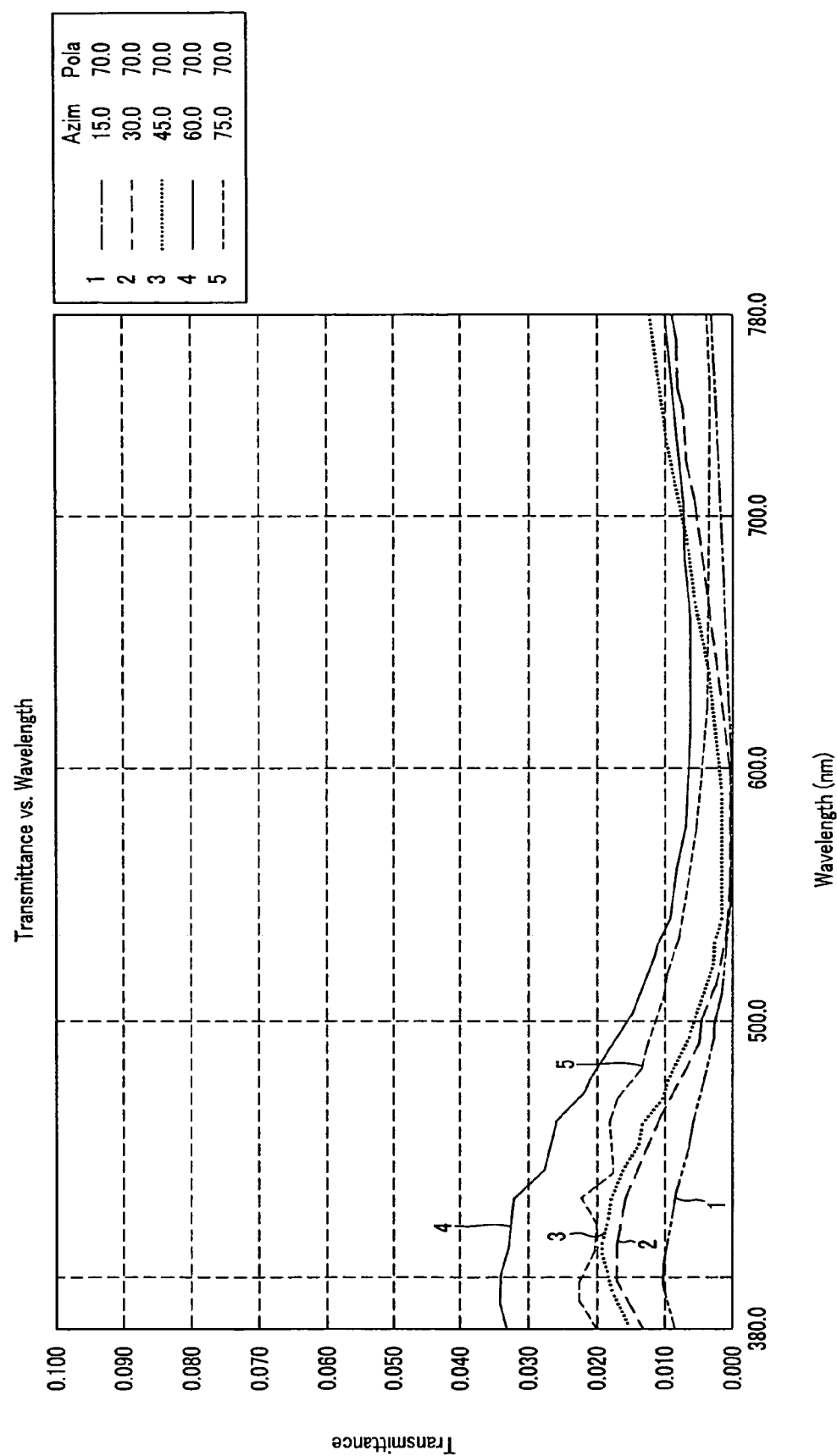
FIG. 33 shows black-level spectral transmittance at a viewing angle Pola (elevation angle) of 70 deg. and each of azimuths Azim of 15, 30, 45, 60 and 75 deg. in the seventh embodiment.
Figure 34:
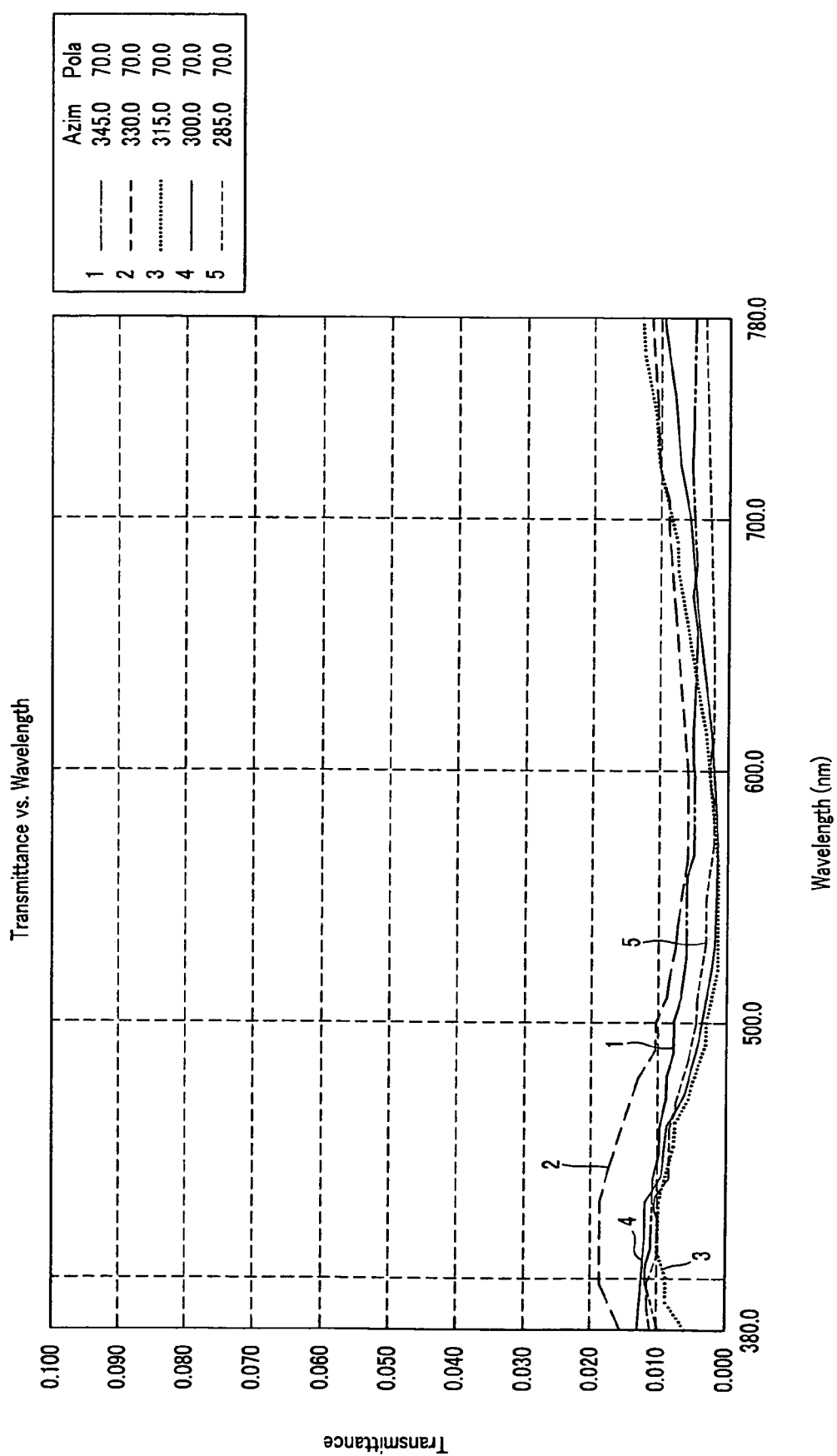
FIG. 34 shows black-level spectral transmittance at a viewing angle Pola (elevation angle) of 70 deg. and each of azimuths Azim of 345, 330, 315, 300 and 285 deg. in the seventh embodiment.

In this embodiment 7, the viewing angle characteristic at a black-display level is as shown in FIG. 32, the black-level spectral transmittance at a viewing angle Pola (elevation angle) of 70 deg. and each of azimuths Azim of 15, 30, 45, 60 and 75 deg. is shown as in FIG. 33, and the black-level spectral transmittance at a viewing angle Pola (elevation angle) of 70 deg. and each of azimuths Azim of 345, 330, 315, 300 and 285 deg. is shown as in FIG. 34. Note here that the azimuth Azim is a counterclockwise angle based on a viewing angle Pola of 0 deg. from the right side in the drawings.

Embodiment 8

According to the embodiment 8, the liquid crystal display device 100A was configured to meet the following conditions:

Direction of absorption axis of incident-side polarization plate: 90 deg.

Alignment direction of liquid crystal layer: 90 deg.

Direction of biaxial retardation film for maximum refractive index nx: 90 deg.

Direction of absorption axis of outgoing-side polarization plate: 0 deg.

Designed wavelength: 550 nm $\Delta nd_{LC}$ of liquid crystal layer: 275 nm

Pretilt angle of liquid crystal layer: 2 deg. (direction in which the liquid crystal particles are aligned on the lower polarization plate in the direction of 90 deg.)

$\Delta nd_{RF}$ of biaxial retardation film: 170 nm (polycarbonate or modified polycarbonate)

Refractive index ratio of biaxial retardation film: nz=(nx+ny)/2

Material of polarization plate-protective layer: TAC $\Delta nd_{TAC0}$ of protective layer: 50 nm (optical axis is perpendicular to plane; plane-directional $\Delta nd$>thickness-directional $\Delta nd$)

Figure 35:
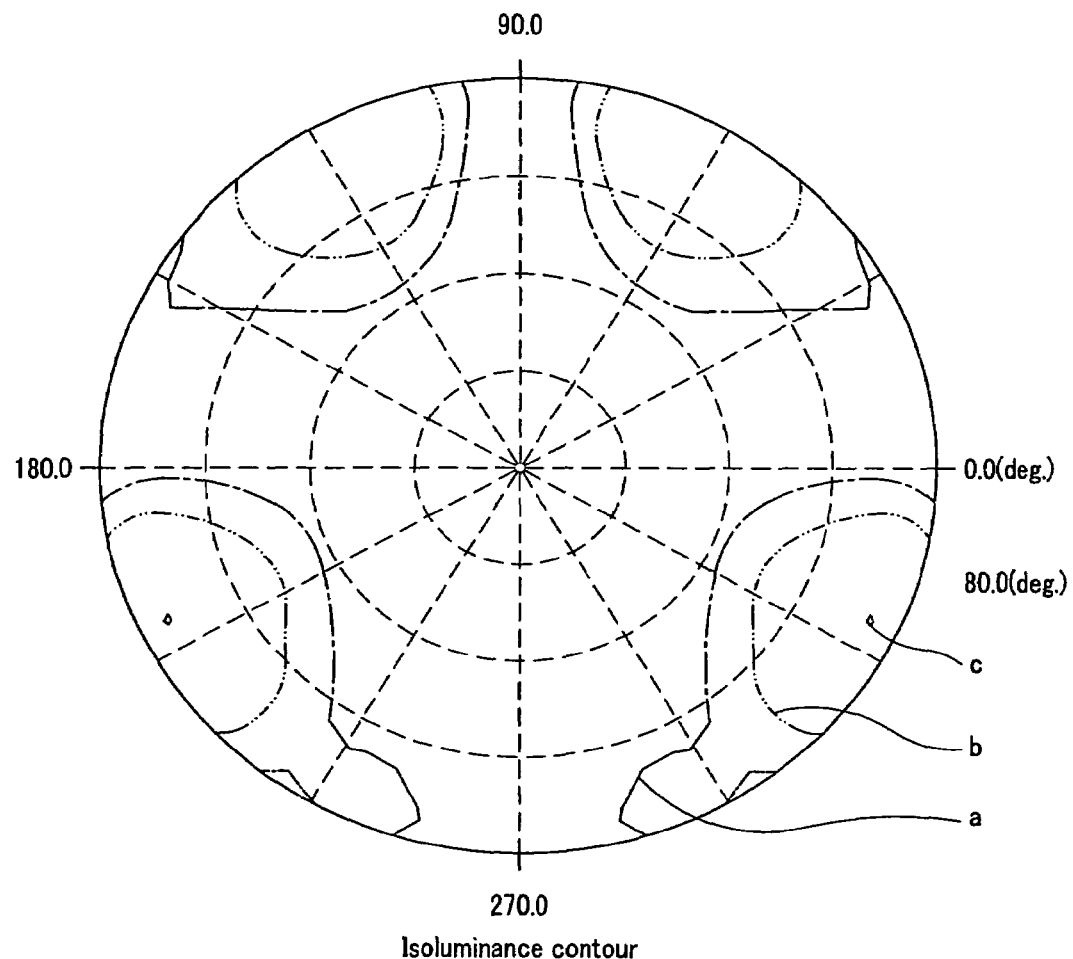
FIG. 35 shows a viewing angle characteristic at a black-display level an eighth embodiment of the liquid crystal display device in FIG. 8.
Figure 36:
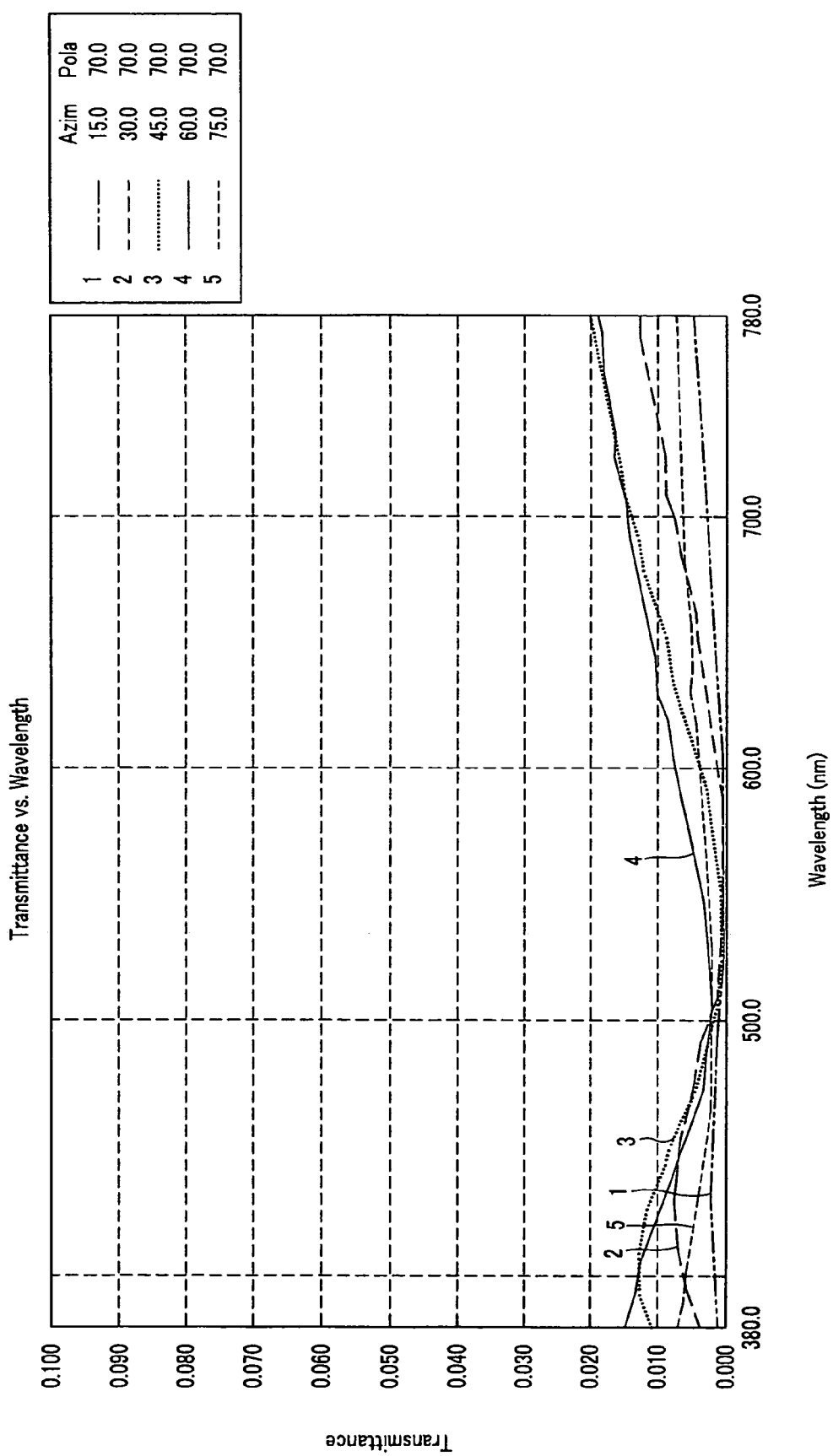
FIG. 36 shows black-level spectral transmittance at a viewing angle Pola (elevation angle) of 70 deg. and each of azimuths Azim of 15, 30, 45, 60 and 75 deg. in the eighth embodiment.
Figure 37:
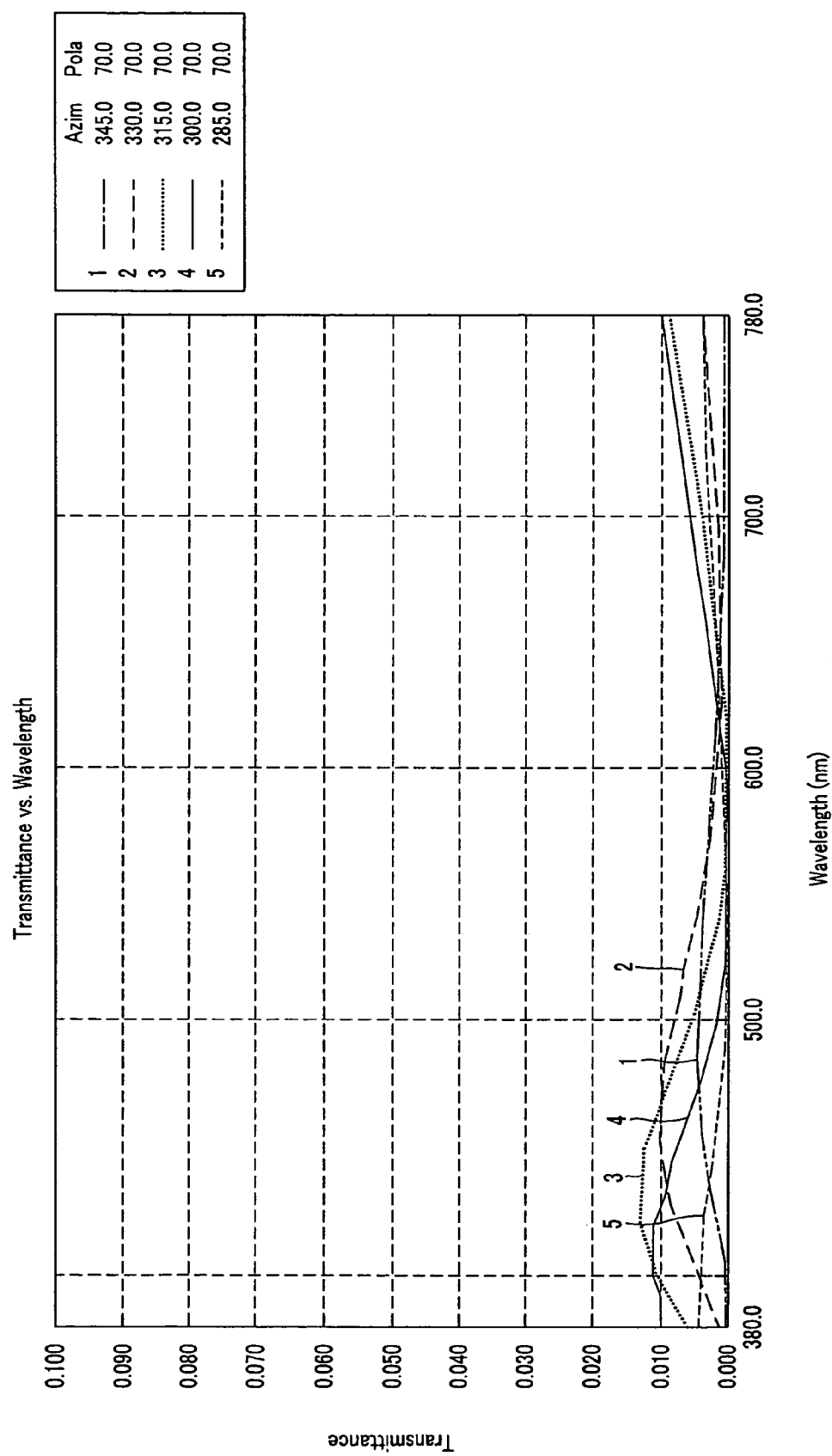
FIG. 37 shows black-level spectral transmittance at a viewing angle Pola (elevation angle) of 70 deg. and each of azimuths Azim of 345, 330, 315, 300 and 285 deg. in the eighth embodiment.

In this embodiment 8, the viewing angle characteristic at a black-display level is as shown in FIG. 35, the black-level spectral transmittance at a viewing angle Pola (elevation angle) of 70 deg. and each of azimuths Azim of 15, 30, 45, 60 and 75 deg. is shown as in FIG. 36, and the black-level spectral transmittance at a viewing angle Pola (elevation angle) of 70 deg. and each of azimuths Azim of 345, 330, 315, 300 and 285 deg. is shown as in FIG. 37. Note here that the azimuth Azim is a counterclockwise angle based on a viewing angle Pola of 0 deg. from the right side in the drawings.

Embodiment 9

According to the embodiment 9, the liquid crystal display device 100A was configured to meet the following conditions:

Direction of absorption axis of incident-side polarization plate: 90 deg.

Alignment direction of liquid crystal layer: 90 deg.

Direction of biaxial retardation film for maximum refractive index nx: 0 deg.

Direction of absorption axis of outgoing-side polarization plate: 0 deg.

Designed wavelength: 550 nm $\Delta nd_{LC}$ of liquid crystal layer: 275 nm

Pretilt angle of liquid crystal layer: 2 deg. (direction in which the liquid crystal particles are aligned on the lower polarization plate in the direction of 90 deg.)

$\Delta nd_{RF}$ of biaxial retardation film: 380 nm (polycarbonate or modified polycarbonate)

Refractive index ratio of biaxial retardation film: nz=(nx+ny)/2

Material of polarization plate-protective layer: TAC $\Delta nd_{TAC0}$ of protective layer: 30 nm (optical axis is perpendicular to plane; plane-directional $\Delta nd$>thickness-directional $\Delta nd$)

Figure 38:
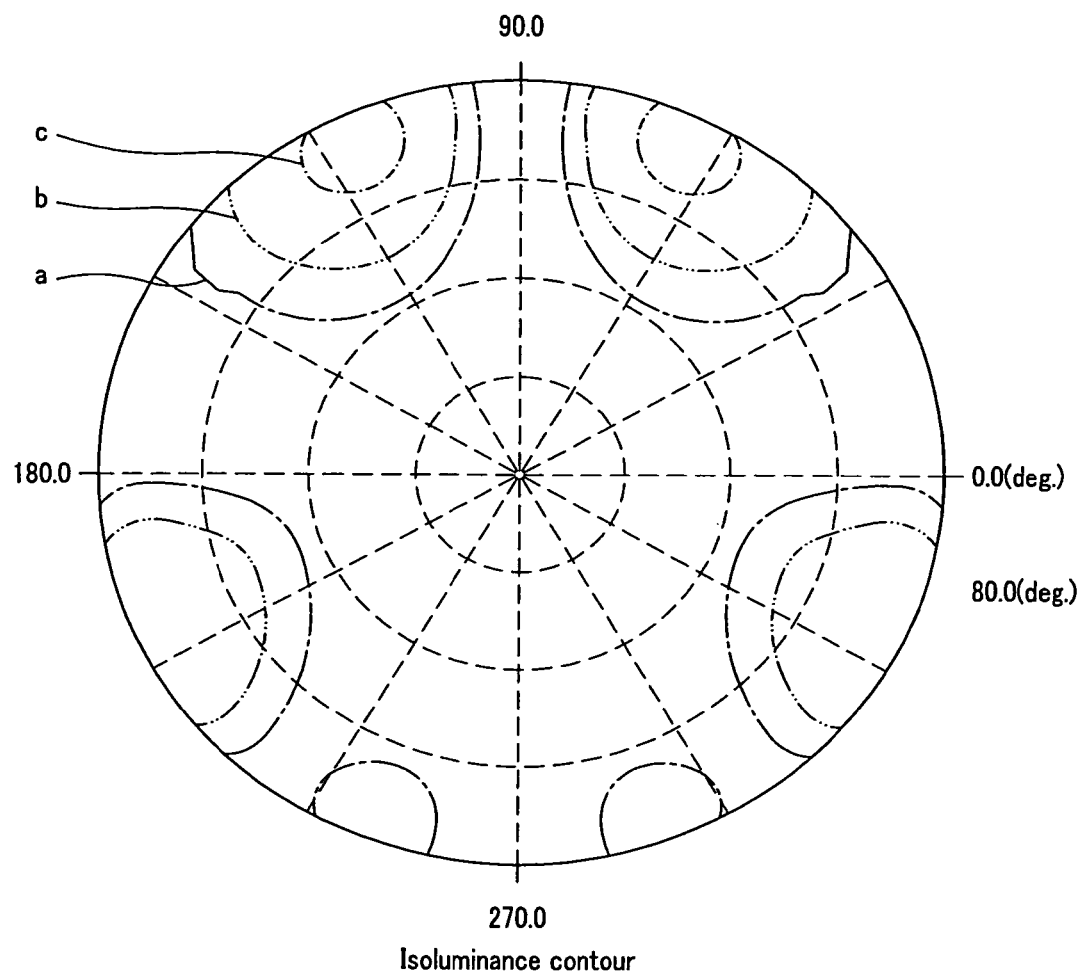
FIG. 38 shows a viewing angle characteristic at a black-display level in a ninth embodiment of the liquid crystal display device in FIG. 8.
Figure 39:
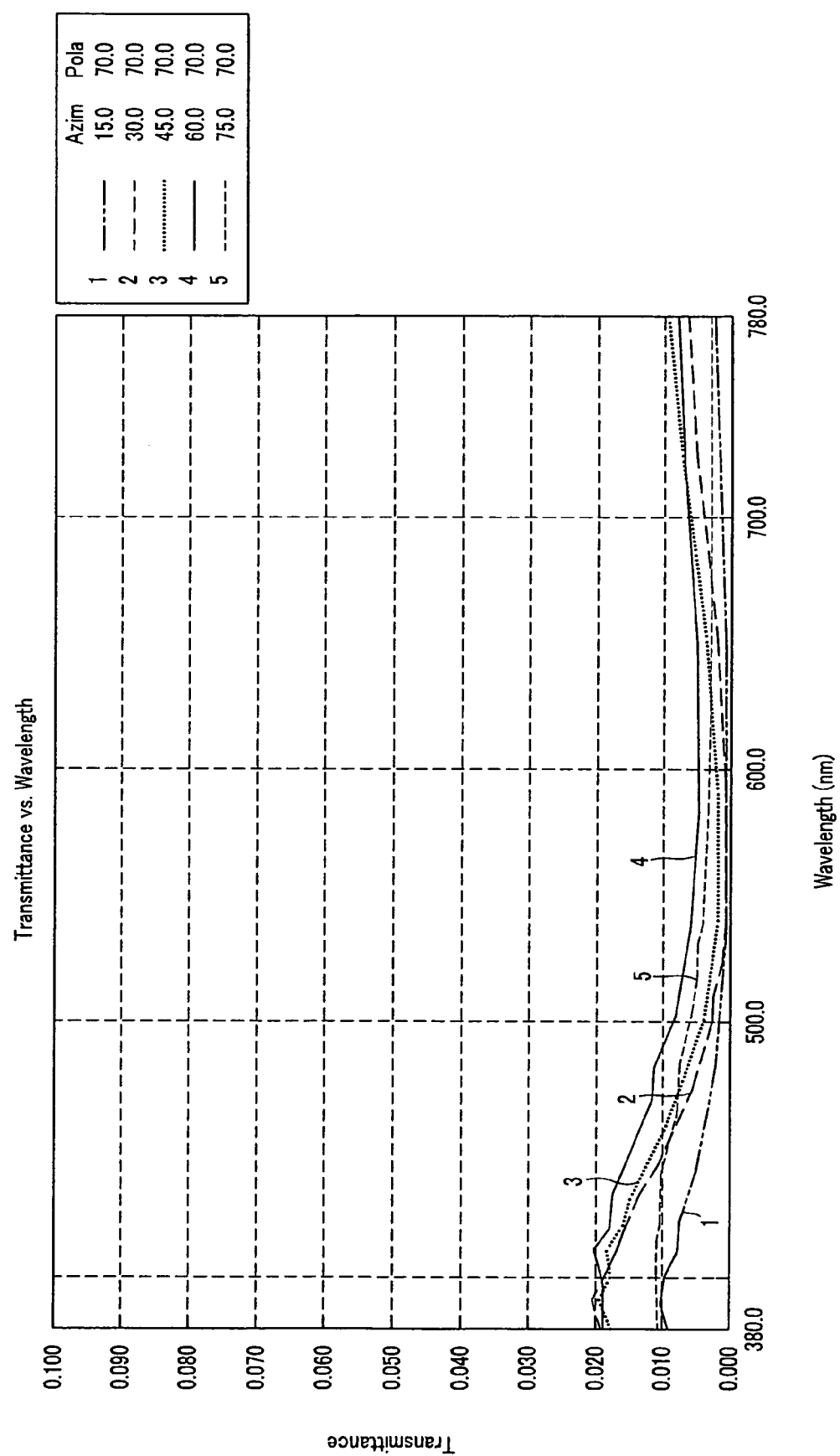
FIG. 39 shows black-level spectral transmittance of a black-display level at a viewing angle Pola (elevation angle) of 70 deg. and each of azimuths Azim of 15, 30, 45, 60 and 75 deg. in the ninth embodiment.
Figure 40:
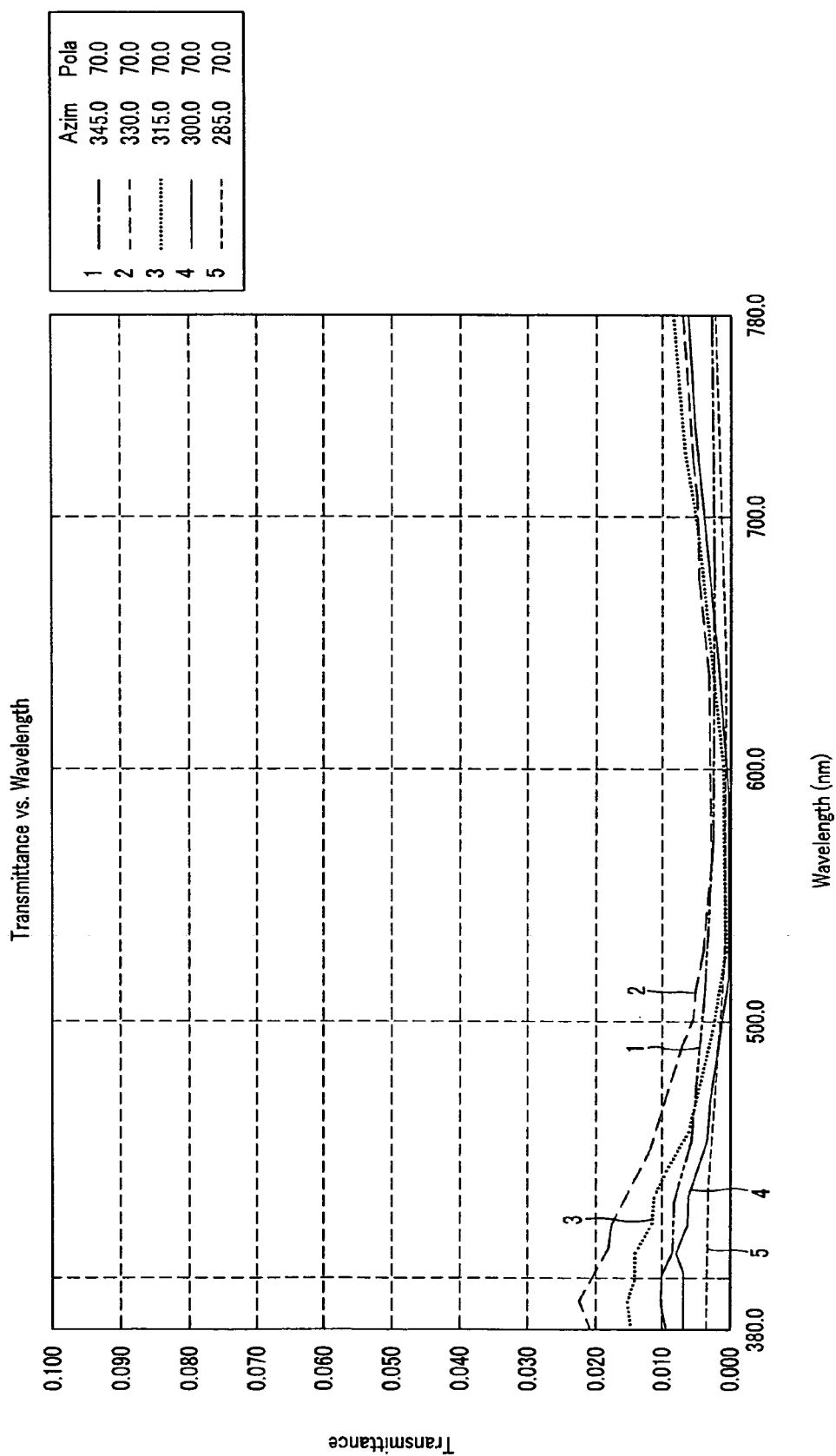
FIG. 40 shows black-level spectral transmittance at a viewing angle Pola (elevation angle) of 70 deg. and each of azimuths Azim of 345, 330, 315, 300 and 285 deg. in the ninth embodiment.

In this embodiment 9, the viewing angle characteristic at a black-display level is as shown in FIG. 38, the black-level spectral transmittance at a viewing angle Pola (elevation angle) of 70 deg. and each of azimuths Azim of 15, 30, 45, 60 and 75 deg. is shown as in FIG. 39, and the black-level spectral transmittance at a viewing angle Pola (elevation angle) of 70 deg. and each of azimuths Azim of 345, 330, 315, 300 and 285 deg. is shown as in FIG. 40. Note here that the azimuth Azim is a counterclockwise angle based on a viewing angle Pola of 0 deg. from the right side in the drawings.

If the relation between the retardation film and azimuth remains unchanged, the above embodiments can provide the same display. That is, even with the layers of the LCD structure being disposed in an inverted order, the same result can be assured. In this case, the retardation film is located between the incident-side polarization plate and liquid crystal layer. Also, even with the azimuth of the entire LCD structure turned 90 deg., the same result can be assured.

Also, the above-mentioned optical compensation can be made in the in-plane switching mode type liquid crystal display device in which the liquid crystal molecules are activated by a field parallel to the substrate as well as in an in-plane switching mode type liquid crystal display device using a ferroelectric liquid crystal whose molecules are activated by a field perpendicular to the substrate. Further, the polarization plate can optically be compensated using a retardation film in place of any liquid crystal layer.

Figure 41:
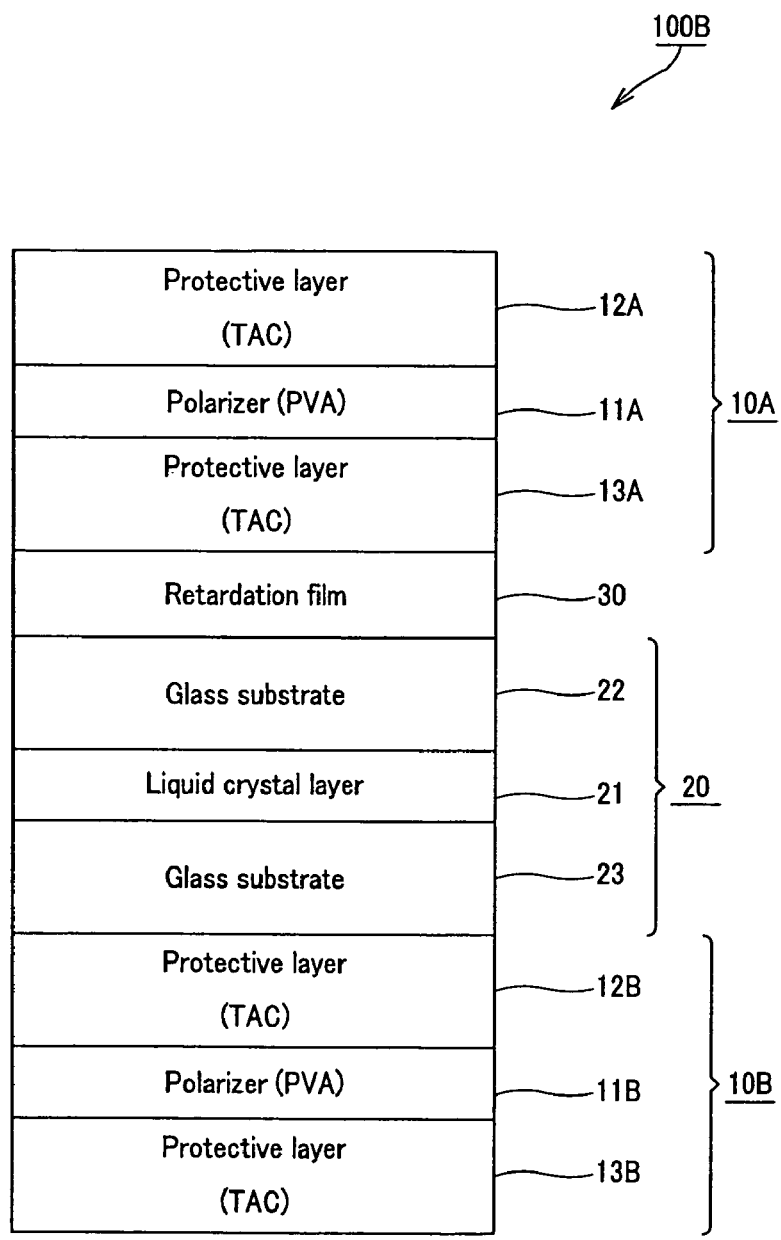
FIG. 41 is a schematic end elevation showing another example configuration of the substantial portion of the liquid crystal display device according to the present invention.

For example, the incident-side polarization plate 10A, retardation film 30, liquid crystal plate 20 and outgoing-side polarization plate 10B may be disposed in this order in a liquid crystal display device 100B as shown in FIG. 41. An embodiment 10 of this liquid crystal display device 100B will be described in detail below.

Embodiment 10

According to the embodiment 10, the liquid crystal display device 100B was configured to meet the following conditions:

Direction of absorption axis of incident-side polarization plate: 0 deg.
Alignment direction of liquid crystal layer: 90 deg.
Direction of biaxial retardation film for maximum refractive index nx: 0 deg.
Direction of absorption axis of outgoing-side polarization plate: 90 deg.
Designed wavelength: 550 nm
$\Delta nd_{LC}$ of liquid crystal layer: 275 nm
Pretilt angle of liquid crystal layer: 2 deg. (direction in which the liquid crystal particles are aligned on the lower polarization plate in the direction of 90 deg.)
$\Delta nd_{RF}$ of biaxial retardation film: 380 nm (polycarbonate or modified polycarbonate)
Refractive index ratio of biaxial retardation film: nz=(nx+ny)/2
Material of polarization plate-protective layer: TAC
$\Delta nd_{TAC0}$ of protective layer: 30 nm (optical axis is perpendicular to plane; plane-directional $\Delta$nd>thickness-directional $\Delta$nd)

Also, the above embodiment 9 may have the entire azimuth thereof turned through 90 deg., which will be described below as an embodiment 11.

According to the embodiment 11, the liquid crystal display device 100A was configured to meet the following conditions:

Direction of absorption axis of incident-side polarization plate: 0 deg.
Alignment direction of liquid crystal layer: 0 deg.
Direction of biaxial retardation film for maximum refractive index nx: 90 deg.
Direction of absorption axis of outgoing-side polarization plate: 90 deg.
Designed wavelength: 550 nm
$\Delta nd_{LC}$ of liquid crystal layer: 275 nm
Pretilt angle of liquid crystal layer: 2 deg. (direction in which the liquid crystal particles are aligned on the lower polarization plate in the direction of 90 deg.)
$\Delta nd_{RF}$ of biaxial retardation film: 380 nm (polycarbonate or modified polycarbonate)
Refractive index ratio of biaxial retardation film: nz=(nx+ny)/2
Material of polarization plate-protective layer: TAC
$\Delta nd_{TAC0}$ of protective layer: 30 nm (optical axis is perpendicular to plane; plane-directional $\Delta$nd>thickness-directional $\Delta$nd)

Note here that the liquid crystal display device 100B is not easy to produce with a perfect satisfaction of the refractive index of the biaxial retardation film 30 of nz=(nx+ny)/2. However, this condition is the most optimum condition, and thus, even if some deviation is found from this most optimum condition, the liquid crystal display device 100B may be considered as the same as the present invention unless there is no difference from the present invention. This is also true with the aforementioned equation of the optimum $\Delta$nd of the biaxial retardation film 30.

Figure 42:
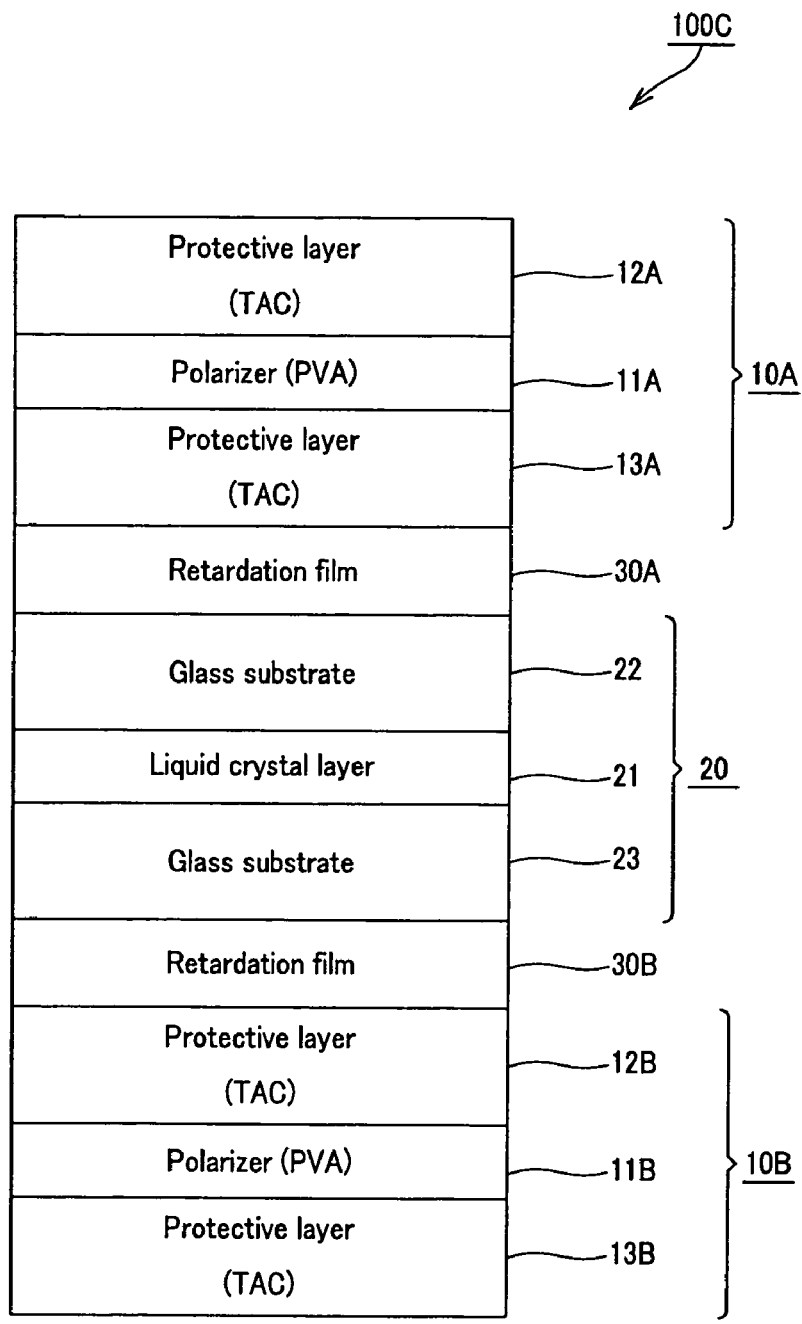
FIG. 42 is a schematic end elevation showing still another example configuration of the substantial portion of the liquid crystal display device according to the present invention.

There will be described below a third retardation film optimizing method for improving the black-level display at a viewing angle of 45 deg.:

More particularly, an incident-side polarization plate 10A, biaxial retardation film 30A, liquid crystal plate 20, biaxial retardation film 30B and outgoing-side polarization plate 10B are disposed in this order in a liquid crystal display device 100C as shown in FIG. 42. In this case, more than one combination of the direction, light path length difference and refractive index (nx, ny, nz) of angular direction of the biaxial retardation films 30A and 30B are possible. The optimizing method described herebelow is just one of such combinations.

In the optimizing method in which a biaxial retardation film is disposed on either side of the liquid crystal plate, the light path length difference $\Delta nd_{RF1}$ of the biaxial retardation film 30A is set so that the polarization of light having passed through the liquid crystal layer 21 will be equal to that of the light having passed through the protective layer 13A in the incident-side polarization plate 10A. Thus, the light path length difference $\Delta nd_{RF}$ of the biaxial retardation film 30B that will be nz=(nz+ny)/2 can be fixed to λ/2 of the designed wavelength.

That is, the biaxial retardation film 30A is used as a first retardation film to cancel a change in polarized state of the light due to having passed through the liquid crystal layer 21 to restore the polarized state of the light having passed through the protective layer 13A, while the biaxial retardation film 30B is used as a second retardation film acting as a λ/2 plate to change the polarized state through 180 deg., so that the change in polarized state of the light due to having passed through the outgoing-side polarization plate 12B will be canceled by the protective layer 13A in the incident-side polarization plate 10A. The light path length difference $\Delta nd_{RF1}$ of the biaxial retardation film 30A is given by the following equation (7) on the basis of the aforementioned equation (5) under the conditions of nz=(nx+ny)/2:

$$\Delta nd_{RF1} = \frac{\lambda}{2\pi}\left[2\tan^{-1}\left(\frac{4\pi}{\lambda}\Delta nd_{TAC0}\right)\right] \quad (7)$$

The above third optimizing method can be illustrated in the Poincare-spherical geography as shown in FIG. 43. FIG. 43A shows the polarization of the light having passed through the polarizer 11A in the incident-side polarization plate 10A, FIG. 43B shows the polarization of the light having passed through the protective layer 13A in the incident-side polarization plate 10A, FIG. 43C shows the polarization of the light having passed through the retardation film 30A, FIG. 43D shows the polarization of the light having passed through the IPS liquid crystal layer 21 in the liquid crystal plate 20, FIG. 43E shows the polarization of the light having passed through the biaxial retardation film 30B, and FIG. 43F shows the polarization of the light having passed through the protective layer 13B in the outgoing-side polarization plate 10B.

In this case, the absorption axis of the incident-side polarization plate 10A is directed at an angle of 90 deg., retardation film 30A is directed at an angle of 90 deg. for the maximum refractive index nx, the liquid crystal plate 20 is aligned at an angle of 90 deg., retardation film 30B is directed at an angle of 0 deg. for the maximum refractive index nx, and the absorption axis of the outgoing-side polarization plate 10B is directed at an angle of 0 deg.

The retardation film 30B may be directed at an angle of 90 deg. but if a plurality of retardation films is directed at the same angle as having been described concerning the second optimizing method, the phase lag when the wavelength of the light is different from the designed one will be larger, resulting in that it will be difficult to suppress the black-level light leakage in a wide range.

Next, there will be described a fourth method of optimizing the retardation film in order to improve the black-level display in a viewing-angular direction of 45 deg.

The fourth optimizing method is intended to optimize a biaxial retardation film disposed on either side of the liquid crystal layer. As in the first and second optimizing methods, the light path length difference $\Delta nd_{RF1}$ of the biaxial retardation film 30A in the third optimizing method is given by the following equation (8):

$$\Delta nd_{RF1} = \frac{\lambda}{2\pi}\left[2\pi - 2\tan^{-1}\left(\frac{4\pi}{\lambda}\Delta nd_{TAC0}\right)\right] \tag{8}$$

This fourth optimizing method can be illustrated in the Poincare-spherical geography as shown in FIG. 44. FIG. 44A shows the polarization of the light having passed through the polarizer 11A in the incident-side polarization plate 10A, FIG. 44B shows the polarization of the light having passed through the protective layer 13A in the incident-side polarization plate 10A, FIG. 44C shows the polarization of the light having passed through the retardation film 30A, FIG. 44D shows the polarization of the light having passed through the IPS liquid crystal layer 21 in the liquid crystal plate 20, FIG. 44E shows the polarization of the light having passed through the biaxial retardation film 30B, and FIG. 44F shows the polarization of the light having passed through the protective layer 13B in the outgoing-side polarization plate 10B.

In this case, the absorption axis of the incident-side polarization plate 10A is directed at an angle of 90 deg., retardation film 30A is directed at an angle of 0 deg. for the maximum refractive index nx, the liquid crystal layer 21 is aligned at an angle of 90 deg., retardation film 30B is directed at an angle of 0 deg. for the maximum refractive index nx, and the absorption axis of the outgoing-side polarization plate 10B is directed at an angle of 0 deg.

Note that the retardation film 30B may be directed at an angle of 90 deg. but the dependence thereof upon the wavelength will be larger.

Next, there will be described a fifth method of optimizing the retardation film for improvement of the black level at a viewing angle of 45 deg.

The optimizing method for a liquid crystal display device in which a retardation film is disposed on either side of the liquid crystal layer can compensate the retardation film independently of any biaxial retardation film-refractive index ratio nz=(nx+ny)/2. Especially when the refractive index ratio of one of the retardation films (30B) is nz=(nx+ny)/2 and the light path length difference of light whose wavelength is the designed one is $\lambda/2$, compensation can be made of the other retardation film (30A) if the latter is a uniaxial one.

The light path length difference $\Delta nd$ of the uniaxial retardation film (30A) is set so that the sum of itself and light path length difference $\Delta nd_{LC}$ of the liquid crystal layer 21 will be $\lambda$. Also, the direction in which the refractive index of the uniaxial retardation film (30A) is nx (nx>ny=nz) and alignment direction of the liquid crystal layer 21 are made to coincide with each other. That is, when the light has a wavelength which is the designed one, the polarized state of the light having passed through the retardation film becomes the same as when there is provided any liquid crystal layer 21. Thus, when f the retardation film 30B has a refractive index of ny=(nx+ny)/2 and a light path length difference $\lambda/2$ when the light has a wavelength which is the designed one, the light having passed through the protective layer 13B in the outgoing-side polarization plate 10B will be polarized along the absorption axis of the outgoing-side polarization plate 10B irrespectively of the value of the light path length difference $\Delta nd_{TAC0}$ of the protective layer 13A in the outgoing-side polarization plate 10A.

Also, to prevent the light from leaking at the black level in a wide range, the direction in which the refractive index of the biaxial retardation film is nx is made orthogonal to the absorption axis of the liquid crystal layer.

There will be described in detail embodiments 12 to 14 of the liquid crystal display device 100C in which the incident-side polarization plate 10A, retardation film 30A, liquid crystal plate 20, retardation film 30B and outgoing-side polarization plate 10B are disposed in this order as shown in FIG. 42.

Embodiment 12

According to the embodiment 12, the liquid crystal display device 100C was configured to meet the following conditions:

Direction of absorption axis of incident-side polarization plate: 90 deg.
Direction of biaxial retardation film 1 for maximum refractive index nx: 90 deg.
Alignment direction of liquid crystal layer: 90 deg.
Direction of biaxial retardation film 2 for maximum refractive index nx: 0 deg.
Direction of absorption axis of outgoing-side polarization plate: 0 deg.
Designed wavelength: 520 nm
$\Delta nd_{LC}$ of liquid crystal layer: 260 nm
Pretilt angle of liquid crystal layer: 2 deg. (direction in which the liquid crystal particles are aligned on the lower polarization plate in the direction of 90 deg.)
$\Delta nd_{RF1}$ of biaxial retardation film 1: 104 nm (polycarbonate or modified polycarbonate)
Refractive index ratio of biaxial retardation film: nz=(nx+ny)/2
$\Delta nd_{RF2}$ of biaxial retardation film 2: 260 nm (polycarbonate or modified polycarbonate)
Refractive index ratio of biaxial retardation film: nz=(nx+ny)/2
Material of polarization plate-protective layer: TAC $\Delta nd_{TAC0}$ of protective layer: 30 nm (optical axis is perpendicular to plane; plane-directional $\Delta nd$>thickness-directional $\Delta nd$)

Figure 45:
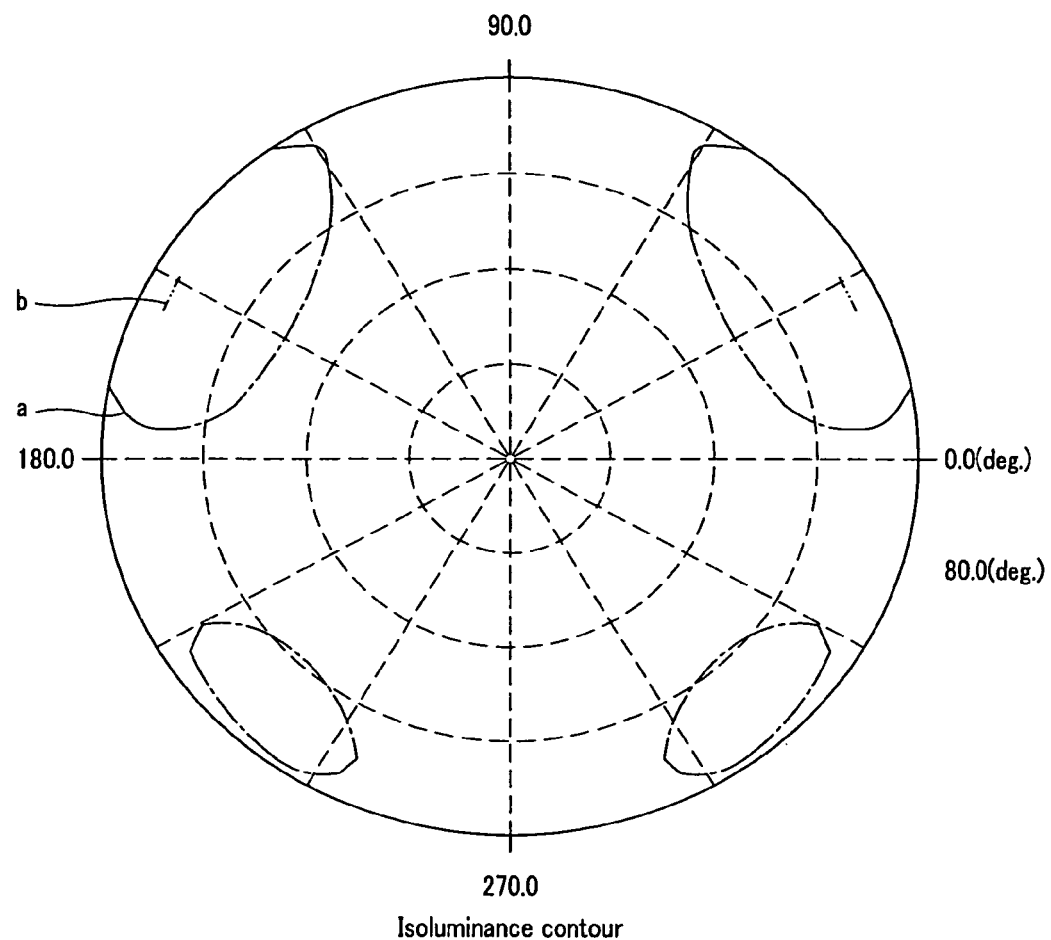
FIG. 45 shows a viewing angle characteristic at a black-display level in a twelfth embodiment of the liquid crystal display device in FIG. 42.
Figure 46:
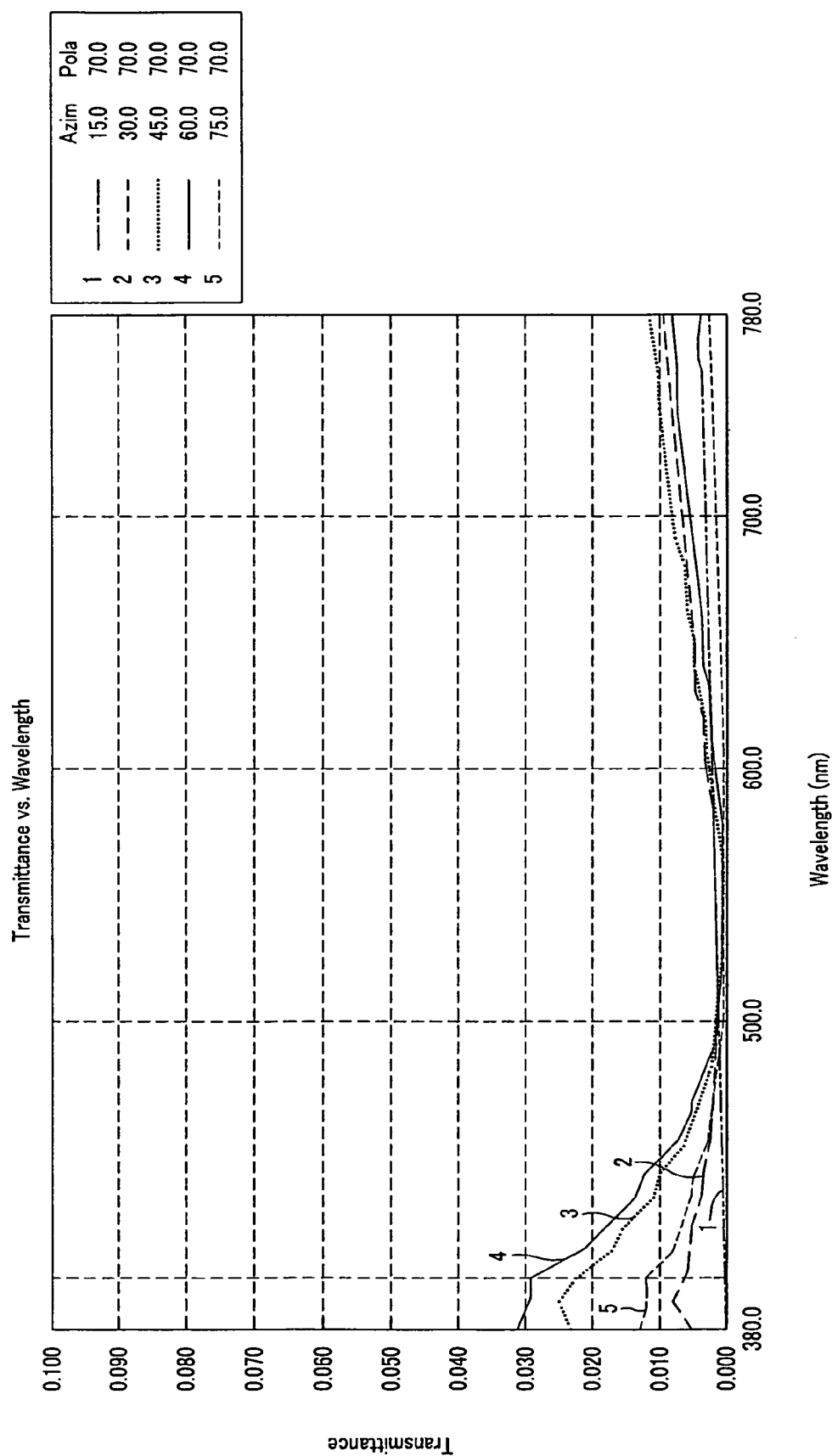
FIG. 46 shows black-level spectral transmittance of a black-display level at a viewing angle Pola (elevation angle) of 70 deg. and each of azimuths Azim of 15, 30, 45, 60 and 75 deg. in the twelfth embodiment.
Figure 47:
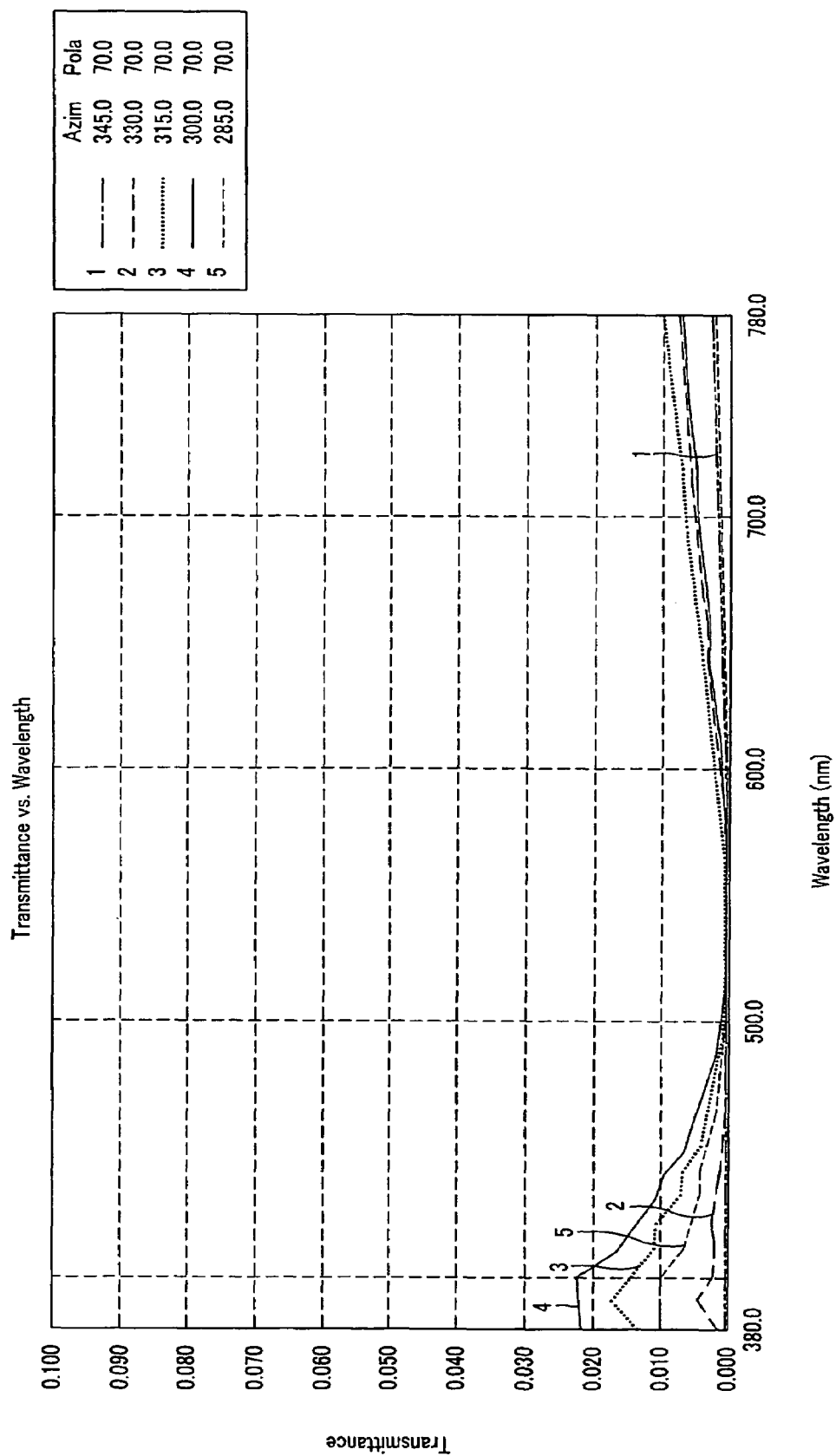
FIG. 47 shows black-level spectral transmittance at a viewing angle Pola (elevation angle) of 70 deg. and each of azimuths Azim of 345, 330, 315, 300 and 285 deg. in the twelfth embodiment.

In this embodiment 12, the viewing angle characteristic at a black-display level is as shown in FIG. 45, the black-level spectral transmittance at a viewing angle Pola (elevation angle) of 70 deg. and each of azimuths Azim of 15, 30, 45, 60 and 75 deg. is shown as in FIG. 46, and the black-level spectral transmittance at a viewing angle Pola (elevation angle) of 70 deg. and each of azimuths Azim of 345, 330, 315, 300 and 285 deg. is shown as in FIG. 47. Note here that the azimuth Azim is a counterclockwise angle based on a viewing angle Pola of 0 deg. from the right side in the drawings.

Embodiment 13

According to the embodiment 13, the liquid crystal display device 100C was configured to meet the following conditions:

Direction of absorption axis of incident-side polarization plate: 90 deg.
Direction of biaxial retardation film 1 for maximum refractive index nx: 0 deg.
Alignment direction of liquid crystal layer: 90 deg.
Direction of biaxial retardation film 2 for maximum refractive index nx: 0 deg.
Direction of absorption axis of outgoing-side polarization plate: 0 deg.
Designed wavelength: 520 nm
$\Delta nd_{LC}$ of liquid crystal layer: 260 nm
Pretilt angle of liquid crystal layer: 0.5 deg. (direction in which the liquid crystal particles are aligned on the lower polarization plate in the direction of 90 deg.)
$\Delta nd_{RF1}$ of biaxial retardation film 1: 416 nm (polycarbonate or modified polycarbonate)
Refractive index ratio of biaxial retardation film: nz=(nx+ny)/2
$\Delta nd_{RF2}$ of biaxial retardation film 2: 260 nm (polycarbonate or modified polycarbonate)
Refractive index ratio of biaxial retardation film: nz=(nx+ny)/2
Material of polarization plate-protective layer: TAC
$\Delta nd_{TAC0}$ of protective layer: 30 nm (optical axis is perpendicular to plane; plane-directional $\Delta nd$>thickness-directional $\Delta nd$)

Figure 48:
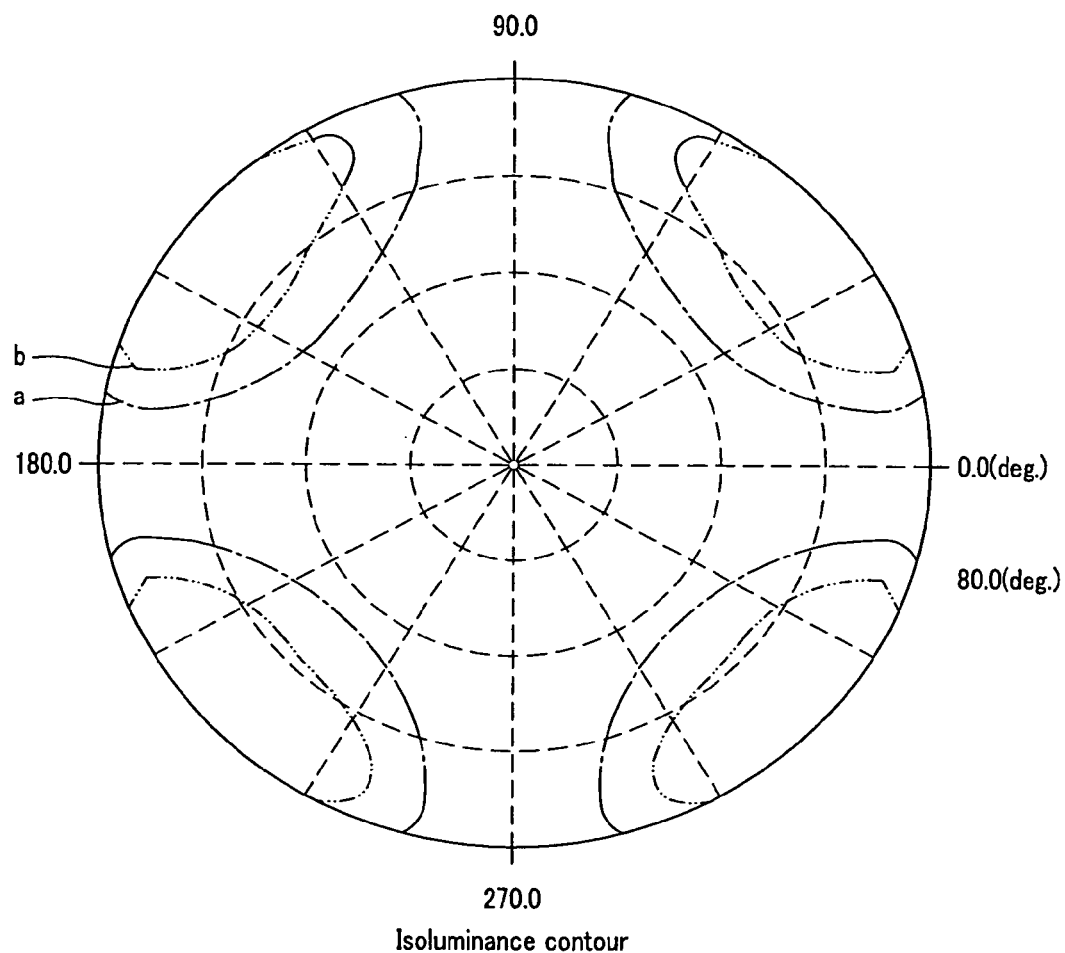
FIG. 48 shows a viewing angle characteristic at a black-display level in a thirteenth embodiment of the liquid crystal display device in FIG. 42.
Figure 49:
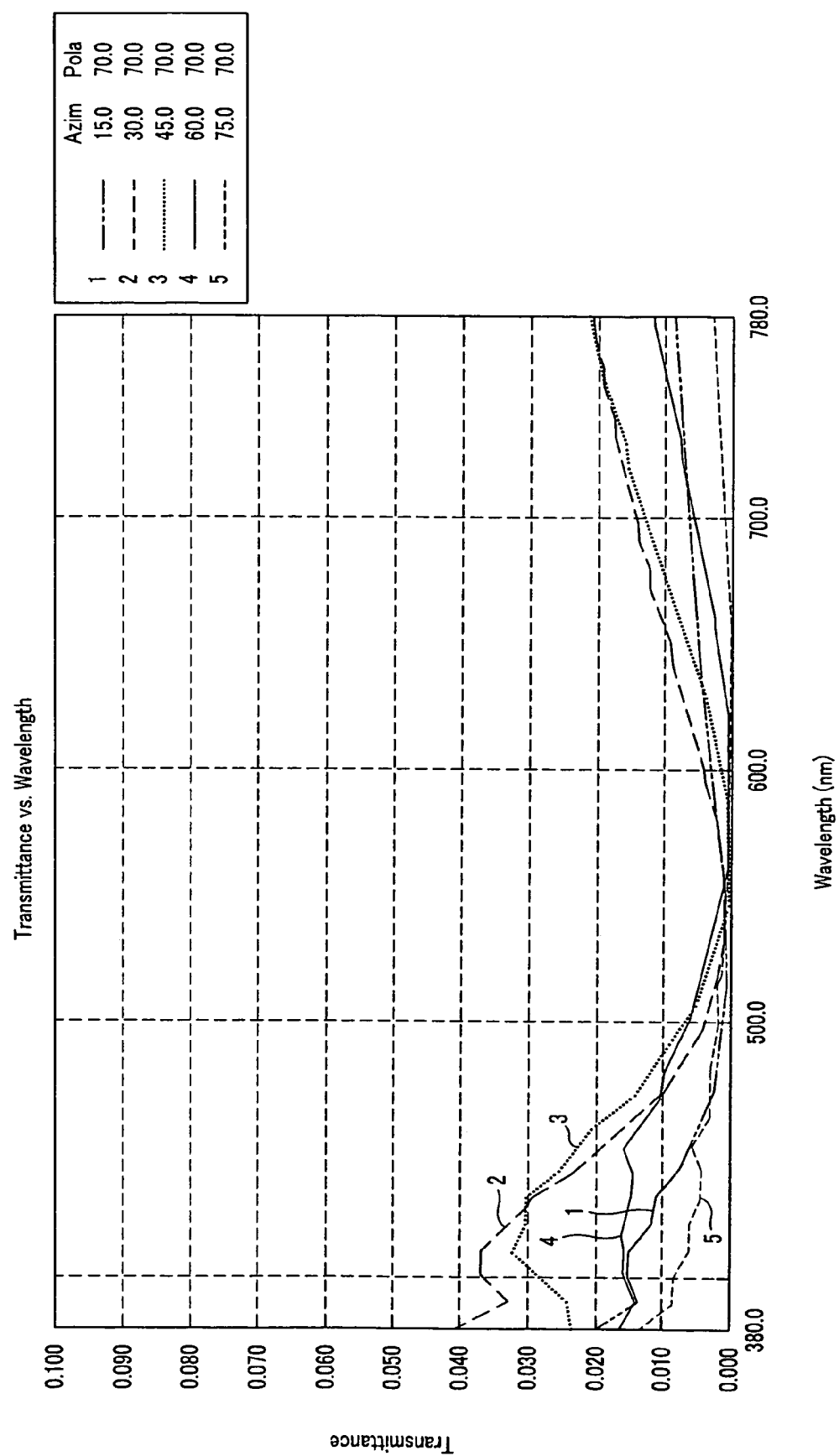
FIG. 49 shows black-level spectral transmittance at a viewing angle Pola (elevation angle) of 70 deg. and each of azimuths Azim of 15, 30, 45, 60 and 75 deg. in the thirteenth embodiment.
Figure 50:
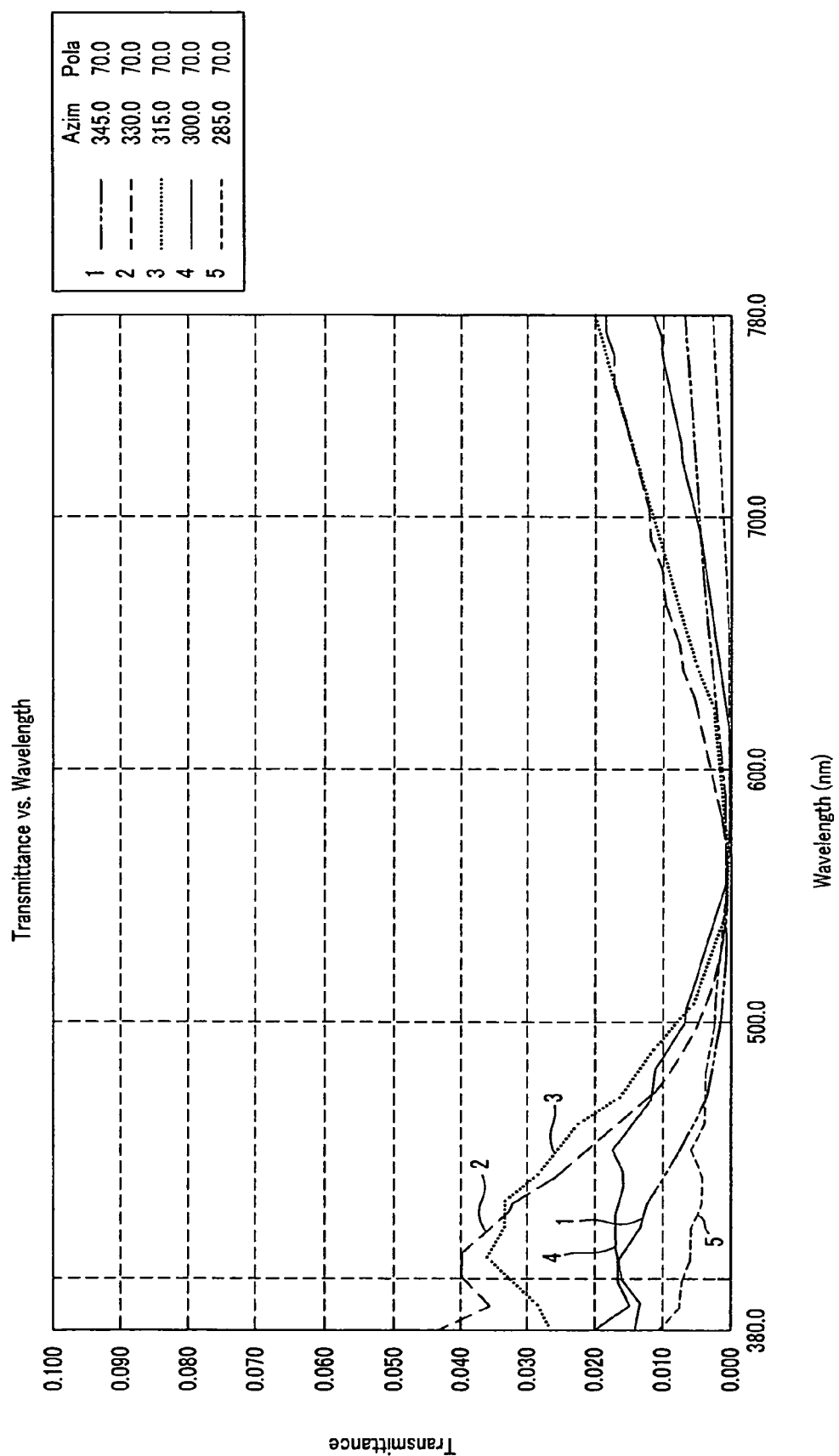
FIG. 50 shows black-level spectral transmittance at a viewing angle Pola (elevation angle) of 70 deg. and each of azimuths Azim of 345, 330, 315, 300 and 285 deg. in the thirteenth embodiment.

In this embodiment 13, the viewing angle characteristic at a black-display level is as shown in FIG. 48, the black-level spectral transmittance at a viewing angle Pola (elevation angle) of 70 deg. and each of azimuths Azim of 15, 30, 45, 60 and 75 deg. is shown as in FIG. 49, and the black-level spectral transmittance at a viewing angle Pola (elevation angle) of 70 deg. and each of azimuths Azim of 345, 330, 315, 300 and 285 deg. is shown as in FIG. 50. Note here that the azimuth Azim is a counterclockwise angle based on a viewing angle Pola of 0 deg. from the right side in the drawings.

Embodiment 14

According to the embodiment 14, the liquid crystal display device 100C was configured to meet the following conditions:

Direction of absorption axis of incident-side polarization plate: 90 deg.
Direction of biaxial retardation film 1 for maximum refractive index nx: 90 deg.
Alignment direction of liquid crystal layer: 90 deg.
Direction of biaxial retardation film 2 for maximum refractive index nx: 0 deg.
Direction of absorption axis of outgoing-side polarization plate: 0 deg.
Designed wavelength: 520 nm
$\Delta nd_{LC}$ of liquid crystal layer: 260 nm
Pretilt angle of liquid crystal layer: 0.5 deg. (direction in which the liquid crystal particles are aligned on the lower polarization plate in the direction of 90 deg.)
$\Delta nd_{RF1}$, of biaxial retardation film 1: 260 nm (ARTON)
Refractive index ratio of biaxial retardation film: nx>ny=nz
$\Delta nd_{RF2}$ of biaxial retardation film 2: 260 nm (polycarbonate or modified polycarbonate)
Refractive index ratio of biaxial retardation film: nz=(nx+ny)/2
Material of polarization plate-protective layer: TAC
$\Delta nd_{TAC0}$ of protective layer: 30 nm (optical axis is perpendicular to plane; plane-directional $\Delta nd$>thickness-directional $\Delta nd$)

Figure 51:
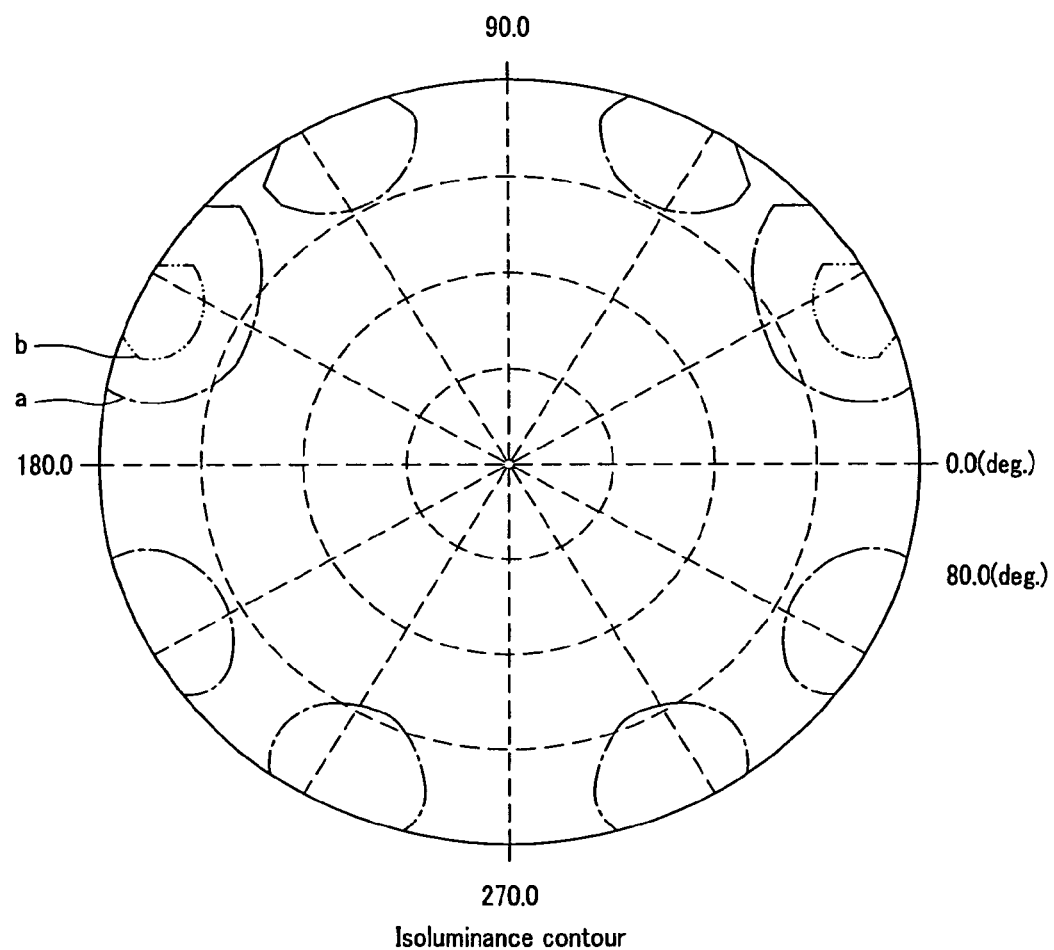
FIG. 51 shows a viewing angle characteristic at a black-display level in a fourteenth embodiment of the liquid crystal display device in FIG. 42.
Figure 52:
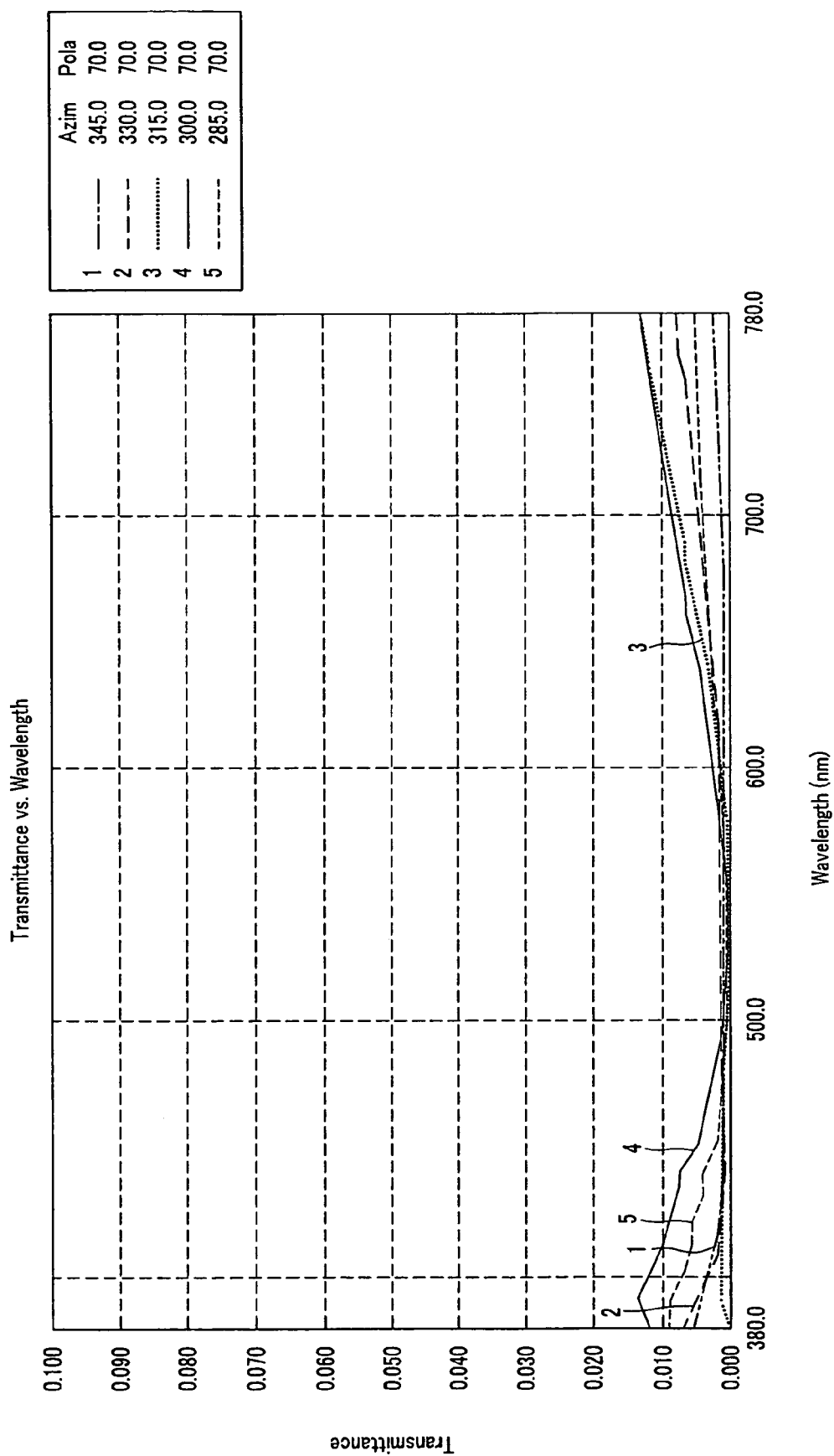
FIG. 52 shows black-level spectral transmittance at a viewing angle Pola (elevation angle) of 70 deg. and each of azimuths Azim of 15, 30, 45, 60 and 75 deg. in the fourteenth embodiment.
Figure 53:
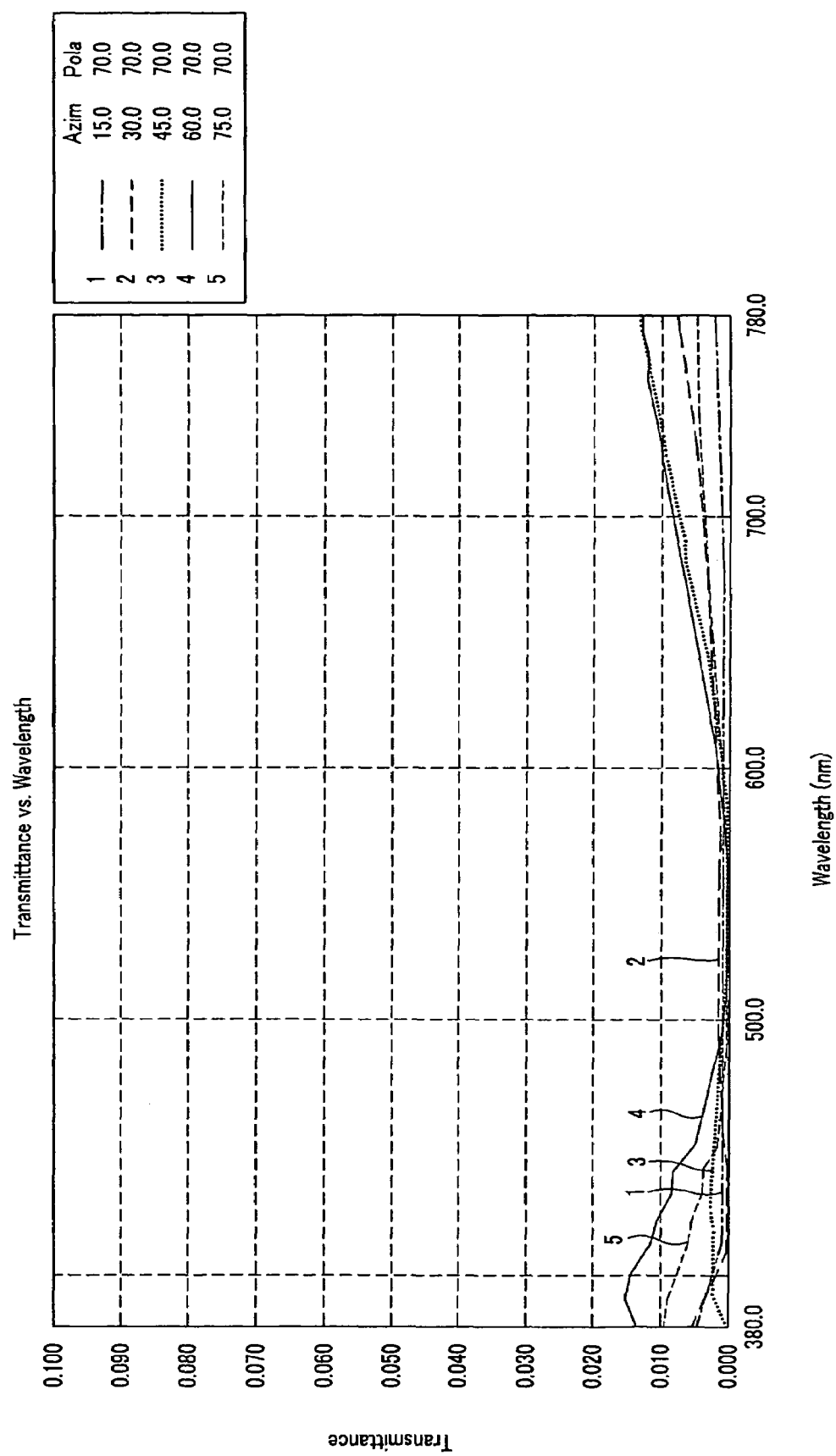
FIG. 53 shows black-level spectral transmittance at a viewing angle Pola (elevation angle) of 70 deg. and each of azimuths Azim of 345, 330, 315, 300 and 285 deg. in the fourteenth embodiment.

In this embodiment 14, the viewing angle characteristic at a black-display level is as shown in FIG. 51, the black-level spectral transmittance at a viewing angle Pola (elevation angle) of 70 deg. and each of azimuths Azim of 15, 30, 45, 60 and 75 deg. is shown as in FIG. 52, and the black-level spectral transmittance at a viewing angle Pola (elevation angle) of 70 deg. and each of azimuths Azim of 345, 330, 315, 300 and 285 deg. is shown as in FIG. 53. Note here that the azimuth Azim is a counterclockwise angle based on a viewing angle Pola of 0 deg. from the right side in the drawings.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A liquid crystal display device comprising a pair of polarization plates each including a polarizer and a pair of protective layers laminated over the polarizer to protect the latter, the transmission axes of the polarizers being orthogonal to each other, and a liquid crystal plate disposed between the polarization plates and including a liquid crystal layer having the molecules thereof aligned parallel with the absorption axis of one of the polarization plates, wherein:

each of the protective layers in the pair of polarization plate is a uniaxial retardation film whose thickness is $d_{TAC0}$, laminated over at least the liquid crystal layer, having the optical axis thereof extended in the direction of its thickness and which is generally isotropic in a plane perpendicular to the thickness direction to perform as a negative retardation film whose thickness-directional refractive index nzt is smaller than an in-plane-directional refractive index nxy; and there is disposed between the liquid crystal plane and any one of the polarization plates a biaxial retardation film of thickness $d_{RF}$ that compensates the dependence upon the viewing angle of the protective layer upon which light forming an angle with the viewing-angular direction is incident, wherein the biaxial retardation film has a refractive index of nx>nz>ny and generally meets a relation nz=(nx+ny)/2 (where nz is a refractive index in the direction of thickness, nx is maximum refractive index in a plane perpendicular to the thickness direction and ny is a refractive index in a direction perpendicular to a direction for the maximum refractive index nx and thickness direction for a refractive index nz); and on the assumption that with a predetermined wavelength λ in the visible light domain, the in-plane light path length difference $\Delta nd_{RF}$ of the retardation film is $(nx-ny)d_{RF}$ and absolute value $\Delta nd_{TAC0}$ of the negative light path length difference of the protective layers is $(nxy-nzt)d_{TAC0}$, the direction of the retardation film for the maximum refractive index nx coincides with the direction in which the liquid crystal molecules are aligned for the abnormal light refractive index and the plane-directional light path length difference $\Delta nd_{RF}$ of the retardation film is given nearly by the following equation:

$$\Delta nd_{RF} = \frac{\lambda}{2\pi}\left[\pi - 2\tan^{-1}\left(\frac{4\pi}{\lambda}\Delta nd_{TAC0}\right)\right].$$

2. The device according to claim 1, wherein:
the biaxial retardation film is directed to vary in refractive index in the plane perpendicular to the direction of its thickness and show a maximum refractive index in that plane; and
with a product of the difference between the maximum refractive index of the retardation film and the refractive index of the retardation film in a direction perpendicular, in the plane, to the direction to show the maximum refractive index and the thickness of the retardation film being taken as an in-plane light path length difference of the retardation film, and with a product of the difference between the thickness-directional refractive index and in-plane-directional one, of the protective layer and the thickness of the protective layer being taken as a light path length difference of the protective layer,
the in-plane light path length difference of the retardation film is set with a predetermined wavelength in a visible domain on the basis of the light path length difference of the protective layer and predetermined wavelength to compensate the dependence upon the viewing angle for incident light forming an angle with the viewing-angular direction.

3. The device according to claim 1, wherein the absorption axis of one of the polarization plates is directed in a direction for an abnormal light refractive index of the liquid crystal layer.

4. The device according to claim 1, wherein:
the liquid crystal layer is configured to turn on in the in-plane switching (IPS) mode; and the protective layers are formed from triacetyl cellulose (TAC).

5. The device according to claim 1, wherein on the assumption that the thickness of the liquid crystal layer in the liquid crystal plate is $d_{LC}$, abnormal light refractive index of liquid crystal molecules of the liquid crystal layer is ne, normal light refractive index is no, light path length difference $\Delta nd_{LC}$ of the liquid crystal layer in the liquid crystal plate is $(ne-no)d_{LC}$, the light path length difference $\Delta nd_{LC}$ of the liquid crystal layer in the liquid crystal plate is generally λ/2 with a predetermined wavelength λ in the visible light domain.

6. The device according to claim 1, wherein the pretilt angle of the liquid crystal molecules at the interface of the liquid crystal layer of the liquid crystal plate with the substrate is within a range of 0 to 2 deg.

7. A liquid crystal display device comprising a pair of polarization plates each including a polarizer and a pair of protective layers laminated over the polarizer to protect the latter, the transmission axes of the polarizers being orthogonal to each other, and a liquid crystal plate disposed between the polarization plates and including a liquid crystal layer having the molecules thereof aligned parallel with the absorption axis of one of the polarization plates, wherein:

each of the protective layers in the pair of polarization plate is a uniaxial retardation film laminated over at least the liquid crystal layer, having the optical axis thereof extended in the direction of its thickness and which is generally isotropic in a plane perpendicular to the thickness direction to perform as a negative retardation film whose thickness-directional refractive index is smaller than an in-plane-directional refractive index; and there is disposed between the liquid crystal plane and any one of the polarization plates a biaxial retardation film of thickness $d_{RF}$ that compensates the dependence upon the viewing angle of the protective layer upon which light forming an angle with the viewing-angular direction is incident, the biaxial retardation film is directed to vary in refractive index in the plane perpendicular to the direction of its thickness and show a maximum refractive index in that plane;

with a product of the difference between the maximum refractive index of the retardation film and the refractive index of the retardation film in a direction perpendicular, in the plane, to the direction to show the maximum refractive index and the thickness of the retardation film being taken as an in-plane light path length difference of the retardation film, and with a product of the difference between the thickness-directional refractive index and in-plane-directional one, of the protective layer and the thickness of the protective layer being taken as a light path length difference of the protective layer, the in-plane light path length difference of the retardation film is set with a predetermined wavelength in a visible domain on the basis of the light path length difference of the protective layer and predetermined wavelength to compensate the dependence upon the viewing angle for incident light forming an angle with the viewing-angular direction;

wherein: the biaxial retardation film shows a refractive index of nx>nz>ny and generally meets a relation nz=(nx+ny)/2 (where nz is a refractive index in the direction of thickness, nx is maximum refractive index in a plane perpendicular to the thickness direction and ny is a refractive index in a direction perpendicular to a direction for the maximum refractive index nx and thickness direction for a refractive index nz); and on the assumption that with a predetermined wavelength λ in the visible light domain, the in-plane light path length difference $\Delta nd_{RF}$ of the retardation film is $(nx-ny)d_{RF}$ and absolute value $\Delta nd_{TAC0}$ of the negative light path length difference of the protective layers is $(nxy-nzt)d_{TAC0}$, the direction of the retardation film for the maximum refractive index nx coincides with the direction in which the liquid crystal molecules are aligned for the abnormal light refractive index and the plane-directional light path length difference $\Delta nd_{RF}$ of the retardation film is given nearly by the following equation:

$$\Delta nd_{RF} = \frac{\lambda}{2\pi}\left[\pi + 2\tan^{-1}\left(\frac{4\pi}{\lambda}\Delta nd_{TAC0}\right)\right].$$

8. The device according to claim 7, wherein on the assumption that the thickness of the liquid crystal layer in the liquid crystal plate is $d_{LC}$, abnormal light refractive index of liquid crystal molecules of the liquid crystal layer is ne, normal light refractive index is no, light path length difference 66 $nd_{LC}$ of the liquid crystal layer in the liquid crystal plate is (ne−no) $d_{LC}$, the light path length difference $\Delta nd_{LC}$ of the liquid crystal layer in the liquid crystal plate is generally $\lambda/2$ with a predetermined wavelength $\lambda$ in the visible light domain.

9. The device according to claim 7, wherein the pretilt angle of the liquid crystal molecules at the interface of the liquid crystal layer of the liquid crystal plate with the substrate is within a range of 0 to 2 deg.

10. A liquid crystal display device including a pair of polarization plates each formed from a polarizer whose transmission axis is orthogonal to that of a polarizer in the other polarization plate and a liquid crystal plate disposed between the polarization plates and including a liquid crystal layer having the molecules thereof aligned parallel with the absorption axis of one of the polarization plates, wherein:
   each of the pair of polarization plates has a protective layer laminated over the surface thereof at the side of the crystal layer, the protective layers in pair being equal in thickness to each other and performing as a uniaxial retardation film having a negative phase difference;
   a first retardation film and a second retardation film disposed between the liquid crystal plate and polarization plates, respectively;
   the first retardation film is set to have a light path length difference for a polarization which would be before incident light passes through the liquid crystal layer;
   the second retardation film is a biaxial retardation film whose refractive index in the direction of its thickness is different from that in a plane perpendicular to the thickness direction and which includes a direction in which there is a maximum refractive index nx, and wherein the second retardation film meets a relation nz=(nx+ny)/2, where nz is a refractive index in the direction of thickness and ny is a refractive index in a direction perpendicular to the direction for the maximum refractive index nx and thickness direction for the refractive index nz;
   the in-plane light path length difference of the second retardation film, defined as a product of the difference and the thickness of the retardation film is set to about $\lambda/2$; and
   the first and second retardation films optically compensate the change in polarization of the light having passed through the pair of protective layers.

11. The device according to claim 10, wherein the pretilt angle of the liquid crystal molecules at the interface of the liquid crystal layer of the liquid crystal plate with the substrate is within a range of 0 to 2 deg.

12. The device according to claim 10, wherein: the first retardation film is a biaxial one having a thickness d.sub.RF1 and shows a refractive index of nx>nz>ny (nz is the thickness-directional refractive index, nx is the maximum refractive index in a plane perpendicular to the thickness direction, and ny is the refractive index in a direction perpendicular to the direction for the maximum refractive index nx and thickness direction) in this order;
   each of the protective layers is a uniaxial retardation film whose thickness is $d_{TAC0}$, having the optical axis thereof extended in the direction of its thickness and which is generally isotropic in a plane perpendicular to the thickness direction to perform as a negative retardation film whose thickness-directional refractive index nzt is smaller than an in-plane-directional one nxy;
   on the assumption that with a predetermined wavelength in the visible light domain, the in-plane light path length difference $\Delta nd_{RF1}$ of the retardation film is $(nx-ny)d_{RF1}$ and absolute value $\Delta nd_{TAC0}$ of the negative light path length difference of the protective layers is $(nxy-nzt)d_{TAC0}$, the direction of the retardation film for the maximum refractive index nx coincides with the direction in which the liquid crystal molecules are aligned for the abnormal light refractive index and the plane-directional light path length difference $\Delta nd_{RF}1$ of the retardation film is given nearly by the following equation:

$$\Delta nd_{RF1} = \frac{\lambda}{2\pi}\left[2\tan^{-1}\left(\frac{4\pi}{\lambda}\Delta nd_{TAC0}\right)\right].$$

13. The device according to claim 10, wherein on the assumption that the thickness of the liquid crystal layer in the liquid crystal plate is $d_{LC}$, abnormal light refractive index of liquid crystal molecules of the liquid crystal layer is ne, normal light refractive index is no, light path length difference $\Delta nd_{LC}$ of the liquid crystal layer in the liquid crystal plate is (ne−no) $d_{LC}$, the light path length difference $\Delta nd_{LC}$ of the liquid crystal layer in the liquid crystal plate is generally $\lambda/2$ with a predetermined wavelength $\lambda$ in the visible light domain.

14. The device according to claim 10, wherein:
   the first retardation film is a biaxial one having a thickness $d_{RF1}$ and shows a refractive index of nx>nz>ny (nz is the thickness-directional refractive index, nx is the maximum refractive index in a plane perpendicular to the thickness direction, and ny is the refractive index in a direction perpendicular to the direction for the maximum refractive index nx and thickness direction) in this order;
   each of the protective layers is a uniaxial retardation film whose thickness is $d_{TAC0}$, having the optical axis thereof extended in the direction of its thickness and which is generally isotropic in a plane perpendicular to the thickness direction to perform as a negative retardation film whose thickness-directional refractive index nzt is smaller than an in-plane-directional one nxy;
   on the assumption that with a predetermined wavelength $\lambda$, the in-plane light path length difference $\Delta nd_{RF1}$ of the retardation film is $(nx-ny)d_{RF1}$ and absolute value $\Delta nd_{TAC0}$ of the negative light path length difference of the protective layers is $(nxy-nzt)d_{TAC0}$, the direction of the retardation film for the maximum refractive index nx is orthogonal to the direction in which the liquid crystal molecules are aligned for the abnormal light refractive index and the plane-directional light path length difference $\Delta nd_{RF1}$ of the retardation film is given nearly by the following equation:

$$\Delta nd_{RF1} = \frac{\lambda}{2\pi}\left[2\pi - 2\tan^{-1}\left(\frac{4\pi}{\lambda}\Delta nd_{TAC0}\right)\right].$$

15. The device according to claim 10, wherein:
   the first retardation film is a biaxial one having a thickness $d_{RF1}$ and shows a refractive index of nx>nz=ny (nz is the thickness-directional refractive index, nx is the maximum refractive index in a plane perpendicular to the thickness direction, and ny is the refractive index in a direction perpendicular to the direction for the maximum refractive index nx and thickness direction) in this order; and on the assumption that with a predetermined wavelength $\lambda$ of the visible light domain, the in-plane light path length difference $(nx-ny)d_{RF1}$ of the retardation film is $\Delta nd_{RF1}$, thickness of the liquid crystal layer in the liquid crystal plate is $d_{LC}$, abnormal light refractive index of the liquid crystal molecules of the liquid crystal layer is ne, normal light refractive index of the liquid crystal molecules of the liquid crystal layer is no and light path difference $(ne-no)d_{LC}$ is. $\Delta nd_{LC}$, the direction for the maximum refractive index nx coincides with the direction for the abnormal light refractive index of the liquid crystal molecules aligned in the liquid crystal layer and the sum of the liquid crystal length difference $\Delta nd_{RF1}$ and light path length difference $\Delta nd_{LC}$ of the liquid crystal layer is generally $\lambda$.

* * * * *